United States Patent
Takagi et al.

(10) Patent No.: US 7,559,090 B2
(45) Date of Patent: Jul. 7, 2009

(54) MEMORY, INFORMATION APPARATUS FOR ACCESS TO THE MEMORY, AND METHOD FOR THE INFORMATION APPARATUS

(75) Inventors: Yoshihiko Takagi, Tokyo (JP); Takafumi Kikuchi, Funabashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 512 days.

(21) Appl. No.: 10/527,820

(22) PCT Filed: Jul. 15, 2004

(86) PCT No.: PCT/JP2004/010432

§ 371 (c)(1),
(2), (4) Date: May 11, 2005

(87) PCT Pub. No.: WO2005/008502

PCT Pub. Date: Jan. 27, 2005

(65) Prior Publication Data

US 2005/0246546 A1  Nov. 3, 2005

(30) Foreign Application Priority Data

Jul. 16, 2003 (JP) .............................. 2003-275672
Jul. 2, 2004 (JP) .............................. 2004-197453

(51) Int. Cl.
G06F 7/04 (2006.01)
G06F 17/30 (2006.01)
G06K 9/00 (2006.01)
H04L 9/00 (2006.01)
H04L 9/32 (2006.01)

(52) U.S. Cl. .............................. 726/27; 726/2; 726/17; 713/182; 711/163; 711/164

(58) Field of Classification Search .................. 726/2, 726/17, 27; 713/182; 711/163, 164
See application file for complete search history.

(56) References Cited

U.S. PATENT DOCUMENTS 4,621,321 A * 11/1986 Boebert et al. ................. 707/8
4,701,840 A * 10/1987 Boebert et al. ................. 726/4

(Continued)

FOREIGN PATENT DOCUMENTS

| EP | 1 050 887 | 11/2000 |
|----|-----------|---------|
| JP | 01-147686 | 6/1989 |
| JP | 1-147686 A | 6/1989 |
| JP | 6-302180 | 10/1994 |
| JP | 07-078126 | 3/1995 |
| JP | 7-78126 A | 3/1995 |

(Continued)

OTHER PUBLICATIONS

T. Kato et al.: A Secure Flash Card Solution for Remote Access for Mobile Workforce, IEEE Transactions on Consumer Electronics, vol. 49, Issue 3, Aug. 2003 pp. 561-566.*

*Primary Examiner*—David Garcia Cervetti
(74) *Attorney, Agent, or Firm*—The Nath Law Group; Jerald L. Meyer; Sungyeop Chung

(57) ABSTRACT

With commands from a terminal divided into a command to designate an access area and a command to gain access, the terminal adds verification data of the terminal to an argument of the command to gain access, and it is thereby possible to verify the identity of a terminal application that issues the command to designate an access area, a terminal application that issues the command to gain access, and a terminal application that holds a verification key.

10 Claims, 47 Drawing Sheets

U.S. PATENT DOCUMENTS

| | | | | |
|---|---|---|---|---|
| 4,713,753 | A * | 12/1987 | Boebert et al. | 711/164 |
| 4,816,653 | A * | 3/1989 | Anderl et al. | 235/380 |
| 4,816,654 | A * | 3/1989 | Anderl et al. | 235/380 |
| 4,882,474 | A * | 11/1989 | Anderl et al. | 235/380 |
| 5,225,664 | A * | 7/1993 | Iijima | 235/380 |
| 5,293,576 | A * | 3/1994 | Mihm et al. | 713/170 |
| 5,533,125 | A * | 7/1996 | Bensimon et al. | 711/163 |
| 5,563,395 | A * | 10/1996 | Hoshino | 235/380 |
| 5,623,637 | A | 4/1997 | Jones et al. | |
| 5,845,066 | A | 12/1998 | Fukuzumi | |
| 5,894,550 | A * | 4/1999 | Thiriet | 714/54 |
| 5,959,276 | A | 9/1999 | Iijima | |
| 5,974,499 | A * | 10/1999 | Norman et al. | 711/103 |
| 5,991,858 | A * | 11/1999 | Weinlander | 711/163 |
| 6,058,477 | A * | 5/2000 | Kusakabe et al. | 713/169 |
| 6,161,184 | A * | 12/2000 | Niimura | 726/33 |
| 6,212,646 | B1 * | 4/2001 | Miwa et al. | 713/601 |
| 6,226,749 | B1 * | 5/2001 | Carloganu et al. | 726/2 |
| 6,286,087 | B1 * | 9/2001 | Ito et al. | 711/164 |
| 6,320,787 | B1 * | 11/2001 | Ikeda | 365/185.04 |
| 6,371,377 | B2 * | 4/2002 | Asoh et al. | 235/487 |
| 6,498,748 | B2 * | 12/2002 | Ikeda | 365/185.04 |
| 6,526,145 | B2 * | 2/2003 | Marzahn | 380/42 |
| 6,526,491 | B2 * | 2/2003 | Suzuoki et al. | 711/164 |
| 6,643,180 | B2 * | 11/2003 | Ikehashi et al. | 365/185.22 |
| 6,646,947 | B2 * | 11/2003 | Fukui et al. | 365/189.17 |
| 6,745,307 | B2 * | 6/2004 | McKee | 711/163 |
| 6,747,546 | B1 * | 6/2004 | Hikita et al. | 340/10.31 |
| 6,807,602 | B1 * | 10/2004 | Hornung et al. | 711/5 |
| 6,845,916 | B2 * | 1/2005 | Obana et al. | 235/492 |
| 7,014,119 | B2 * | 3/2006 | Sterling | 235/487 |
| 7,093,104 | B2 * | 8/2006 | Suzuoki et al. | 712/30 |
| 7,093,766 | B2 * | 8/2006 | Obana et al. | 235/492 |
| 7,096,366 | B1 * | 8/2006 | Watanabe | 713/193 |
| 7,139,882 | B2 * | 11/2006 | Suzuoki et al. | 711/153 |
| 7,139,894 | B1 * | 11/2006 | Mensching et al. | 711/170 |
| 7,162,602 | B2 * | 1/2007 | Kodama | 711/163 |
| 7,162,645 | B2 * | 1/2007 | Iguchi et al. | 713/193 |
| 7,167,426 | B2 * | 1/2007 | Suzuki | 369/47.22 |
| 7,171,566 | B2 * | 1/2007 | Durrant | 713/189 |
| 7,185,145 | B2 * | 2/2007 | Mizushima et al. | 711/115 |
| 7,188,282 | B2 * | 3/2007 | Walmsley | 714/718 |
| RE39,622 | E * | 5/2007 | Kusakabe et al. | 713/169 |
| 7,221,961 | B1 * | 5/2007 | Fukumoto et al. | 455/557 |
| 7,225,341 | B2 * | 5/2007 | Yoshino et al. | 713/193 |
| 7,284,132 | B2 * | 10/2007 | Nakabe et al. | 713/182 |
| 7,299,363 | B2 * | 11/2007 | Yamaguchi et al. | 713/189 |
| 7,313,705 | B2 * | 12/2007 | Turkboylari | 713/193 |
| 7,424,622 | B2 * | 9/2008 | Hashimoto et al. | 713/194 |
| 2001/0011337 | A1 | 8/2001 | Shamshirian | |
| 2002/0006060 | A1 * | 1/2002 | Ikeda | 365/185.04 |
| 2002/0083282 | A1 * | 6/2002 | Yoshino et al. | 711/163 |
| 2002/0156993 | A1 * | 10/2002 | Suzuoki et al. | 712/30 |
| 2002/0169960 | A1 * | 11/2002 | Iguchi et al. | 713/174 |
| 2002/0194389 | A1 * | 12/2002 | Worley et al. | 709/310 |
| 2003/0007411 | A1 * | 1/2003 | Fukui et al. | 365/230.03 |
| 2003/0033537 | A1 * | 2/2003 | Fujimoto et al. | 713/193 |
| 2003/0065933 | A1 * | 4/2003 | Hashimoto et al. | 713/194 |
| 2003/0084256 | A1 * | 5/2003 | McKee | 711/152 |
| 2003/0131250 | A1 * | 7/2003 | Quere | 713/189 |
| 2003/0137887 | A1 * | 7/2003 | Nakabe et al. | 365/200 |
| 2003/0140238 | A1 * | 7/2003 | Turkboylari | 713/193 |
| 2003/0149854 | A1 * | 8/2003 | Yoshino et al. | 711/173 |
| 2003/0225962 | A1 * | 12/2003 | Hirosawa | 711/103 |
| 2004/0059916 | A1 * | 3/2004 | Mizushima et al. | 713/172 |
| 2004/0068631 | A1 * | 4/2004 | Ukeda et al. | 711/163 |
| 2004/0093505 | A1 * | 5/2004 | Hatakeyama et al. | 713/189 |
| 2004/0133800 | A1 * | 7/2004 | Sterling | 713/200 |
| 2004/0139341 | A1 * | 7/2004 | Yamaguchi et al. | 713/194 |
| 2004/0162932 | A1 * | 8/2004 | Mizushima et al. | 711/103 |
| 2004/0177215 | A1 * | 9/2004 | Nagamasa et al. | 711/103 |
| 2004/0236918 | A1 * | 11/2004 | Okaue et al. | 711/164 |
| 2004/0249757 | A1 * | 12/2004 | Walmsley et al. | 705/52 |
| 2005/0144438 | A1 * | 6/2005 | Hashimoto et al. | 713/155 |
| 2005/0185067 | A1 * | 8/2005 | Estakhri et al. | 348/231.9 |
| 2005/0192686 | A1 * | 9/2005 | Hirota et al. | 700/94 |
| 2005/0216651 | A1 * | 9/2005 | Tanabiki et al. | 711/100 |
| 2006/0106836 | A1 * | 5/2006 | Masugi et al. | 707/101 |
| 2007/0088906 | A1 * | 4/2007 | Mizushima et al. | 711/103 |
| 2007/0101143 | A1 * | 5/2007 | Iwata et al. | 713/172 |
| 2007/0226412 | A1 * | 9/2007 | Morino et al. | 711/113 |
| 2008/0098239 | A1 * | 4/2008 | Wada et al. | 713/193 |

FOREIGN PATENT DOCUMENTS

| | | |
|---|---|---|
| JP | 11-306088 | 11/1999 |
| JP | 11-306088 A | 11/1999 |
| JP | 2001-118034 | 4/2001 |
| JP | 2001-118034 A | 4/2001 |
| JP | 2003-091704 | 3/2003 |

* cited by examiner

| AREA NUMBER | ACCESS START ADDRESS | ACCESS DATA SIZE |
|---|---|---|
| 1801 | 1802 | 1803 |

FIG.22

| AREA NUMBER X | IDENTIFIER a | VERIFICATION KEY R |
|---|---|---|
| AREA NUMBER 2 | IDENTIFIER b | VERIFICATION KEY |
| AREA NUMBER 3 | IDENTIFIER c | VERIFICATION KEY |
| ... | ... | ... |

| AREA NUMBER X | FILE3 | SESSION KEY Km |
|---|---|---|
| AREA NUMBER 2 | FILE IDENTIFIER 2 | SESSION KEY |
| AREA NUMBER 3 | FILE IDENTIFIER 4 | SESSION KEY |
| ... | ... | ... |

MEMORY, INFORMATION APPARATUS FOR ACCESS TO THE MEMORY, AND METHOD FOR THE INFORMATION APPARATUS

TECHNICAL FIELD

The present invention relates to a memory card that is inserted into a terminal such as a PC and cellular telephone to be used, and an access method of gaining access to the memory card.

BACKGROUND ART

Conventionally, a memory card is inserted into a terminal and used by the terminal to store data. An example of conventional memory cards will be described below (for example, Japanese Patent Application No. 2003-91704).

The card has a command terminal (CMD line) that receives various commands from a terminal and that returns a response to a command, and a data terminal (DAT line) that receives an input of data and that outputs data.

In an example of conventional memory card as shown in FIG. 1, terminal 4602 is the CMD line, while terminals 4607, 4608 and 4609 are DAT lines and DAT0, DAT1 and DAT2, respectively. Terminal C2-01 is CD/DAT3 that operates for data input/output and card detection (CD). With respect to DAT0 to DAT3, there exist a mode to use only DAT0, and another mode to concurrently use DAT0 to DAT3 to implement transfer speed four times higher than in the case of using only DAT0.

An intra-card module structure of the conventional card will be described below with reference to FIG. 2.

The intra-card module is comprised of processing command receiving section 4701 that is connected CMD line 4602 and that performs command reception and response transmission, data transmitting/receiving section 4702 that is connected to DAT lines 4607, 4608, 4609 and C2-01 and that transmits and receives data, storage area 4704, and storage area access section 4703 that reads and writes data from/in storage area 4704 corresponding to a received command.

The processing operation in reading data in the conventional card will be described below. It is herein assumed that data output is set for a mode to use only DAT0 terminal 4607, but a mode may be possible to use DAT1 terminal 4608, DAT2 terminal 4609 and DAT3 terminal 4610 together.

The terminal transmits a data read command to CMD line 4602 of the card. The read command has a format as shown in FIG. 9, and is comprised of command code 401 with 6 bits and command argument 402 with 32 bits. The command argument in the data read command stores a read start address.

Processing command receiving section 4701 having received the command from the terminal recognizes the command as a data read command by referring to command code 401.

Then, processing command receiving section 4701 refers to command argument 402 to check whether a designated address is correct, i.e. whether the designated address is within a range corresponding to the card, and when the address is not correct, returns a response code indicative of an error as a response, while returning a response code indicative of normal when the address is correct.

After sending back the response to the terminal, processing command receiving section 4701 outputs a read request together with the designated address to storage area access section 4703.

2

Storage area access section 4703 reads data from the designated address in storage area 4704 and transmits the data to data transmitting/receiving section 4702.

Data transmitting/receiving section 4702 outputs read data to the terminal via DAT0 line 4607.

In such a memory card, it is possible for a terminal to read and write card freely by designating an address.

In the aforementioned memory card, in the case of imposing access restriction on a specific area of flash memory as a security protection area to enable access thereto only from a specific terminal permitted to gain access, using an smart card command enables the card described in the above-mentioned document to perform flexible authentication. However, In APDU (Application Protocol Data Unit) that is a standard command format of smart card, for reasons that data of 256 bytes is only transmitted and received, and that response reception is necessary whenever a host transmits a command because of half-duplex protocol, fast data transfer is difficult. Therefore, a method is considered for performing authentication processing using an smart card command in a system flexibly adapted to the security policy, and then, performing data transfer using a memory card command. However, it is difficult to check whether an application in an issuer of the smart card command is the same that on a host that issues the memory card command.

Hence, when information generated in the process of authentication processing using a smart card command is included in a memory card command as verification data to verify the identity of issuers of the smart card command and memory card command, a command argument includes access area designation information (address to access) and verification data for authentication. However, as described above, command argument 402 of the data read command is fixed in size and 32 bits, and therefore, when the size of verification data for authentication is increased to improve the security, the access area designation information is decreased in length, and an accessible area is limited. Meanwhile, when the size of verification data is decreased, the degree of security is decreased.

When the conventional format of data read command is changed to solve this problem, there is a risk for disabling access to conventional memory cards.

Further, when different commands exist, the conventional data read command and data read command for a memory card provided with a security protection area, the need arises for a terminal to switch between commands according to the type of a memory card, access to memory cards is thus complicated, and the cards become hard to use to terminals. Therefore, it is necessary to separately define a command to transmit verification data and a memory card command to read or write data, and gain access to a security protection area combining two commands, but it is not possible to verify the identity of command issuers between two commands.

DISCLOSURE OF INVENTION

The present invention is to solve these problems by using a two-stage command constitution where a memory card command typified by the aforementioned data read command is used in gaining access to an area not set for access restriction in a memory card, while with respect to a security protection area set for access restriction, access area designation information is first transmitted to the memory card using a memory card command for designating an access area, the memory card is then given a memory card command for read or write of the security protection area including key information which is shared between a host and the memory card beforehand, or using flexible authentication processing using a smart card command, and verification data for authentication generated using the access area designation information, and data is thereby written or read in/from the security protection area. It is thus an object of the present invention to provide an access method enabling access to the security protection area without the need for changing the format of the memory card command while not reducing security even with few command argument.

According to a first aspect of the present invention, an access method is a method for an apparatus to gain access to a memory device, and has the steps in the apparatus of transmitting designation information for designating an access area of the memory device, and transmitting together a processing command for the access area and verification information on the designation information, and the steps in the memory device of receiving the designation information, further receiving the processing command and the verification information to verify the designation information using the verification information, and executing the processing command when verification succeeds.

According to the aspect of the invention, by dividing a command for access area designation and a command for security protection area access, and adding verification data to the command for security protection area access, a memory device can verify the identity of a device application having specified the access area, a device application having issued the command for security protection area access, and a device application that holds a verification key shared with a memory card, i.e., having right to access the security protected area. Furthermore, regarding memory access, by using a two-stage command constitution, i.e., a command for access area designation and a command for security protection area access, while command complexity is avoided by using conventional memory card commands, even with only few command argument, without reducing security, access to the security protected area is enabled.

According to a second aspect of the present invention, an access method is a method for an apparatus to gain access to a memory device, and has the steps in the apparatus of sharing with the memory device enabled area information on an access enabled area of the memory device, referring to the enabled area information to transmit designation information for designating an access area of the memory device, and transmitting together a processing command for the access area and verification information on the designation information, and the steps in the memory device of receiving the designation information, further receiving the processing command and the verification information to verify the designation information using the verification information, and executing the processing command when verification succeeds.

According to the aspect of the invention, whether access by a security protected area access command is enabled or disabled can be explicitly set to each area in a security protected area.

According to a third aspect of the present invention, an access method is a method for an apparatus to gain access to a memory device, and has the steps in the apparatus of sharing a verification key with the memory device, transmitting designation information for designating an access area of the memory device, and transmitting together a processing command for the access area and verification data obtained by encrypting verification information on the designation information using the verification key, and the steps in the memory device of receiving the designation information, further receiving the processing command and the verification data to verify the designation information using the verification data and the verification key, and executing the processing command when verification succeeds.

According to the aspect of the invention, by updating a verification key where needed, security intensity can be enhanced.

According to a fourth aspect of the present invention, an access method is a method for an apparatus to gain access to a memory device, and has the steps in the apparatus of sharing with the memory device enabled area information on an access enabled area of the memory device, further sharing with the memory device a verification key corresponding to the access enabled area, referring to the enabled area information to transmit designation information for designating an access area of the memory device, and transmitting together a processing command for the access area and verification data obtained by encrypting verification information on the designation information using the verification key, and the steps in the memory device of receiving the designation information, further receiving the processing command and the verification data to verify the designation information using the verification data and the verification key, and executing the processing command when verification succeeds.

According to the aspect of the invention, when access is not made to an area where only the device can read and write, access by a security protected area access command can be disabled, and thus security intensity can be enhanced. By updating a verification key where needed, security intensity can be enhanced.

According to a fifth aspect of the present invention, an access method is a method for an apparatus to gain access to a memory device, and has the steps in the apparatus of sharing with the memory device enabled area information on an access enabled area of the memory device using a first processing series command, referring to the enabled area information to transmit designation information for designating an access area of the memory device using a second processing series command, and transmitting together a processing command for the access area and verification information on the designation information using the second processing series command, and the steps in the memory device of receiving the designation information, further receiving the processing command and the verification information to verify the designation information using the verification information, and executing the processing command when verification succeeds.

According to the aspect the invention, sharing of information on an accessible area can be divided by command protocol that is different from a command for access area designation and a command for security protection area access, and thus a memory device can verify the identity of a device application having specified the access areas, a device application having issued the command for security protection area access, and a device application having right to access the security protected area.

According to a sixth aspect of the present invention, an access method is a method for an apparatus to gain access to a memory device, and has the steps in the apparatus of sharing a verification key with the memory device using a first processing series command, transmitting designation information for designating an access area of the memory device using a second processing series command, and transmitting together, using the second processing series command, a processing command for the access area and verification data obtained by encrypting verification information on the designation information using the verification key, and the steps in the memory device of receiving the designation information, further receiving the processing command and the verification data to verify the designation information using the verification data and the verification key, and executing the processing command when verification succeeds.

According to the aspect of the invention, a verification key sharing process can be divided by command protocol that is different from a command for security protection area access and by updating a verification key restricted to that area, security intensity can be more enhanced.

According to a seventh aspect of the present invention, an access method is a method for an apparatus to gain access to a memory device, where the memory device has a first area with tamper resistance restricting access from the apparatus, a second area with non-tamper resistance restricting access from the apparatus, and a third area enabling access from the apparatus, and further has the function of distinguishing between at least a first processing series command that is a processing command for the first area and at least a second processing series command that is a processing command for the third area, and the method has the steps in the apparatus of sharing with the memory device enabled area information on an access enabled area of the memory device using the first processing series command, referring to the enabled area information to transmit designation information for designating an access area of the second area using the second processing series command, and transmitting together a processing command for the access area and verification information on the designation information using the second processing series command, and the steps in the memory device of receiving the designation information, further receiving the processing command and the verification information to verify the designation information using the verification information, and executing the processing command when verification succeeds.

According to the aspect of the invention, an access-enabling setting that is necessary for access to an area with non-tamper resistance is performed by the discretion of a area with tamper-resistance, and read and write of data are performed using commands suitable for the area with non-tamper resistance, whereby both flexibility of security and read and write performance can be achieved.

According to an eighth aspect of the present invention, an access method is a method for an apparatus to gain access to a memory device, where the memory device has a first area with tamper resistance restricting access from the apparatus, a second area with non-tamper resistance restricting access from the apparatus, and a third area enabling access from the apparatus, and further has the function of distinguishing between at least a first processing series command that is a processing command for the first area and at least a second processing series command that is a processing command for the third area, and the method has the steps in the apparatus of sharing a verification key with the memory device using the first processing series command, transmitting designation information for designating an access area of the second area using the second processing series command, and transmitting together, using the second processing series command, a processing command for the access area and verification data obtained by encrypting verification information on the designation information using the verification key, and the steps in the memory device of receiving the designation information, further receiving the processing command and the verification data to verify, the designation information using the verification data and the verification key, and executing the processing command when verification succeeds.

According to the aspect of the invention, an access-enabling setting that is necessary for access to a area with non-tamper resistance and verification key sharing are performed by the discretion of a area with tamper-resistance, and read and write of data are performed using commands suitable for the area with non-tamper resistance, whereby both flexibility of security and read and write performance can be achieved.

According to a ninth aspect of the present invention, a memory device is a memory device read or written by an apparatus, and has a processing command receiving section that receives designation information for designating an area to access, while receiving together verification information based on the designation information and a command for read or write, a designation information verifying section that performs verification processing on the designation information using the verification information, a storage area that stores data, a storage area access section that performs read or write from/in the designated area of the storage area corresponding to the command for processing when the verification processing succeeds, a data transmitting section that transmits data read by the storage area access section to the apparatus, and a data receiving section that receives data to write from the apparatus.

According to the aspect of the invention, even when a command for access area designation is different from a command for accessing a memory, it is possible to verify that the two commands are transmitted from the same terminal.

A tenth aspect of the invention is directed to a memory device such that in the memory device of the ninth invention the verification process of the designation information verifying section is performed using the verification information and a verification key.

According to the aspect of the invention, by using a key, authentication of a terminal using shared secret information with the terminal can be performed.

An eleventh aspect of the invention is directed to a memory device such that the memory device of the tenth invention further comprises verification key sharing section for sharing the verification key with the device.

According to the aspect of the invention, by updating a verification key where needed, security intensity can be enhanced.

A twelfth aspect of the invention is directed to a memory device such that the memory device of the ninth invention further comprises enabled area information sharing section for sharing enabled area information with the device, the enabled area information indicating an area accessible to the memory device.

According to the aspect of the invention, whether access by a security protected area access command is enabled or disabled can be explicitly set to each area in a security protected area.

According to a thirteenth aspect of the present invention, an information apparatus is an information apparatus that reads and writes a memory device, and has a designation information determining section which determines an area to read or write, and further determines designation information for designating the area, a verification information generating section that performs processing for generating verification information from the designation information, a processing command transmitting section that transmits the designation information, while transmitting together the verification information and a processing command for read or write, a data transmitting section that transmits data to the memory device when the processing command is of write, a data receiving section that receives data from the memory device when the processing command is of read, and a data storage section that stores the data to transmit to the memory device, while storing the data received from the memory device.

According to the aspect of the invention, data stored in a security protected area of a memory card can be read and written.

A fourteenth aspect of the invention is directed to an information device such that in the information device of the thirteenth invention the verification information generation process of the Verification information generating section is performed using the specification information and a verification key.

According to the aspect of the invention, by performing verification using a key supplied in secret with a card, data can be stored in an area where read or write cannot be performed by any other device than the information device.

A fifteenth aspect of the invention is directed to an information device such that the information device of the fourteenth invention further comprises a verification key sharing section for sharing the verification key with the memory device.

According to the aspect of the invention, by updating a verification key where needed, security intensity can be enhanced.

A sixteenth aspect of the invention is directed to an information device such that the information device of the thirteenth invention further comprises an enabled area information sharing section for sharing enabled area information with the memory device, the enabled area information indicating an area accessible to the memory device.

According to the aspect of the invention, when access is not made to an area where only the information device can read and write, access by a security protected area access command can be disabled, and thus security intensity can be enhanced.

According to a seventeenth aspect of the present invention, an access method is a method for an apparatus to gain access to a memory device, and has the steps in the apparatus of transmitting designation information for designating an access area of the memory device, and transmitting together a processing command for the access area and verification data obtained by encrypting verification information on the designation information using a verification key, and the steps in the memory device of receiving the designation information, further receiving the processing command and the verification data to verify the designation information using the verification data and the verification key, and executing the processing command when verification succeeds.

According to the aspect of the invention, by performing verification using a verification key shared between a device and a memory device, access can be allowed only to the device having right to access.

According to an eighteenth aspect of the present invention, an access method is a method for an apparatus to gain access to a memory device, and has the steps in the apparatus of sharing enabled area information on an access enabled area of the memory device using a first processing series command, further sharing a verification key corresponding to the access enabled area using the first processing series command, transmitting designation information for designating an access area of the memory device using a second processing series command, and transmitting together, using the second processing series command, a processing command for the access area and verification data obtained by encrypting verification information on the designation information using the verification key, and the steps in the memory device of receiving the designation information, further receiving the processing command and the verification data to verify the designation information using the verification data and the verification key, and executing the processing command when verification succeeds.

According to the aspect of the invention, by validating access by a security protected area access command to an area in a security protected area and updating a verification key limited to that area, security intensity can be more enhanced.

According to a nineteenth aspect of the present invention, an access method is a method for an apparatus to gain access to a memory device, where the memory device has a first area with tamper resistance restricting access from the apparatus, a second area with a large capacity and non-tamper resistance restricting access from the apparatus, and a third area with a large capacity enabling access from the apparatus, and further has the function of distinguishing between at least a first processing series command that is a processing command for the first area and at least a second processing series command that is a processing command for the third area, and the method has the steps in the apparatus of sharing with the memory device enabled area information on an access enabled area of the memory device using the first processing series command, further sharing a verification key corresponding to the access enabled area using the first processing series command, transmitting designation information for designating an access area of the second area using the second processing series command, and transmitting together, using the second processing series command, a processing command for the access area and verification data obtained by encrypting verification information on the designation information using the verification key, and the steps in the memory device of receiving the designation information, further receiving the processing command and the verification data to verify the designation information using the verification data and the verification key, and executing the processing command when verification succeeds.

According to the aspect of the invention, an access-enabling setting that is necessary for access to a area with non-tamper resistance and verification key sharing are performed by the discretion of a area with tamper-resistance, and read and write of data are performed using commands suitable for a large capacity area, whereby both flexibility of security and read and write performance can be achieved.

Advantageous Effect of the Invention

According to the present invention, by dividing a command for access area designation and a command for security protection area access, and adding verification data to the command for security protection area access, a card can verify the identity of a terminal application having specified the access area, a terminal application having issued the command for security protection area access, and a terminal application that holds a verification key shared with the memory card, i.e., having right to access the security protected area. Furthermore, regarding memory access, by using a two-stage command constitution, i.e., a command for access area designation and a command for security protection area access, while command complexity is avoided by using conventional memory card commands, even with only few command argument, without reducing security, access to the security protected area is enabled.

BRIEF DESCRIPTION OF DRAWINGS

FIG. 22 is a diagram illustrating the access area designation information of an access area designation command according to the first embodiment of the present invention;

FIG. 46 is a diagram illustrating an example of an access valid table according to the third embodiment of the present invention; and FIG. 47 is a diagram illustrating an example of an access valid table according to the first embodiment of the present invention.

BEST MODE FOR CARRYING OUT THE INVENTION

Embodiments of the present invention will specifically be described below with reference to accompanying drawings. In addition, the present invention is not limited to the embodiments, and is capable of being carried into practice with various modifications thereof without departing from subject matters thereof.

FIRST EMBODIMENT

Figure 1:
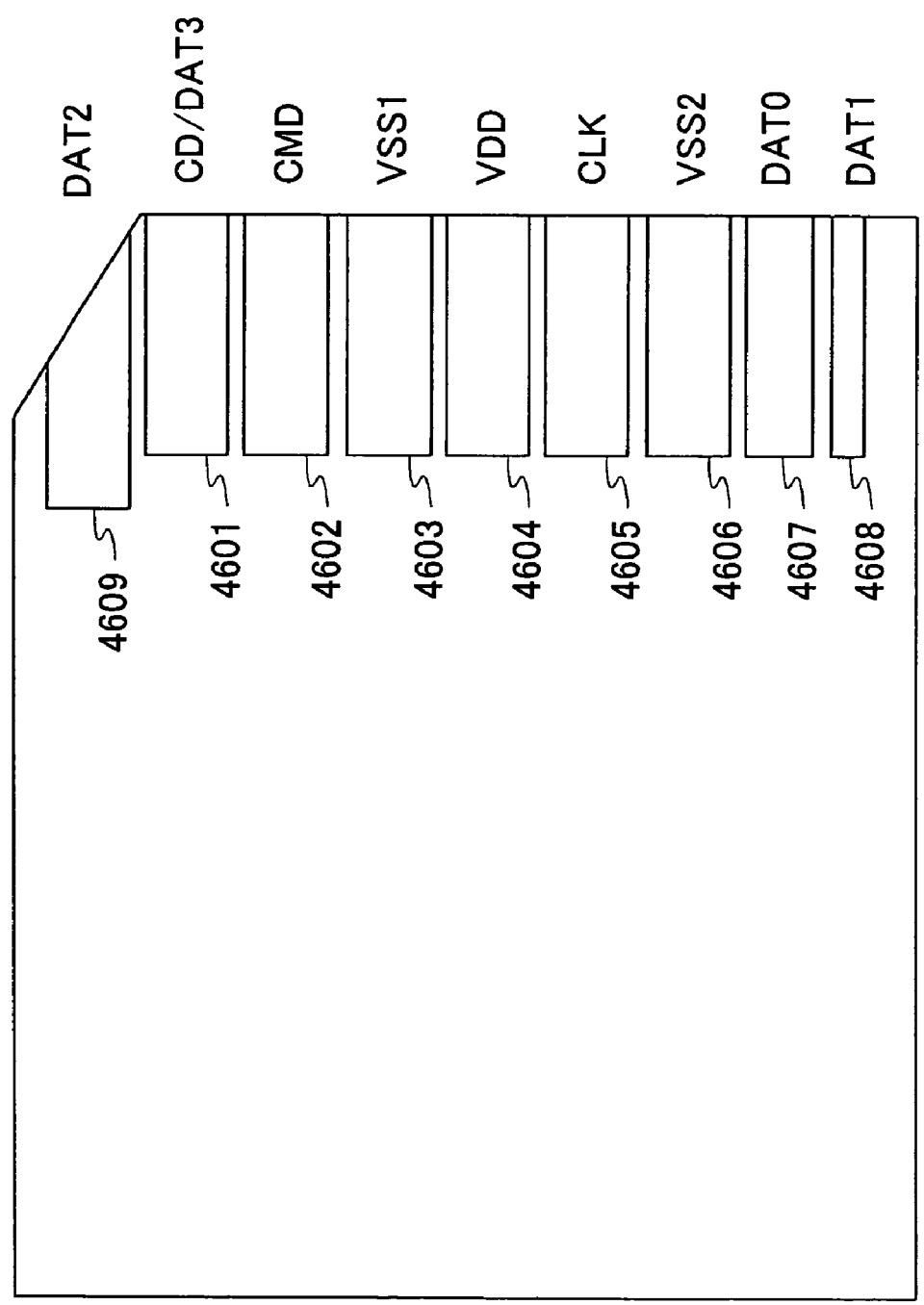
FIG. 1 is a diagram illustrating a terminal configuration of a conventional memory card.

An intra-card module structure in the present invention will be described below with reference to FIG. 3. In addition, a terminal configuration of card 100 is as shown in FIG. 4, where reference numerals assigned to terminals are different from those in FIG. 1, but the configuration is the same as in FIG. 1, and therefore, descriptions thereof are omitted.

The intra-card module is comprised of controller 106 and flash memory 105. Controller 106 is comprised of command receiving section 101 which is connected to the CMD line and performs command reception and response transmission, data transmitting/receiving section 102 which is connected to the DAT line, encrypting/decrypting section 107 which performs encryption/decryption processing on data transmitted/received in data transmitting/receiving section 102 using a session key, or encrypts or decrypts the data using a flash memory storage key to provide or receive the data to/from memory access section 104, memory access section 104 that reads or writes data from/in flash memory 105, data control section 103 that makes a processing request in response to a received command to memory access section 104, session key sharing section 110, parameter verifying section 108, and encrypting/decrypting section 107, parameter storage section 109 that stores a parameter to gain access to a security protection area received from terminal 200, parameter verifying section 108 that verifies the validity of the parameter, session key sharing section 110 that exchanges session keys for authentication and encryption/decryption with terminal 200, and area/session key managing section 111 that stores session keys and security protection areas associated with the session keys.

Figure 5:
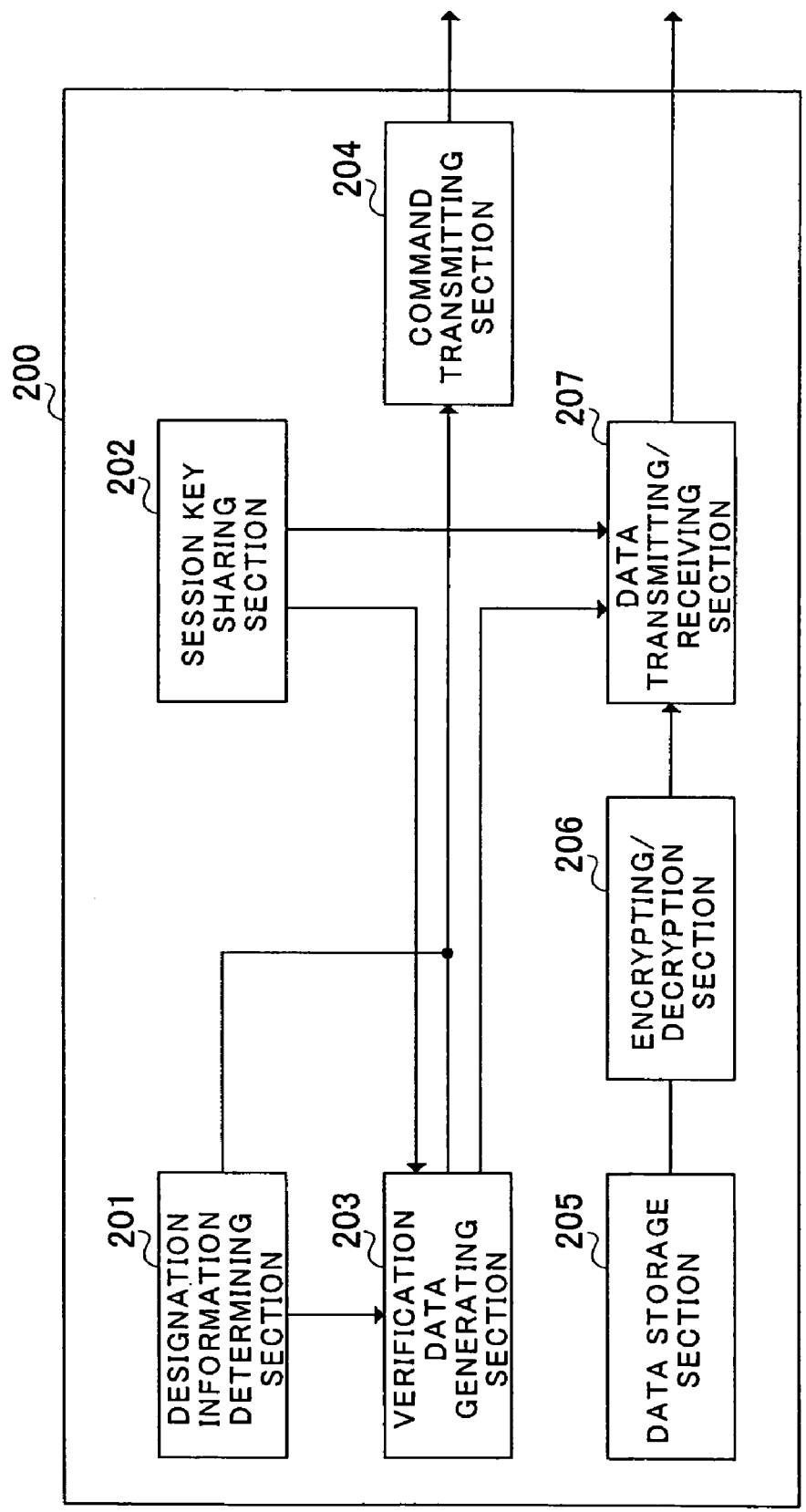
FIG. 5 is a diagram illustrating an internal configuration of a terminal according to the first embodiment of the present invention.

A configuration of terminal 200 in the first embodiment will be described below with reference to FIG. 5.

Terminal 200 is provided with command transmitting section 204 that transmits a memory card command to card 100, data transmitting/receiving section 207 that transmits data to the DAT line of card 100, encrypting/decrypting section 206 that encrypts and decrypts data respectively transmitted or received in data transmitting/receiving section 207, session key sharing section 202 that performs processing for sharing a session key with card 100, designation information determining section 201 which determines an area to access by security protection area access command, and generates area designation information, verification data generating section 203 that generates verification data from the area designation information and the session key, and data storage section 205 that stores data to transmit and received data.

The outline of processing performed between card 100 in FIG. 3 and terminal 200 in FIG. 5 will be described below with reference to FIG. 6.

Figure 6:
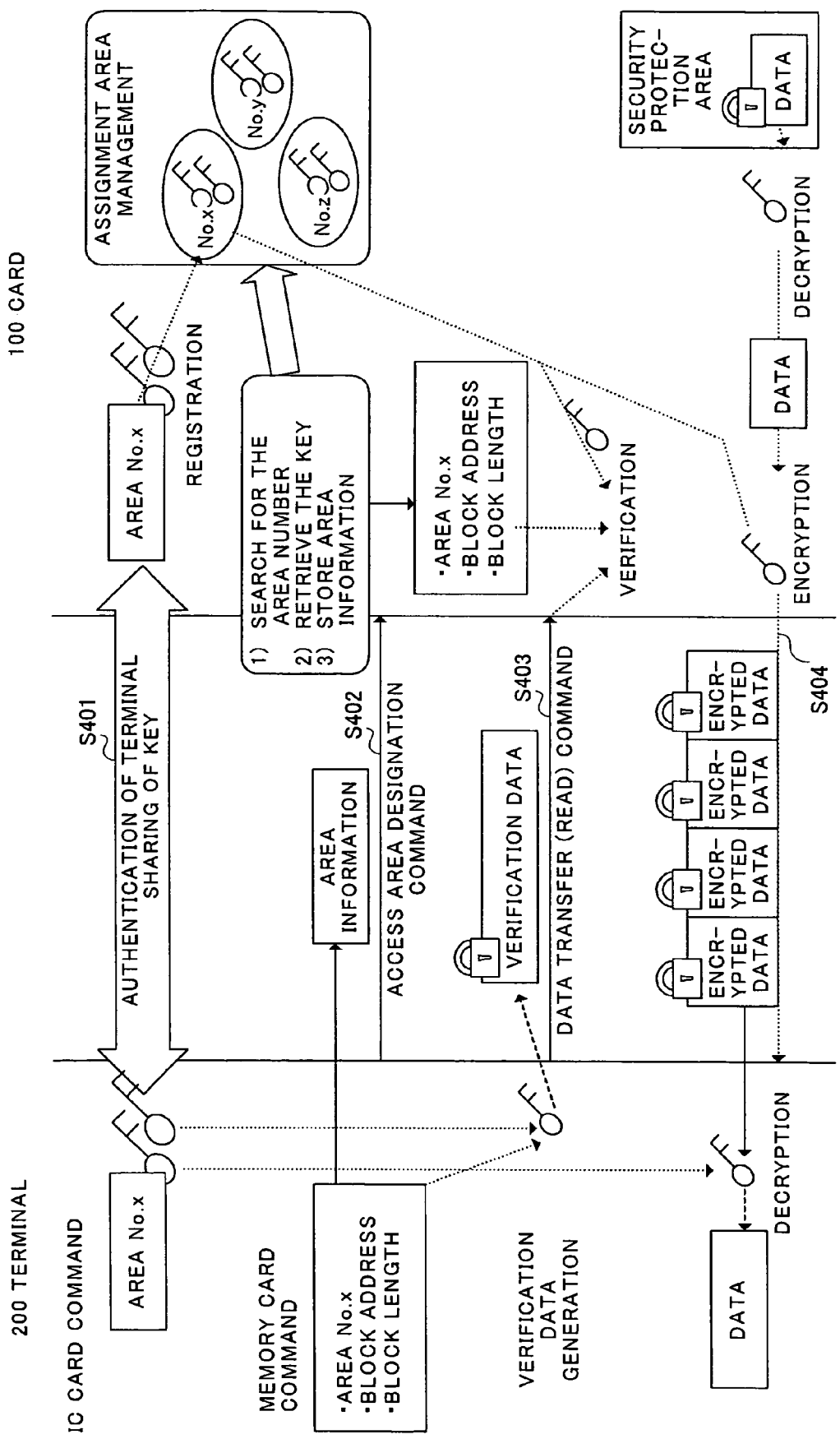
FIG. 6 is a diagram illustrating an outline of processing performed between the card and the terminal according to the first embodiment of the present invention.

In FIG. 6, first, as processing using a card 100 smart card command between terminal 200 and card 100, terminal 200 and card 100 perform authentication processing to authenticate each other, session key sharing processing to share a session key, and area number assignment processing for terminal 200 to assign an area number (No.x in the figure) in an access enabled area of memory in card 100 (step S401).

After performing the authentication processing and mutually confirming the validity, the key sharing processing and the area number assignment processing is carried out, and as a result, terminal 200 and card 100 hold session keys for verification and encryption enabling access to a security protection area indicated by area No.x associated with the area number (area No.x)

Next, as processing using a memory card command between terminal 200 and card 100, terminal 200 performs processing for transmitting an access area designation command (step S402) and transmitting a data transfer command (step S403) to card 100, and card 100 performs processing for transmitting encrypted data to terminal 200 (step S404).

In the processing for transmitting an access area designation command, in order to designate an area in the security protection area to access, terminal 200 transmits to card 100 the access area designation command including data set for area No.x, block address and block length. Card 100 performs processing for verifying permission of access to the security protection area based on area No.x extracted from the received access area designation command.

In the processing for transmitting a data transfer command, terminal 200 generates verification data using the area No.x, block address, block length, and the verification key shared with card 100 in step S401, and transmits a data transfer (Read) command including the verification data to card 100. Card 100 checks the received transfer (Read) command to confirm that the verification data is generated based on the area No.x, block address and block length using a public key of the verification key shared with terminal 200, and thereby verifies permission of access to the security protection area designated in step S402.

In the processing for transmitting encrypted data, card 100 encrypts data stored in the area No.x corresponding to a card application to which access is permitted in the verification processing, using the encryption key shared with terminal 200, and transmits the encrypted data to terminal 200.

Outlines and procedures of the aforementioned processing will be described below more specifically.

A mode of commands communicated between terminal 200 and session key sharing section 110 is assumed to conform to the APDU format used in general smart cards. In other words, session key sharing section 110 adopts a mode of a smart card application.

A method of transmitting and receiving APDU will be described below with reference to a sequence diagram of FIG. 7.

Described first is processing for terminal 200 to transmit command APDU to card 100. Herein, the command APDU is for terminal 200 to transmit to a memory card a command in APDU format to execute on the memory card side. Specifically, a smart card command is used.

Figure 2:
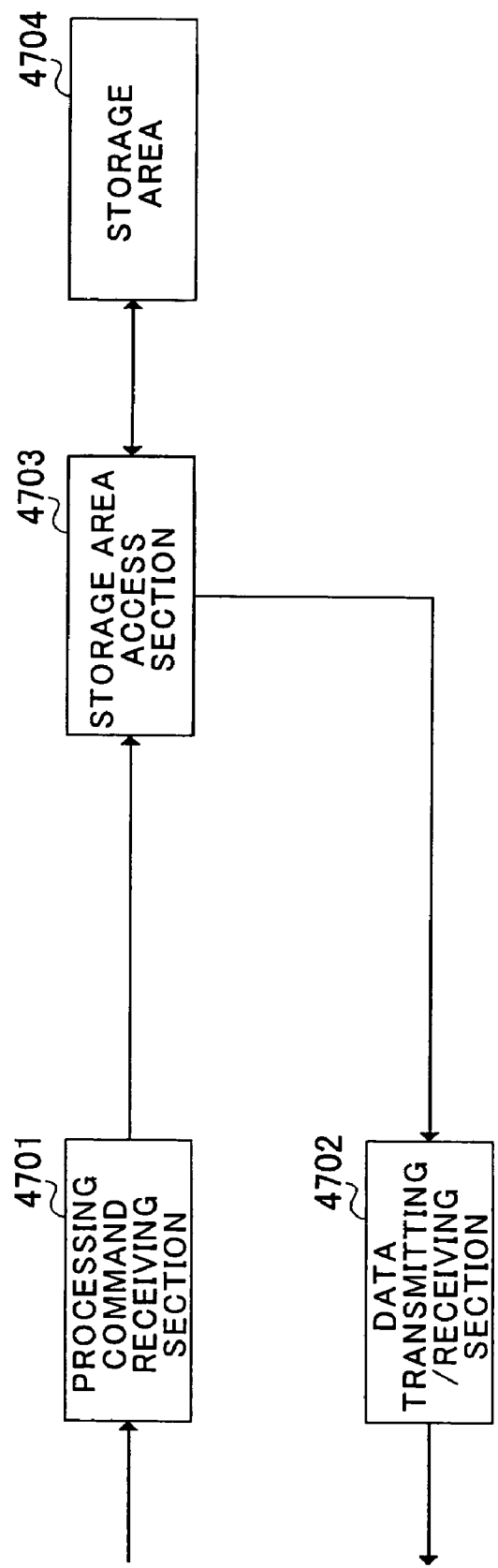
FIG. 2 is an internal module structure of the conventional card.

Terminal 200 generates command APDU to transmit to session key sharing section 110, and then, transmits an APDU transmission command to CMD line 22 of card 100 in FIG. 2 (step S501).

Figure 7:
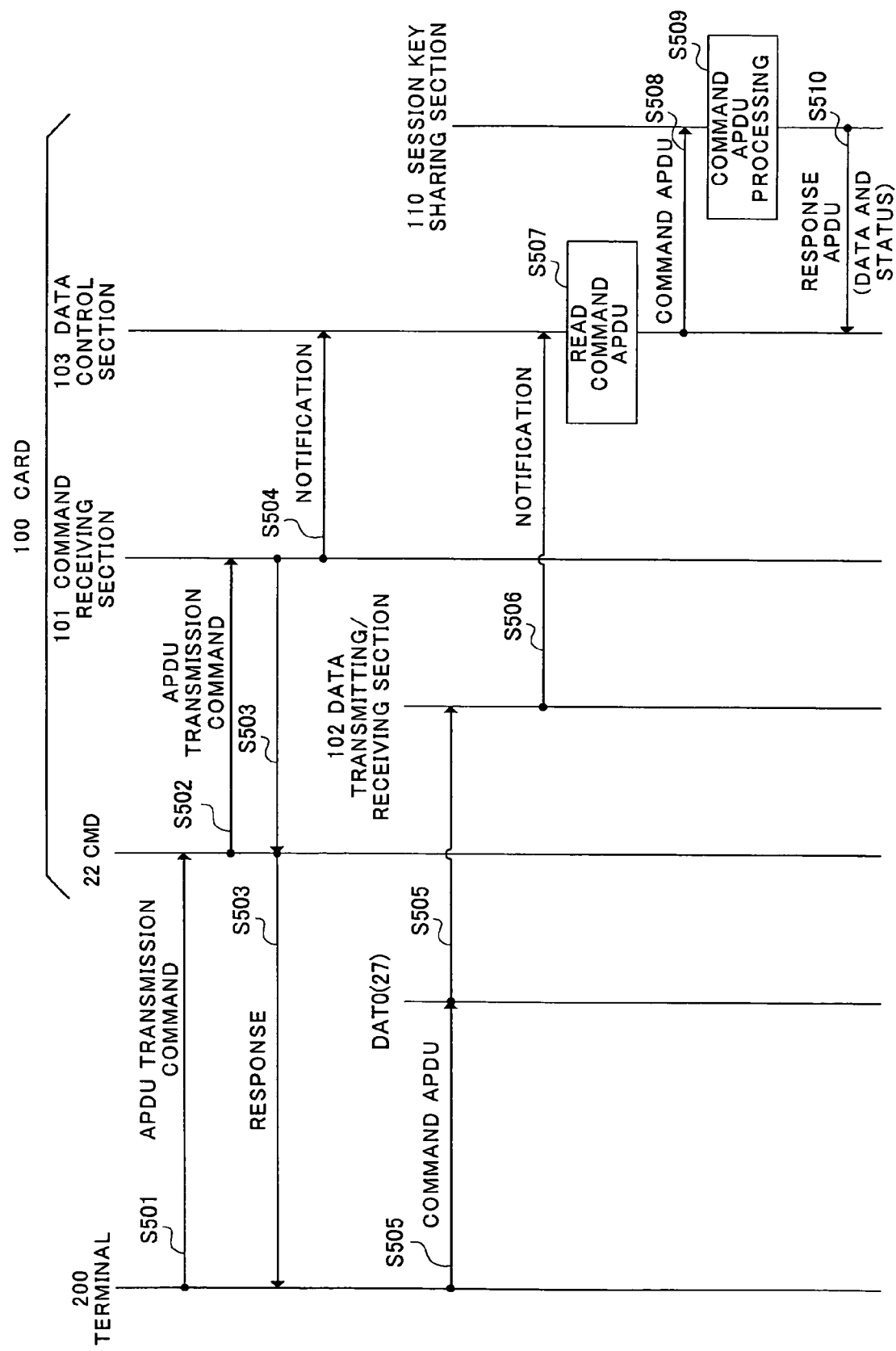
FIG. 7 is a diagram illustrating a sequence of a method of transmitting and receiving APDU according to the first embodiment of the present invention.

The APDU transmission command has a format as shown in FIG. 7 the same as in the conventional data read command, and is comprised of command code 401 with 6 bits and command argument 402 with 32 bits.

Figure 18:
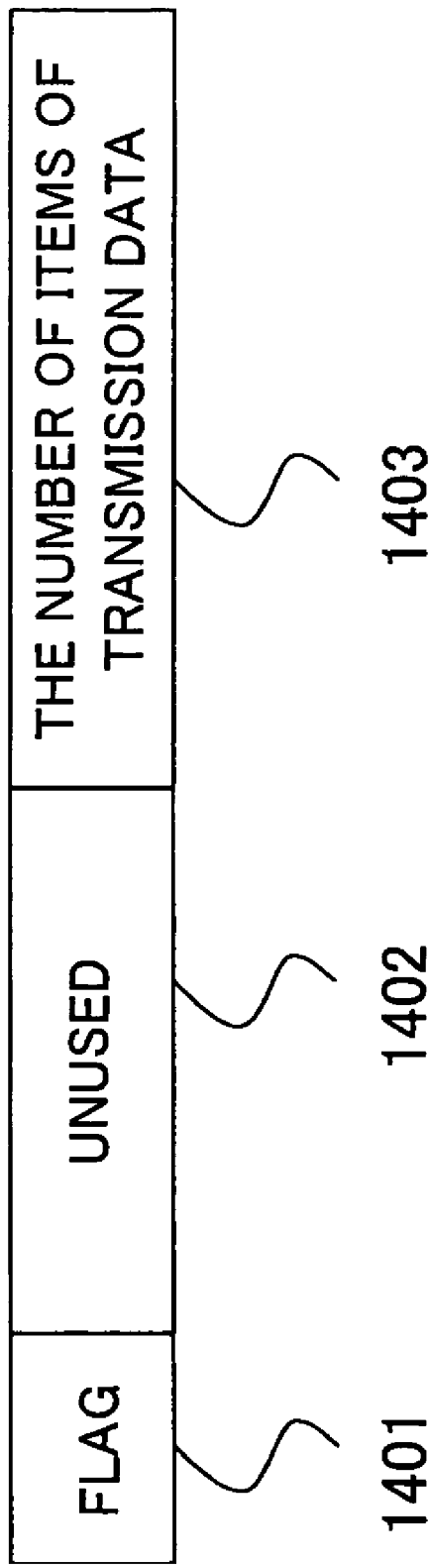
FIG. 18 is a diagram illustrating an argument format of an APDU transmission command according to the first embodiment of the present invention.

As shown in FIG. 18, command argument 402 in the APDU transmission command is comprised of flag 1401 indicating that data input to DAT0 line 27 is command APDU and 1403 indicative of the number of items of transmission data. When the number of bits contained in flag 1401 and number-of-transmission data 1403 is less than 32 bits, unused field 1402 exists.

Data is input to DAT0 line 27 in FIG. 4 on a 512-byte basis, and number-of-transmission data 1403 indicates the number of times unit data of 512 bytes is input.

Command receiving section 101 of card 100 receives the command transmitted from terminal 200 (step S502), recognizes that the command is an APDU transmission command, transmits a response to terminal 200 via CMD line 22 (step S503), and notifies data control section 103 of reception of the APDU transmission command (step S504).

Figure 20:
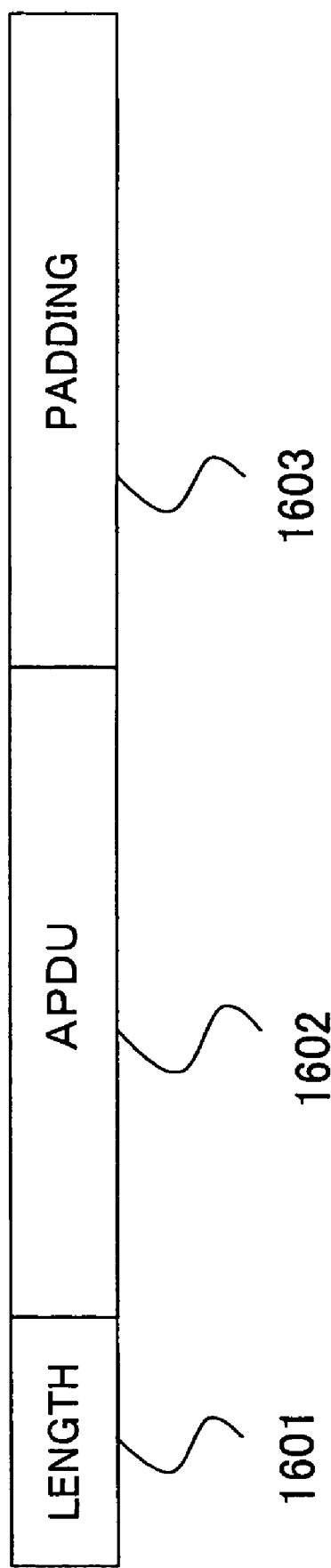
FIG. 20 is a diagram illustrating a format of input data of the APDU transmission command and output data of the APDU reception command according to the first embodiment of the present invention.

Terminal 200 receives the response to the APDU transmission command from CMD line 22 of card 100 (step S503), and inputs command APDU 1602 in the format as shown in FIG. 20 to DAT0 line 27 (step S505).

In FIG. 20, a length shown by "1601" indicates a length of subsequent APDU 1602. Number-of-transmission data 1403 of the command argument is set according to the total length of length field 1601 and APDU 1602. Further, the total length is not always a multiple of 512 bytes, and therefore, padding 1603 is added to obtain a multiple of 512 bytes.

Data transmitting/receiving section 102 in card 100 receives the command APDU input to DAT0 line 27 from terminal 200 (step S505), and notifies data control section 103 of reception of the command APDU (step S506). Data control section 103 reads the command APDU from data transmitting/receiving section 102 (step S507), and provides the command APDU to session key sharing section 110 (smart card application) (step S508).

Session key sharing section 110 performs processing as described in the command APDU (step S509), and provides generated data and status information resulting from the processing to data control section 103 as response APDU (step S510). The status information is a status word defined in ISO 7816, and has a value of 2 bytes indicating whether the processing is finished normally or abnormally.

Figure 8:
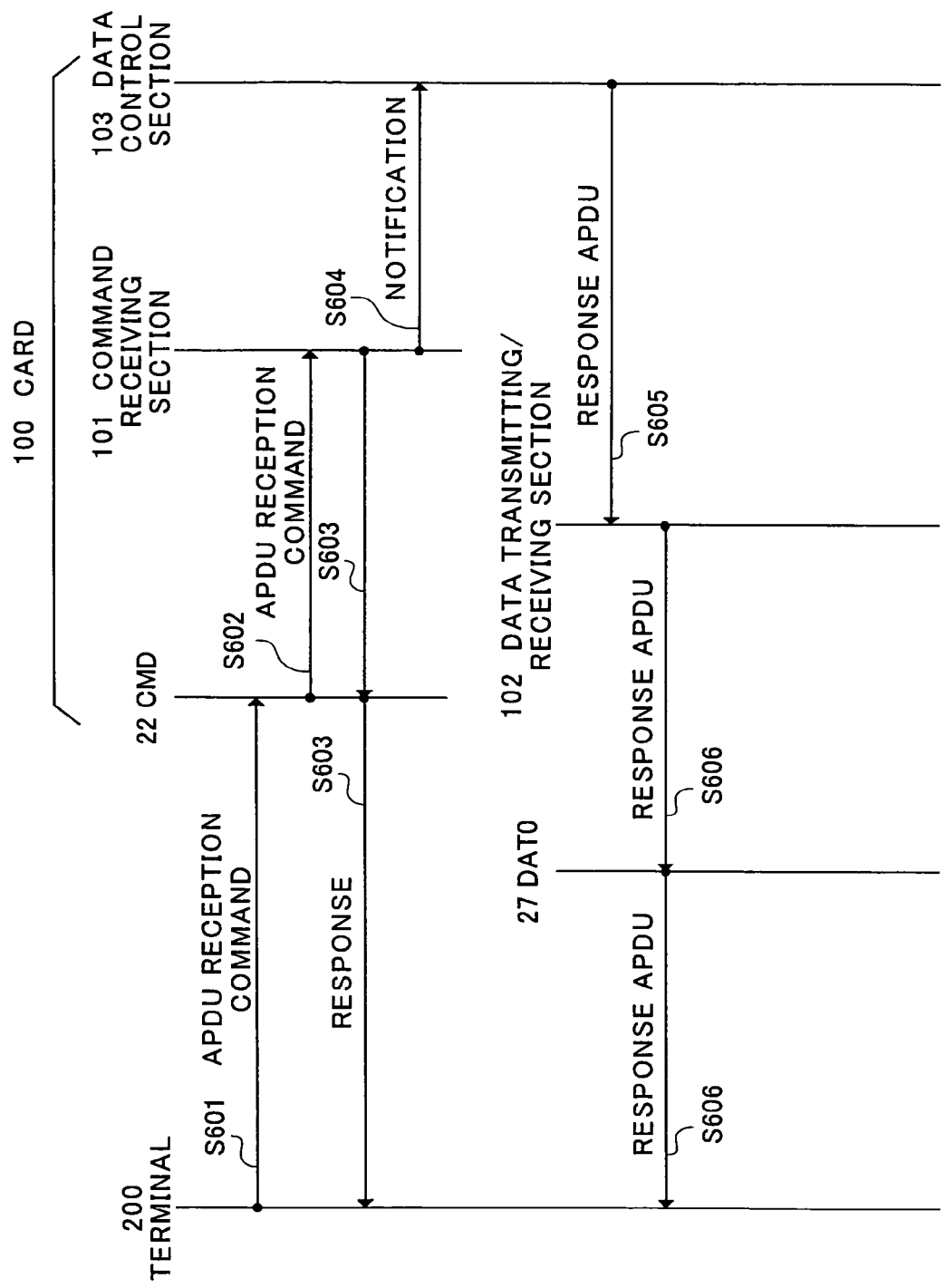
FIG. 8 is a diagram illustrating a sequence of processing for transmitting response APDU according to the first embodiment of the present invention.

Processing for card 100 to transmit the response APDU to terminal 200 will be described below with reference to a sequence diagram in FIG. 8. Herein, the response APDU is for card 100 to transmit a processing result of the command APDU executed in card 100 to terminal 200.

Herein, as shown in the method of transmitting the command APDU, it is assumed that data control section 103 holds the response APDU output from session key sharing section 110.

Figure 9:
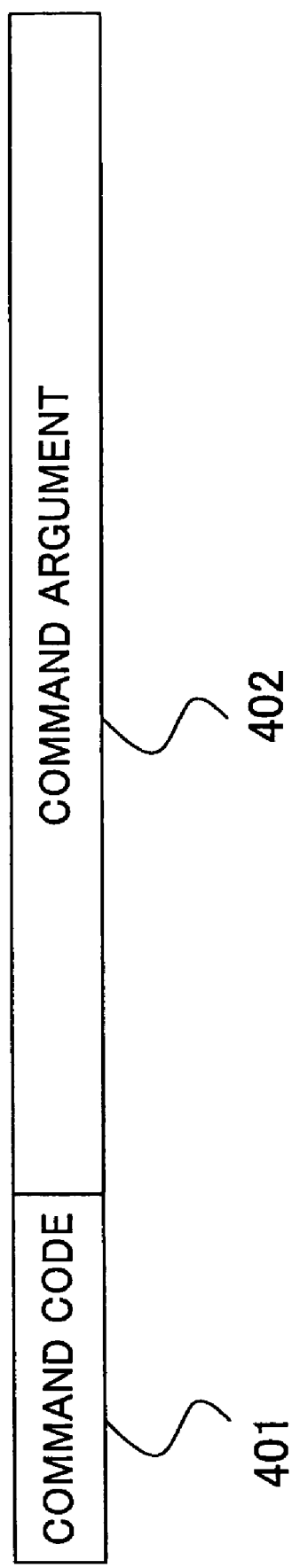
FIG. 9 is a diagram illustrating a command formation of the memory card according to the first embodiment of the present invention.

Terminal 200 transmits an APDU reception command to CMD line 22 of card 100 (step S601). In the same way as in the APDU transmission command, the APDU reception command has a format as shown in FIG. 9 as in the conventional data read command, and is comprised of command code 401 with 6 bits and command argument 402 with 32 bits.

Figure 19:
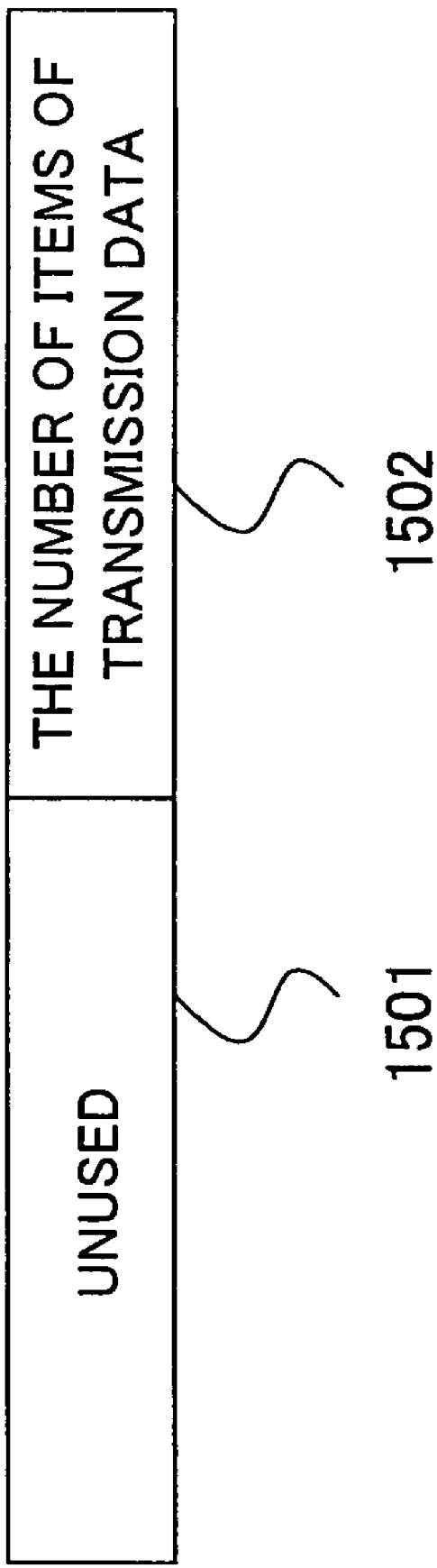
FIG. 19 is a diagram illustrating an argument format of an APDU reception command according to the first embodiment of the present invention.

As shown in FIG. 19, command argument 402 in the APDU reception command is comprised of unused field 1501 and number-of-transmission data 1502. When number-of-transmission data 1502 is less than 32 bits, unused field 1501 exists.

Data is output from DAT0 terminal 27 in FIG. 4 on a 512-byte basis as in input data in the APDU transmission command, and number-of-transmission data 1502 indicates the number of times unit data of 512 bytes is output.

Command receiving section 101 of card 100 receives a command transmitted from terminal 200 (step S602), recognizes that the command is an APDU reception command, transmits a response to terminal 200 via CMD line 22 (step S603), and notifies data control section 103 of reception of the APDU reception command (step S604).

Data control section 103 provides the response APDU received from session key sharing section 110 to data transmitting/receiving section 102 (step S605).

Terminal 200 receives the response to the APDU reception command from CMD line 22 of card 100 (step S603), and reads the response APDU from data transmitting/receiving section 102 via DAT0 line 27 (step S606). The read response APDU is output in the format as shown in FIG. 20. Details of each field are the same as the input of an APDU transmission command, and descriptions thereof are omitted.

Figure 10:
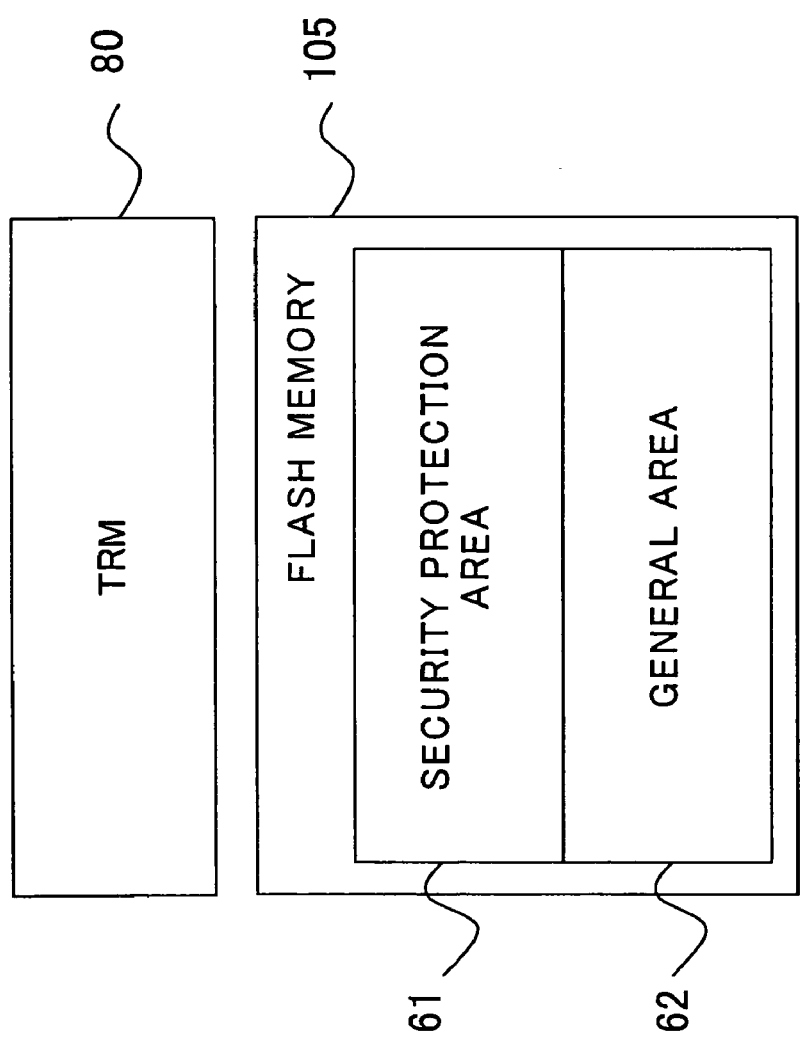
FIG. 10 is a diagram illustrating an internal structure of flash memory according to the first embodiment of the present invention.

As shown in FIG. 10, flash memory 105 mounted on card 100 has at least general area (non-tamper resistant memory area) 62 enabling terminal 200 to gain access thereto using a memory card command typified by a conventional read command and write command, and security protection area (tamper resistant memory area) 61 blocking access thereto using the conventional command. Further, as shown in FIG. 10, card 100 has tamper resistant module (TRM) 80 enabling access thereto using a smart card command.

Security protection area 61 is generally accessible only from a card application, and command receiving section 101 eliminates access to the area 61 using the conventional read command or write command from terminal 200.

Figure 11:
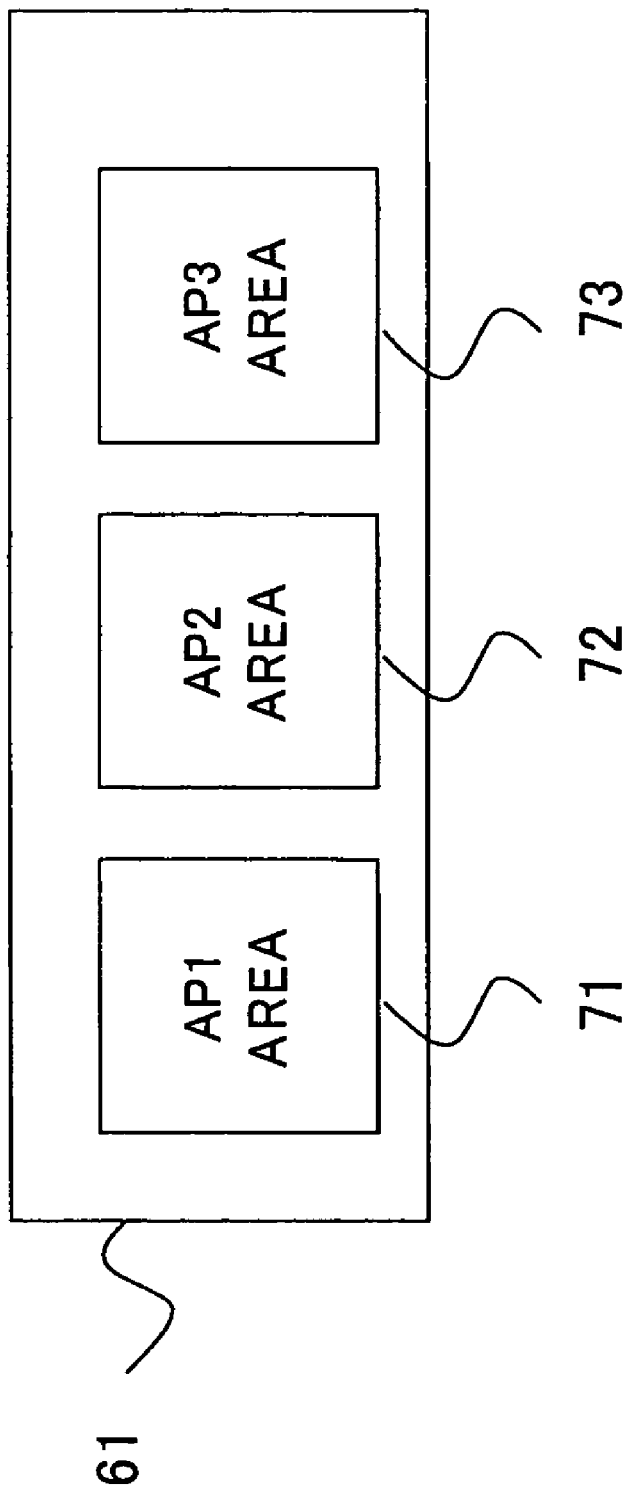
FIG. 11 is a diagram illustrating an internal structure of a security protection area according to the first embodiment of the present invention.

The memory card in the present invention is capable of having a plurality of card applications inside the card, and as shown in FIG. 11, in security protection area 61, it is possible to assign an individual area (AP1 area 71, AP2 area 72 or AP3 area 73) to each application.

Security protection area 61 is encrypted using a storage encryption key (Ks) managed by data control section 103. The encryption key may be a single Ks for the entire security protection area 61, or storage encryption keys Ks_1 to Ks_3 may separately be prepared for AP1 area 71 to AP3 area 73 for applications, respectively. In this embodiment, storage encryption keys Ks_1 to Ks_3 are respectively prepared for applications AP1 to AP3.

An internal structure of each of AP1 area 71 to AP3 area 73 for the applications inside security protection area 61 will be described below with reference to FIG. 12.

Area 71 for card application AP1 is herein described as an example. The inside of AP1 area 71 is of data management using a layer structure using directories DIR1 and DIR2, and files FILE1 to FILE3.

Card application AP1 moves between directories in AP1 area 71, and performs read and write on files FILE1 to FILE3 on directories DIR1 and DIR2 where a target file is present.

For example, card application AP1 moves to directory DIR1 in gaining access to file FILE3, and then, moves to directory DIR2 to read and write file FILE3. Further, it is possible to generate or delete a directory or file lower than directory DIR1 or DIR2 respectively in DIR1 and DIR2.

Session key sharing procedures performed between session key sharing section 110 inside card 100 and terminal 200 will be described below with reference to FIGS. 13 to 16.

The card application and terminal 200 each have a pair of a public key and secret key used in public key encryption, and hold each other's public key.

APDU as described earlier is used as a mode of command in the session key sharing procedures. In subsequent explanations, descriptions on the mode of command are omitted, and simply, command APDU or response APDU is described.

Terminal 200 transmits SELECT command APDU, and thereby selects card application AP1 (step S901). SELECT command APDU is command APDU to designate an application in card 100 to transmit a subsequent smart card command (command APDU), and transmitted using an APDU transmission command as in other command APDU.

Card 100 returns response APDU indicative of normal completion when normally completing selection of card application AP1 designated from terminal 200, while returning response APDU indicative of abnormal finish when not completing (step S902).

Terminal 200 next executes processing 903. Briefly, processing 903 is to generate DATA2 enabling access to selected card application AP1. Processing 903 will more specifically be described below with reference to a flowchart in FIG. 14.

Figure 12:
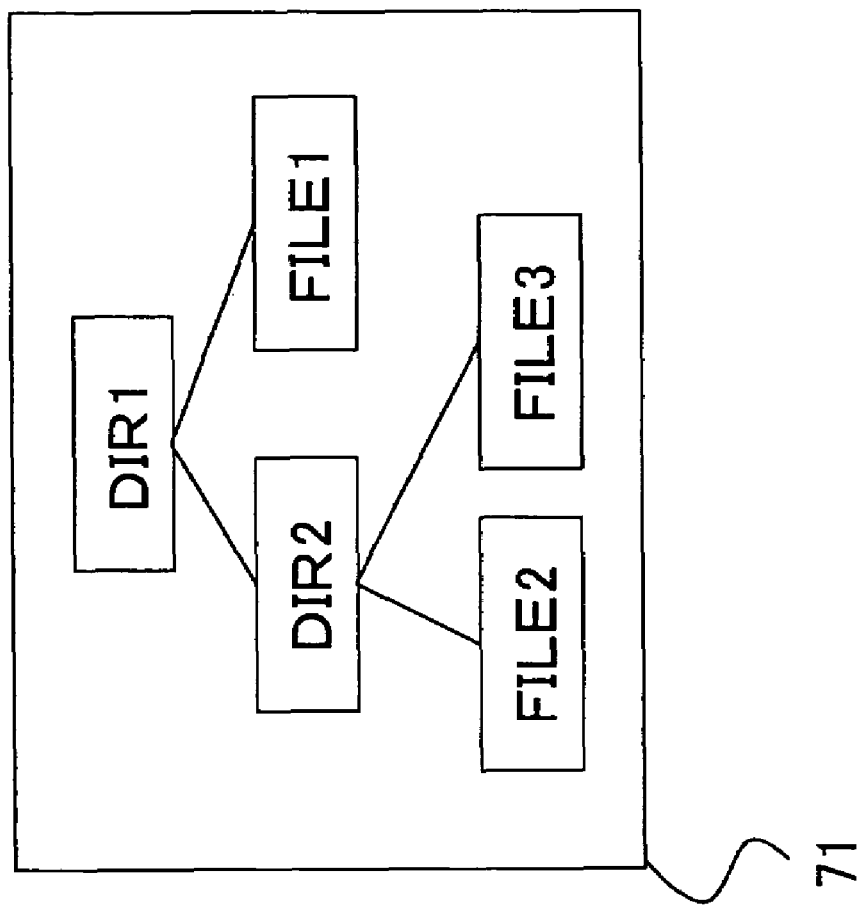
FIG. 12 is a diagram illustrating an internal structure of each application area inside the security protection area according to the first embodiment of the present invention.

Terminal 200 generates random number Rh (step S9031), combines random number Rh and a file name of file FILE3 as shown in FIG. 12 to which terminal 200 desires to gain access, encrypts the resultant by public key PubS corresponding to secret key Pris that card application AP1 holds to generate DATA1 (step S9032), and further combines DATA1 and identifier Info_PubH indicating public key PubH corresponding to secret key PriH that terminal 200 holds to generate DATA2 (step S9033).

Referring to FIG. 13 again, terminal 200 transmits to the card application a REQ_AREA_INFO command including DATA 2 generated in step S9033, to share with the card application the session key and terminal-200 accessible area information (step S904).

Card application AP1 having received the REQ_AREA_INFO command executes processing 905. Processing 905 will specifically be described below with reference to a flowchart in FIG. 15.

Card application AP1 extracts DATA1 from DATA2, decrypts DATA 1 using the secret key PriS that card application AP1 holds, and obtains the random number Rh and file name of the FILE3 (step S9051).

Then, the application AP1 identifies a public key from the DATA2 to extract identifier Info_PubH, and checks whether access to the FILE3 is allowed to terminal 200 associated with the public key PubH indicated by Info_PubH, by referring to setting in access authority of file FILE3. When terminal 200 is not authorized, the application AP1 returns an error indicative thereof to terminal 200 as response APDU. When terminal 200 is authorized to gain access, the application AP1 acquires file size SIZE3 of the FILE3 (step S9052).

The application AP1 generates random number Rs (step S9053), makes registration with access valid table 4500 as shown in FIG. 47 to enable terminal 200 to gain access to file FILE3 using the security protection area access command, assigns to file FILE3 area number X for use by terminal 200 to gain access using the security protection area access command, and stores the area number and file size SIZE3 in area/session key managing section 111 (step S9054). The area number is information to be included in access area designation information that terminal 200 transmits by access area designation command, when terminal 200 gains access using the security protection area access command.

The application AP1 combines the random number Rs, area number X and file size SIZE3 to generate DATA3 (step S9055), and encrypts DATA3 using the public key PubH of terminal 200 to generate DATA4 (step S9056).

The application AP1 subjects the random numbers Rs and Rh to exclusive OR, thereby generates random number R (step S9057), and generates encryption session key Kd and verification session key Km from the random number R (step S9058).

The application AP1 associates the session keys Kd and Km with the area number X to store in area/session key managing section 111 (step S9059).

Referring to FIG. 13 again, when card 100 finishes the aforementioned processing, the card transmits response APDU including DATA4 to terminal 200 (step S906).

Terminal 200 having received the response APDU extracts DATA4 from the response APDU to execute processing 907. Processing 907 will specifically be described below with reference to a flowchart in FIG. 16.

Terminal 200 decrypts DATA4 using the secret key PriH of terminal 200 to acquire DATA3 (step S9071). Then, terminal 200 acquires the random number Rs from DATA3, subjects the random numbers Rs and Rh to exclusive OR to generate the random number R (step S9072), and generates the encryption session key Kd and verification session key Km from the random number R (step S9073).

By following aforementioned steps 901 to 907, terminal 200 and card 100 are capable of mutually performing authentication, while a file designated by terminal 200 becomes accessible from terminal 200 when terminal 200 is authorized to gain access to the file, and of sharing an area number necessary in gaining access, file size SIZE3 assigned to the area number, verification session key Km and encryption session key Kd.

In addition, in step 904, a file name provided from terminal 200 to card 100 does not need to directly indicate a file managed by the card application, and is only required to enable the card application to recognize the file.

Further, in a file to which terminal 200 desires to gain access and step S9054, the file may always be assigned the same area number in performing setting such that the file is accessible from terminal 200, and terminal 200 and card 100 may recognize such information in advance, whereby it is possible to omit notification of a name of a file to which terminal 200 desires to gain access in step 904 and notification of an area number assigned to the file in step 906.

Figure 13:
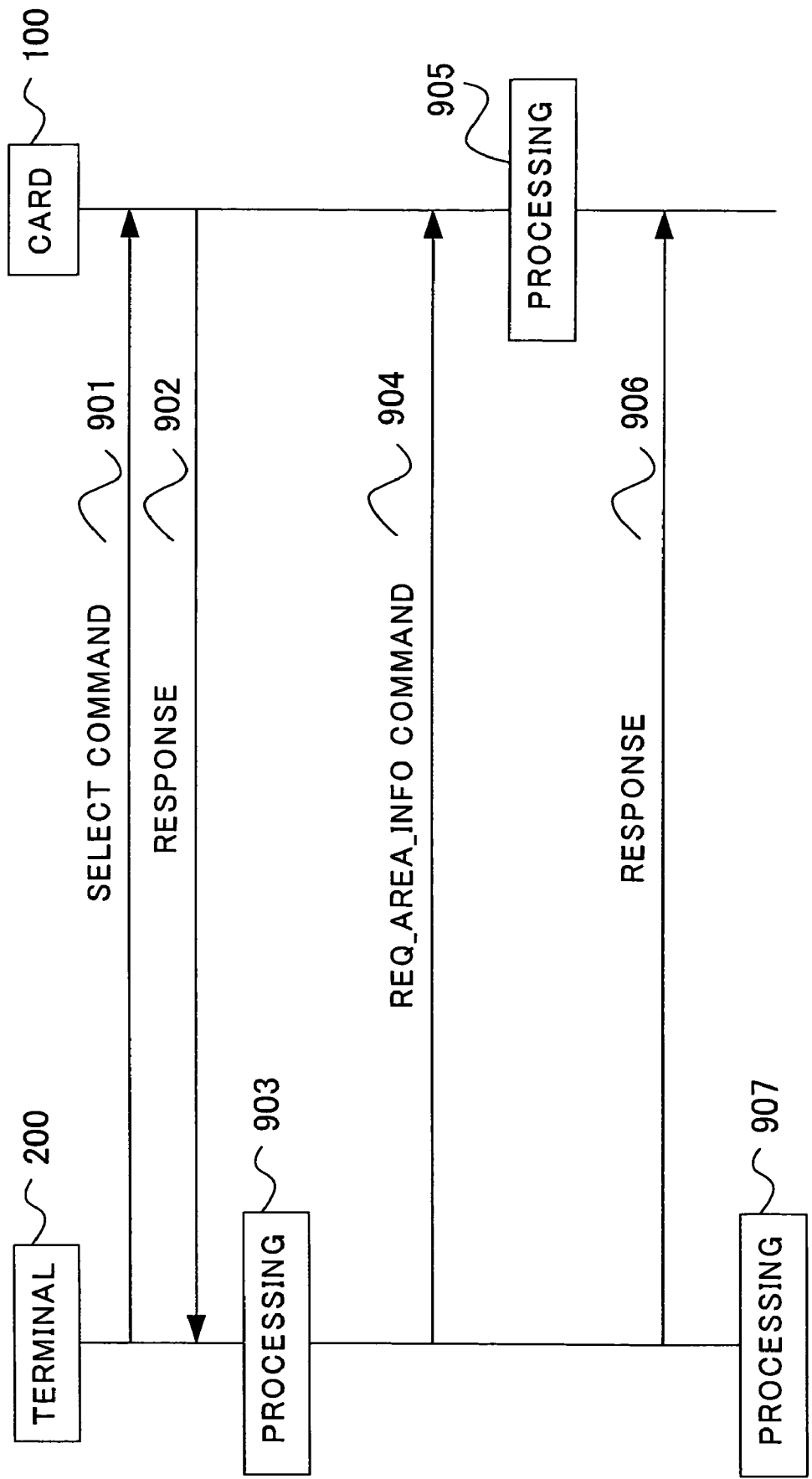
FIG. 13 is a diagram illustrating procedures for sharing a section key and access enabled area according to the first embodiment of the present invention.
Figure 14:
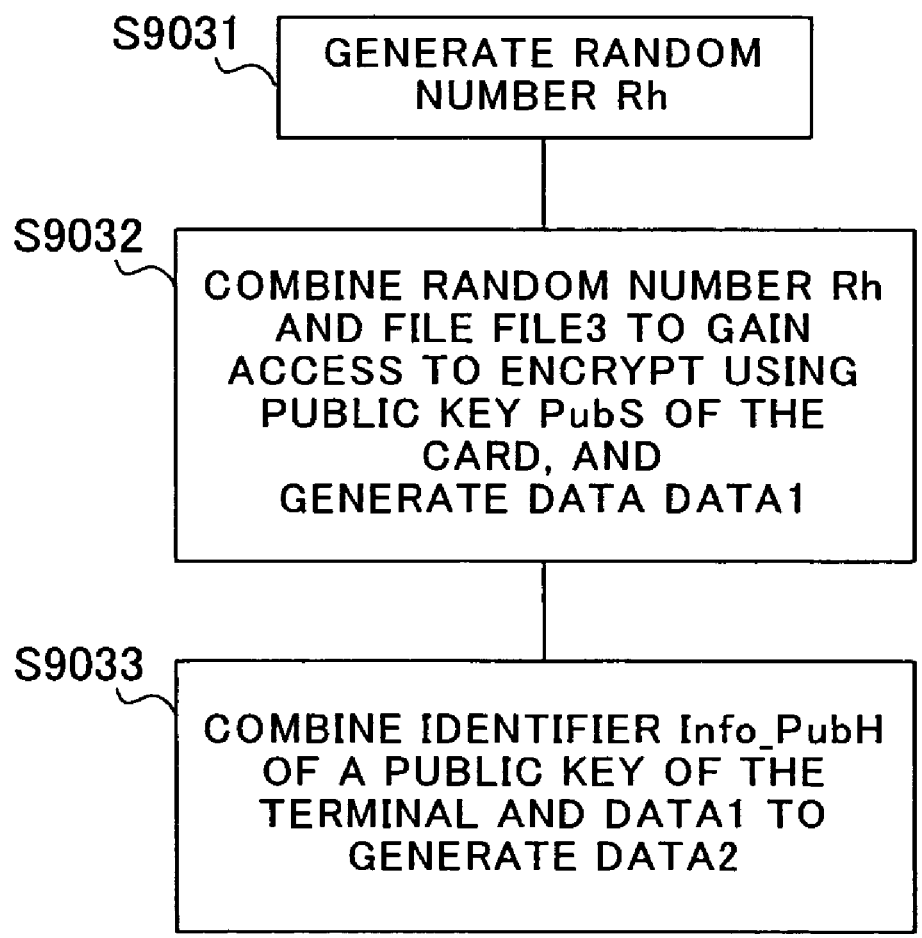
FIG. 14 is a flowchart to explain details of processing in step 903 in FIG. 13 according to the first embodiment of the present invention.

This embodiment describes a mode where each card application has a layer structure comprised of directories and files as shown in FIG. 12 and data is managed using a directory name and file name. However, it may be possible to divide an area allocated to a card application into areas with appropriate sizes and assign an identifier such as a number to each of the divided areas to manage. In this case, the identifier is used, substituting for a file name of the FILE3 used in processing procedures as shown in FIG. 13.

Figure 17:
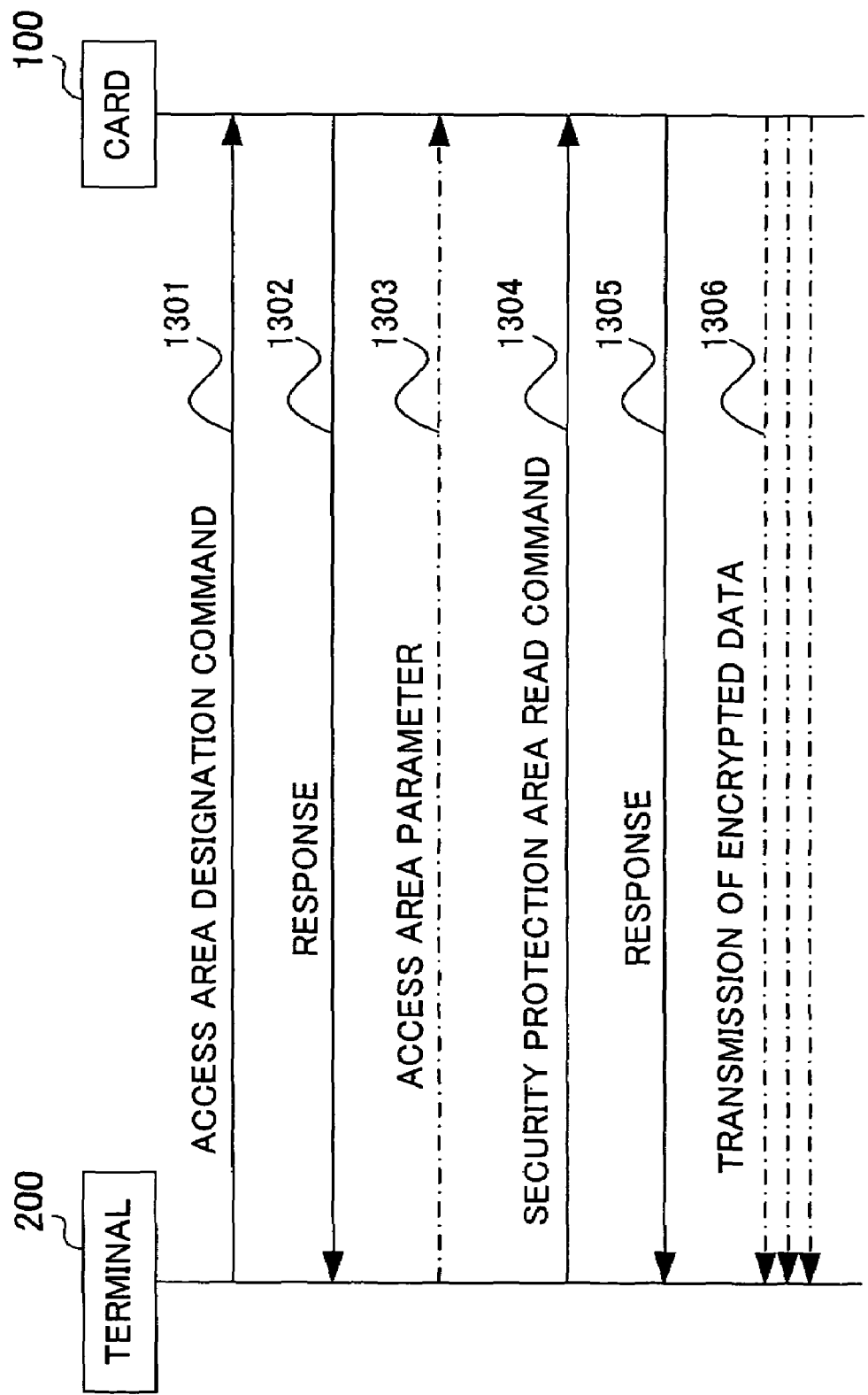
FIG. 17 is a diagram illustrating a command sequence for the terminal to read the security protection area according to the first embodiment of the present invention.

Processing for terminal 200 to gain access to the security protection area will be described below with reference to FIGS. 17 and 3. In FIG. 17, solid lines indicate transfer in CMD line 22, and dotted lines indicate transfer in DAT0 line 27.

Terminal 200 transmits an access area designation command that is a memory card command to card 100 (step 1301). The access area designation command has the format as shown in FIG. 9, and is comprised of command code 401 with 6 bits and command argument 402 with 32 bits.

As shown in FIG. 18, command argument 402 in the access area designation command is comprised of flag 1401 indicating that data input to DAT0 line 27 is access area designation information, and 1403 indicative of the number of items of transmission data. When the number of bits contained in flag 1401 and number-of-transmission data 1403 is less than 32 bits, unused field 1402 exists.

Data is input to DAT0 line 27 on a 512-byte basis, and number-of-transmission data 1403 indicates the number of times unit data of 512 bytes is input.

Command receiving section 101 of card 100 receives the command transmitted from terminal 200, recognizes that the command is the access area designation command, transmits a response to the terminal 200, and notifies data control section 103 of reception of the access area designation command (step S1302).

Figure 21:
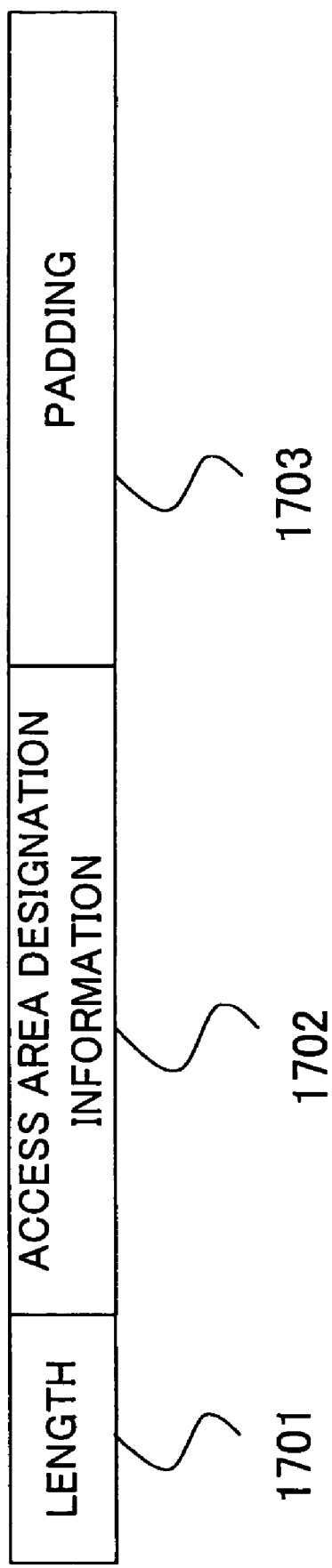
FIG. 21 is a diagram illustrating an input data format of an access area designation command according to the first embodiment of the present invention.

Terminal 200 receives the response to the access area designation command from CMD line 22 of card 100, and inputs access area designation information 1702 in the format as shown in FIG. 21 to DAT0 line 27 (step S1303).

In FIG. 21, a length shown by "1701" indicates a length of subsequent access area designation information 1702. Number-of-transmission data 1403 of command argument 402 is set according to the total length of length field 1701 and access area designation information 1702. Further, the total length is not always a multiple of 512 bytes, and therefore, padding 1703 is added to obtain a multiple of 512 bytes.

As shown in FIG. 22, access area designation information 1702 is comprised of area number 1801 to designate the area number X notified from the card in step 906 in FIG. 13, access start address 1802 of 0 or more selectable in a range of the file size SIZE3 notified from the card, and access data size 1803 that is greater than 1 and selectable in within the range of the file size SIZE3 minus access start address 1802.

Data transmitting/receiving section 102 in the card receives access area designation information 1702 input from the terminal 200, and notifies data control section 103 of reception of access area designation information 1702.

Figure 15:
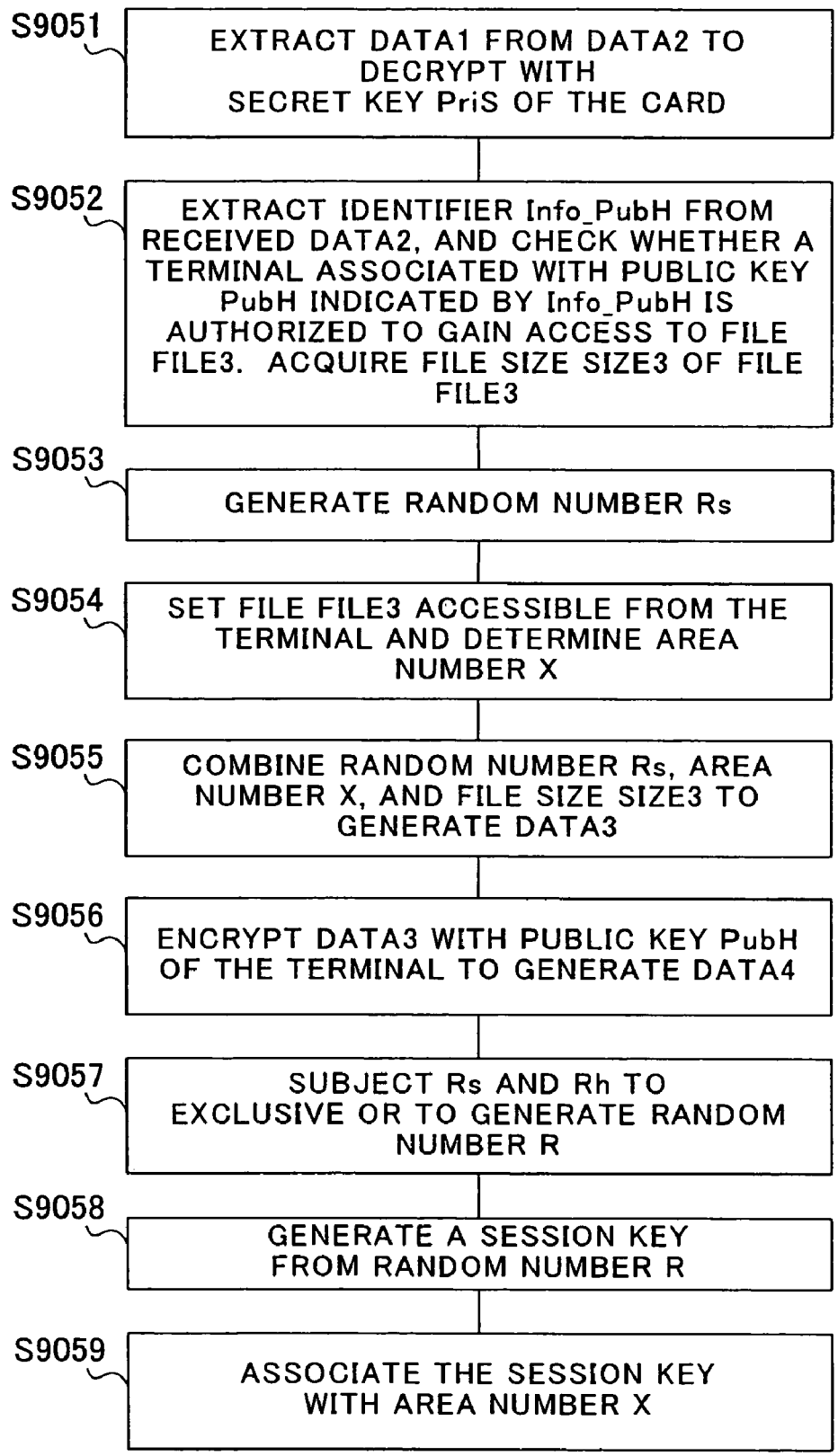
FIG. 15 is a flowchart to explain details of processing in step 905 in FIG. 13 according to the first embodiment of the present invention.
Figure 16:
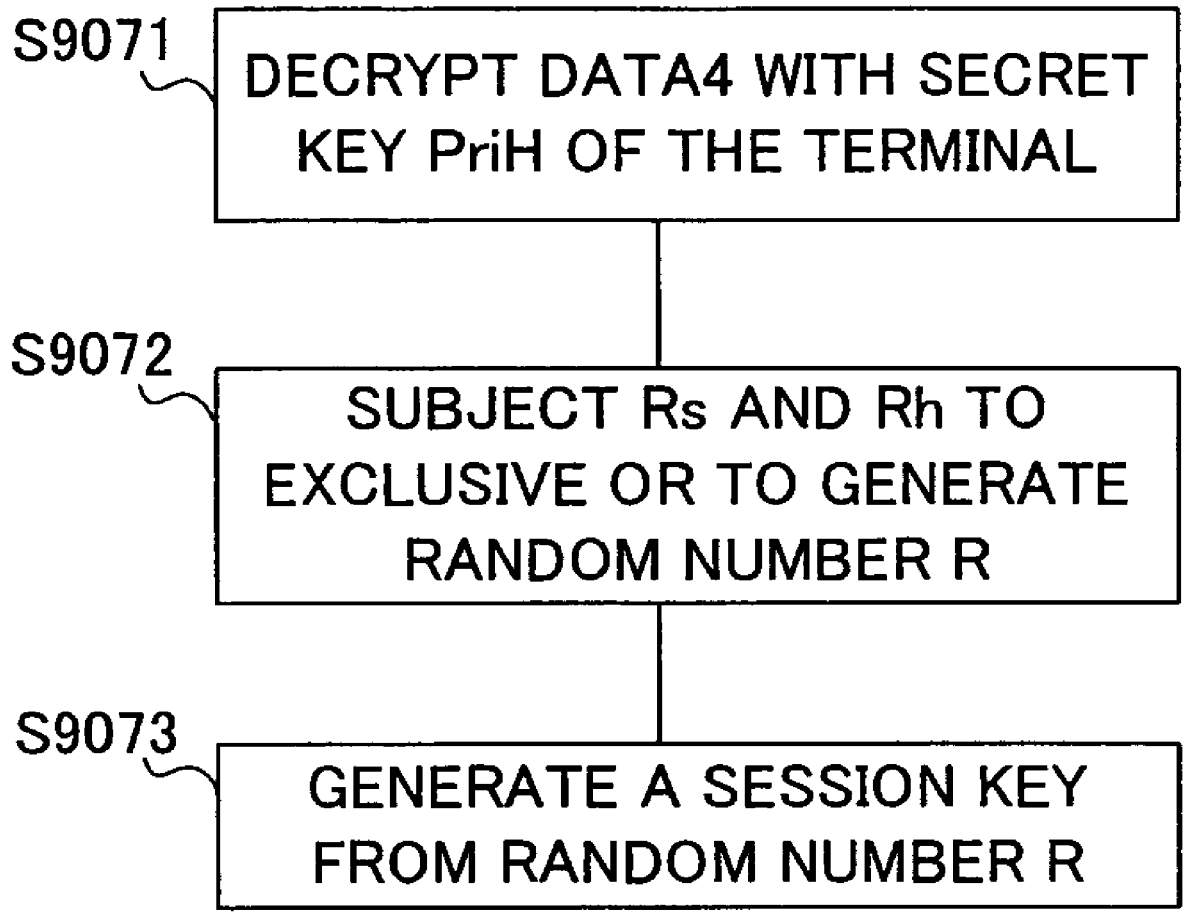
FIG. 16 is a flowchart to explain details of processing in step 907 in FIG. 13 according to the first embodiment of the present invention.

Data control section 103 reads access area designation information 1702 from data transmitting/receiving section 102, checks whether area number 1801 is the area number X assigned in step S905 in FIG. 15, and whether the access start address and access data size fall within a file size range of a file corresponding to the area number X, and when anything is wrong, sets an error flag held in the card for ON.

Figure 3:
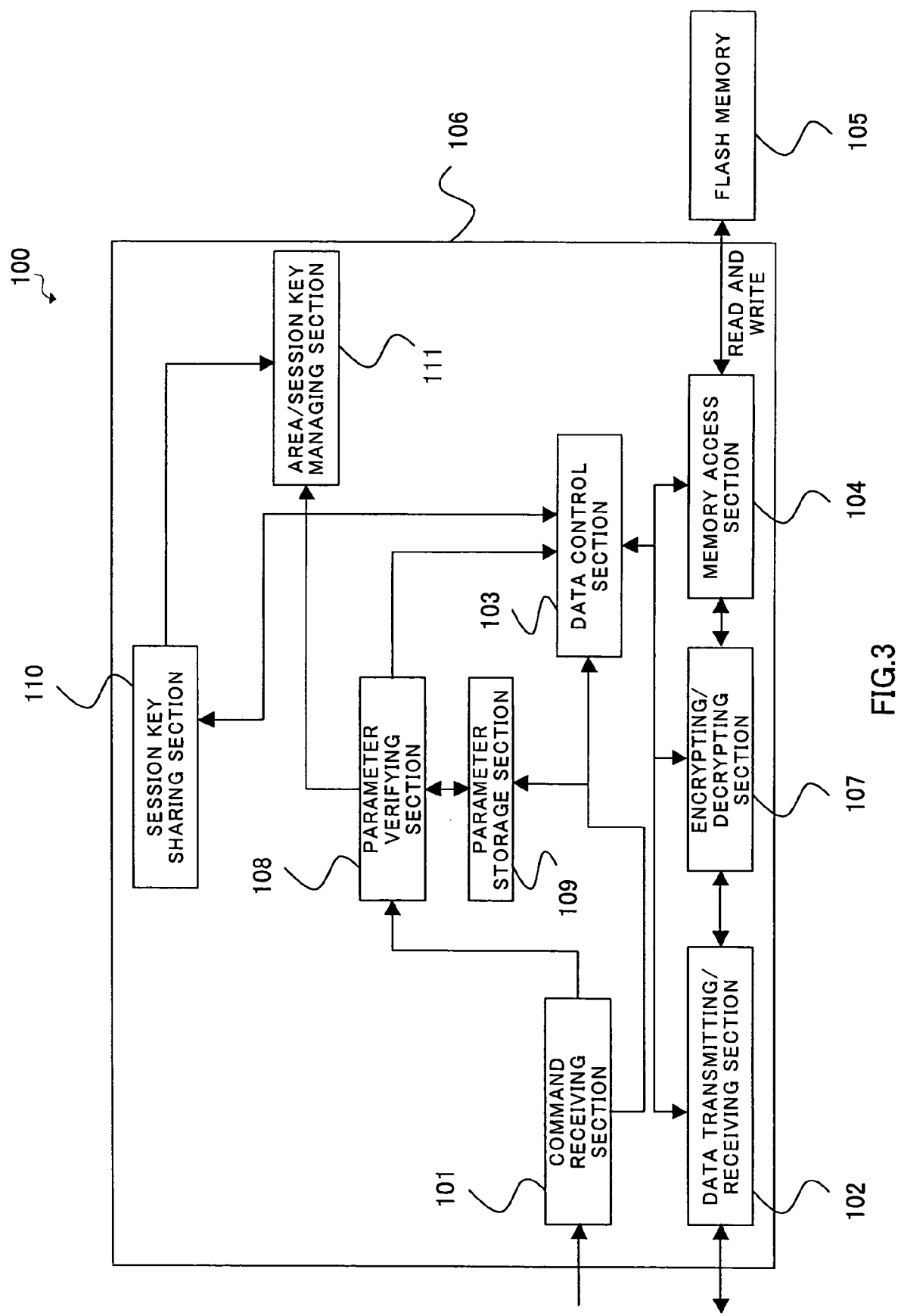
FIG. 3 is a diagram illustrating an internal module structure of a memory card according to a first embodiment of the present invention.
Figure 4:
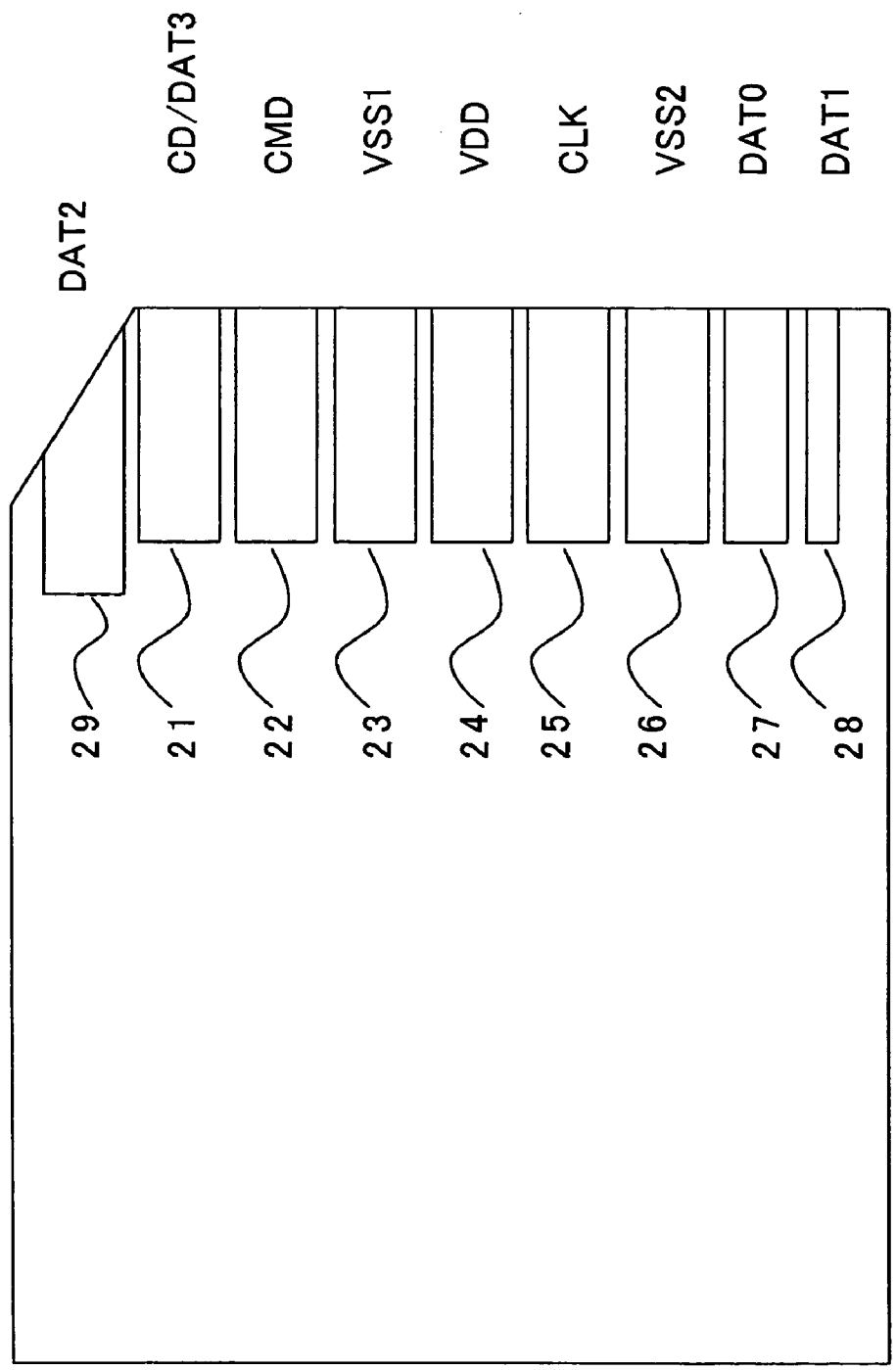
FIG. 4 is a diagram illustrating a terminal configuration of a card according to the first embodiment of the present invention.

When there is nothing wrong, data control section 103 stores access are designation information 1702 (more specifically, area number 1801, access start address 1802 and access data size 1803) in parameter storage section 109 as shown in FIG. 3.

Described above is the processing for designating an access area.

Processing for reading security protection area 61 in FIG. 10 will be described below.

In FIG. 17, terminal 200 transmits a security protection area read command to card 100 (step 1304). The security protection area read command has the format as shown in FIG. 8, and is comprised of command code 401 with 6 bits and command argument 402 with 32 bits.

Command argument 402 in the security protection area read command is comprised of verification data to verify that a terminal that transmits the security protection area read command is the same as terminal 200 that transmits the access area designation command, and also the same as terminal 200 that is verified to be authorized to gain access to an area indicated by the area number X via session key sharing procedures.

Figure 23:
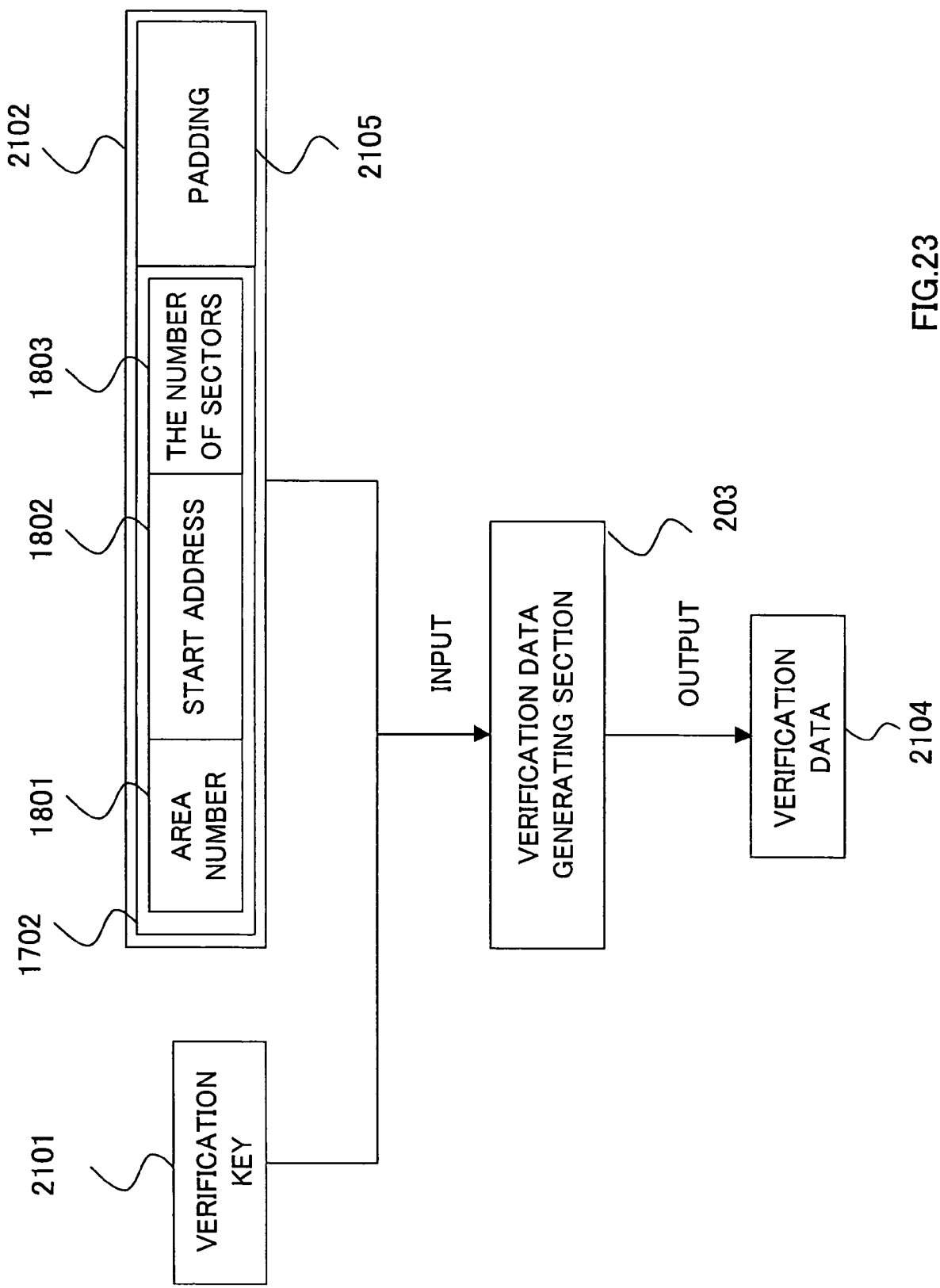
FIG. 23 is a diagram illustrating a method for the terminal to generate verification data to verify the validity of the terminal according to the first embodiment of the present invention.

A method of generating the verification data will be described below with reference to FIG. 23.

Access area designation information 1702 is a parameter to input to DAT line 27 in the access area designation command. Verification key 2101 is the verification session key Km generated in step 907 in FIG. 13.

Verification data generating section 203 in terminal 200 is a module for performing encryption operation, and generates verification data to be included in a security protection area access (read or write) command. Herein, processing for generating MAC (Message Authentication Code) called DES-MAC is performed. Using 2102 obtained by adding padding data 2105 to access area designation information 1702 as input data, the MAC generation processing is performed using verification key 2101 and DES encryption, and MAC data is generated as verification data 2104.

With respect to padding data 2105, the data 2105 may be transmitted together with access area designation information 1702 when terminal 200 transmits the access area designation command to card 100, or padding data may be added that is generated based on a padding data generation rule determined beforehand between the terminal and card.

In addition, verification data is generated using DES-MAC in this embodiment and another algorithm may be used. Further, verification algorithms may be selectable according to the use.

When it is not necessary to authenticate terminal 200 and check is only required on association with an access area designation command, instead of using encryption processing, verification data may simply be hash data using SHA1 (Secure Hash Algorithm 1) or MD5 (Message Digest 5) algorithm.

Terminal 200 generates the verification data with 32 bits by the verification data generation processing as described above to use as an argument of the security protection area read command.

Command receiving section 101 of card 100 receives the command transmitted from terminal 200, recognizes the command as the security protection area read command, and when ON is at the error flag on access area designation information 1702, turns an error as a response. Meanwhile, when ON is not set at the error flag on access area designation information 1702, as shown in FIG. 15, the section 101 turns a normal response to the terminal (step 1305), while notifying data control section 103 of reception of the security protection area read command, and provides verification data 2104 given as command argument 402 to parameter verifying section 108.

Next, terminal 200 receives the response to the security protection area read command from CMD line 22 of card 100, and waits until data is output from DAT0 line 27.

Processing for card 100 to output data of the security protection area will be described below.

Parameter verifying section 108 of card 100 reads from parameter storage section 109 access area designation information 1702 which is given from terminal 200 by access area designation command and stored, and acquires from area/session key managing section 111 verification session key Km which corresponds to the area number X (1801) contained in access area designation information 1702 and stored in step S9059 in FIG. 15.

Figure 24:
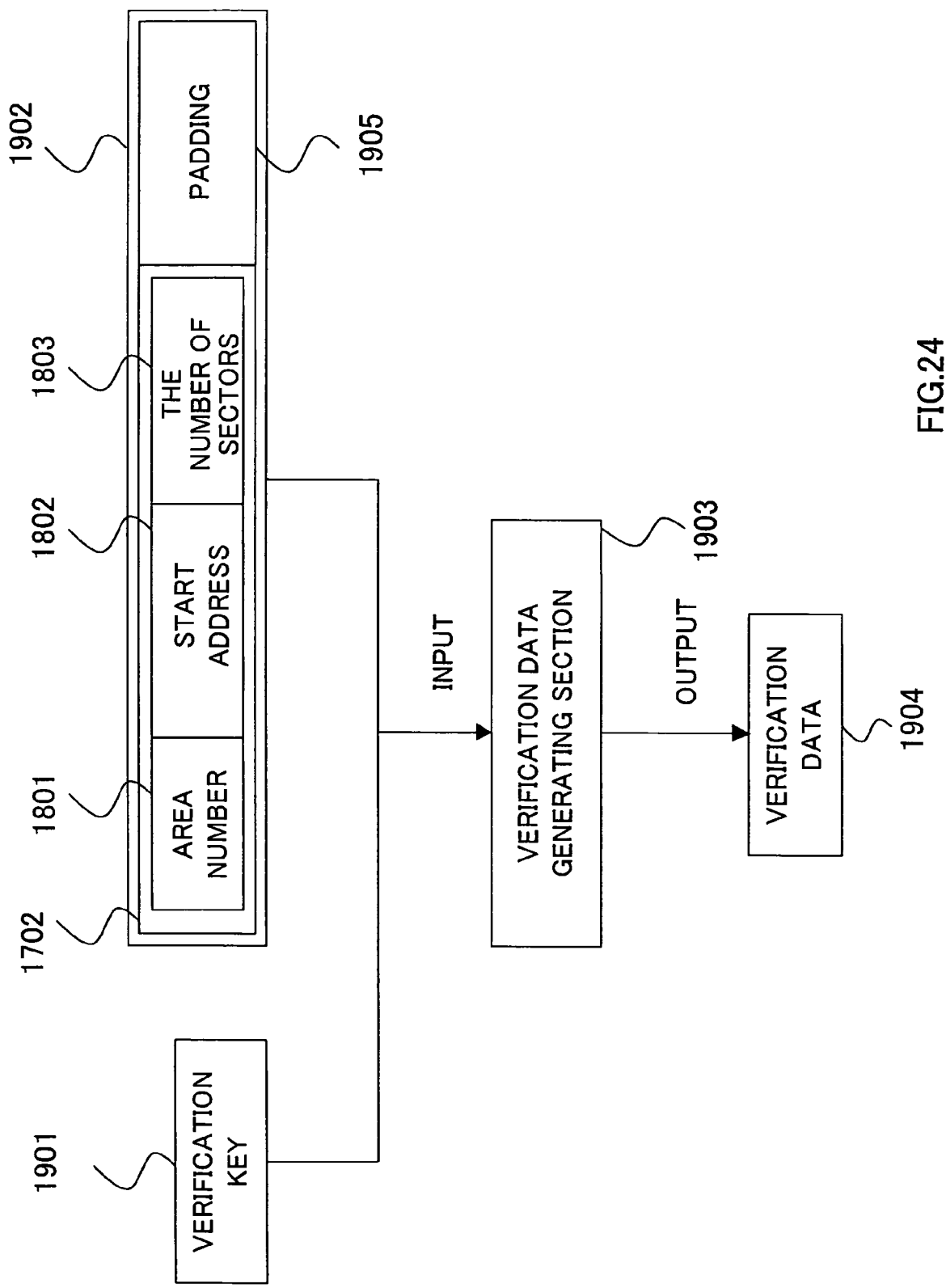
FIG. 24 is a diagram illustrating a method for the card to generate verification data to verify the validity of the terminal according to the first embodiment of the present invention.

Next, using verification session key Km and access area designation information 1702, parameter verifying section 108 of card 100 performs processing for generating verification data as shown in FIG. 24, and generates verification data 1904. In addition, the processing for generating verification data is the same as the processing for generating verification data by terminal 200 as shown in FIG. 23, and specific descriptions thereof are omitted.

Parameter verifying section 108 of card 100 compares verification data 1904 generated in the processing for generating verification data with verification data 504 given from terminal 200 by argument of the security protection area read command, and when the data disagrees, recognizes as an error, while not shifting to data read processing. When the data agrees with each other, the section 108 notifies data control section 103 of shift to subsequent processing, data read processing.

Data control section 103 of card 100 reads access area designation information 1702 from parameter storage section 109, acquires the area number X contained in the information 1702, and recognizes file FILE3 corresponding to the area number from area/session key managing section 111.

Then, data control section 103 of card 100 confirms that file FILE3 is of an area for application AP1, and acquires storage encryption key Ks_1.

Data control section 103 of card 100 acquires access start address 1802 and access data size 1803 from access area designation information 1702, and makes a data read request for the area managed as file FILE3 to memory access section 104, using access start address 1802 as an offset and access data size 1803 as a read size.

Data control section 103 of card 100 requests encrypting/decrypting section 107 to decrypt the data read by memory access section 104 using storage encryption key Ks_1.

Data control section 103 of card 100 further requests encrypting/decrypting section 107 to encrypt the data decoded by the section 107 using encryption session key Kd.

Then, data control section 103 of card 100 requests data transmitting/receiving section 102 to transmit the data encrypted in encrypting/decrypting section 107 using encryption session key Kd to terminal 200.

According to the aforementioned processing, it becomes possible for card 100 to output the data of the security protection area encrypted using the session key Kd.

As shown in FIG. 17, terminal 200 recognizes that it becomes possible for card 100 to output the data, acquires the data encrypted with the session key Kd from DAT0 line 27 (step 1306), decrypts the data using encryption session key Kd that the terminal holds, and obtains the data of the area designated by access area designation information 1702.

Figure 25:
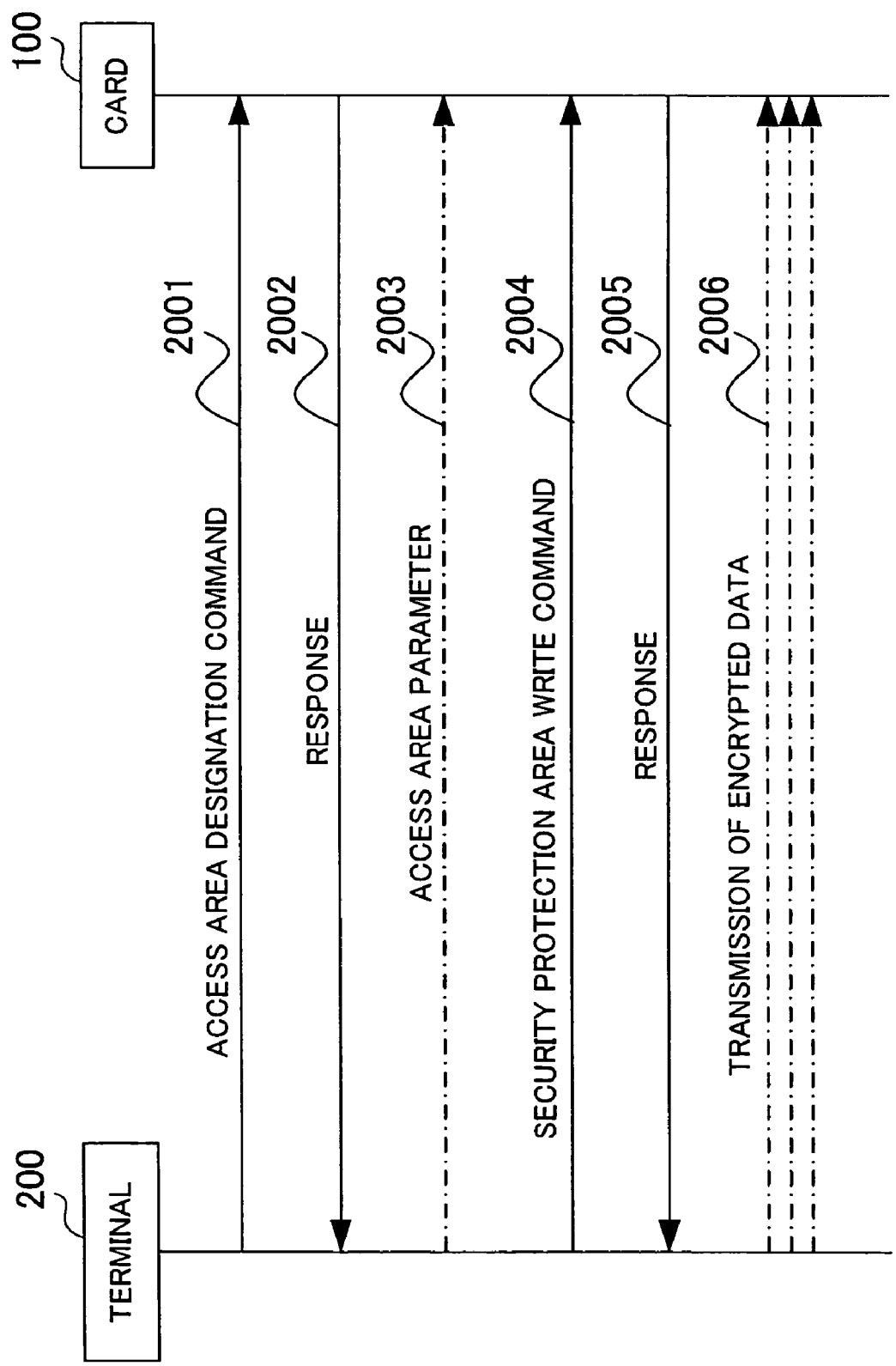
FIG. 25 is a diagram illustrating a command sequence for the terminal to write in the security protection area according to the first embodiment of the present invention.

Processing for performing write in the security protection area will be described below with reference to FIG. 25.

Transmission of an access area designation command from terminal 200 (step 2001), response to the command from card 100 (step 2002) and transmission of access area designation information from card 100 (step 2003) is respectively the same as in steps 1301, 1302 and 1303 in the security protection area read processing as shown in FIG. 17, and descriptions thereof are omitted. After performing steps 2001 to 2003, terminal 200 transmits a security protection area write command to card 100 (step 2004). The security protection area write command has the format as shown in FIG. 8, and is comprised of command code 401 with 6 bits and command argument 402 with 32 bits.

Command argument 402 in the security protection area read command is comprised of verification data 1904 to verify that terminal 200 that transmits the security protection area read command is the same as terminal 200 that transmits the access area designation command, and also the same as terminal 200 that is verified to be authorized to gain access to an area indicated by the area number X via session key sharing procedures.

A method of generating the verification data is the same as in the security protection area read command, and specific descriptions thereof are omitted.

Terminal 200 generates the verification data with 32 bits by the verification data generation processing to use as an argument of the security protection area write command.

Command receiving section 101 of card 100 receives the command transmitted from terminal 200, recognizes the command as the security protection area write command, and when the error flag is set on access area designation information 1702, turns an error as a response.

Meanwhile, when the error flag not set on access area designation information 1702, the section 101 turns a normal response to terminal 200 from CMD line 22 (step 2005), while notifying data control section 103 of reception of the security protection area write command, and provides verification data 504 given as the command argument to parameter verifying section 108.

Next, terminal 200 receives the response to the security protection area write command from CMD line 22 of card 100, and inputs data to DAT0 line 27. The data input to DAT0 line 27 is encrypted using encryption session key Kd generated in step 907 in FIG. 13, and has the same size as the access data size designated by access area designation information 1702.

Processing for the card to store the data in the security protection area will be described below.

Parameter verifying section 108 of card 100 reads from parameter storage section 109 access area designation information 1702 which is given from terminal 200 by access area designation command and stored, and acquires from area/session key managing section 111 verification session key Km which corresponds to the area number X (1801) contained in access area designation information 1702 and stored in step 9059 in FIG. 15.

Then, using verification session key Km and access area designation information 1702, verification data generating section 1903 in parameter verifying section 108 of card 100 performs processing for generating verification data as shown in FIG. 24, and generates verification data 1904. In addition, the processing for generating verification data is the same as the processing for generating verification data by the terminal as shown in FIG. 23, and specific descriptions thereof are omitted.

Parameter verifying section 108 of card 100 compares the generated verification data 1904 with verification data 2101 given from terminal 200 by argument of the security protection area write command, and when the data disagrees, recognizes as an error, while not shifting to data write processing. When the data agrees with each other, the section 108 notifies data control section 103 of shift to subsequent processing, data write processing.

Data control section 103 of card 100 reads access area designation information 1702 from parameter storage section 109, acquires the area number X contained in the information 1702, and recognizes file FILE3 corresponding to the area number from area/session key managing section 111.

Next, data transmitting/receiving section 102 of card 100 receives the data input from terminal 200.

The file FILE3 is present at area 71 for application AP1, and therefore, data control section 103 of card 100 acquires storage encryption key Ks_1 corresponding to area 71 for application AP1.

Data control section 103 of card 100 requests encrypting/decrypting section 107 to decrypt the data received in data transmitting/receiving section 102 using encryption session key Kd.

Data control section 103 of card 100 further requests encrypting/decrypting section 107 to encrypt the data decoded by the section 107 using storage encryption key Ks_1.

Then, data control section 103 of card 100 acquires access start address 1802 and access data size 1803 from access area designation information 1702, and makes a data write request for the area managed as file FILE3 to memory access section 104, using access start address 1802 as an offset and access data size 1803 as a write size.

As described above, the data which is encrypted with the session key Kd and input from terminal 200 is encrypted using storage key Ks_1, and stored in flash memory 105.

In this embodiment, a single command is used to share session keys and information on an access enabled area, but different commands may be used.

In the present embodiment, a session key sharing step is included in FIG. 11. However, if it is considered that there is no need to update a session key each time as security policy, terminal 200 and card 100 may have in advance a verification key and an encryption key and may use the keys as a session key.

As described above, according to the present invention, in a memory card capable of receiving a smart card command and memory access command, with respect to a security protection area which is used by a card application, generally accessible only via the card application, and restricted in access from a terminal, the card application and terminal perform mutual authentication, and the card application performs access enabling setting, whereby it becomes possible for the terminal to gain access to such an area using the memory access command.

Further, with respect to mutual authentication between the card application and terminal carried out for the card application to perform access enabling setting, instead of using the memory access command restricted in the use, by using the smart card command, it is possible to select a mutual authentication system flexibly corresponding to a security level of data.

Furthermore, even when the size of argument included in the memory access command is of 32 bits and thus small, according to the present invention, by dividing commands for access area designation and security protection area access and adding verification data to the command for security protection area access, it is possible for the card to verify the identity of a terminal application that performs access area designation, a terminal application that issues a security protection area access command, and a terminal application that holds a verification key.

Still furthermore, by performing the processing for sharing the verification and encryption session keys whenever access is gained to the security protection area, it is possible to set an appropriate value as verification data to be included in security protection area access and enhance protection against attacks due to repeatedly performed unauthorized accesses.

Moreover, by notifying a card of a file to which a terminal desires to gain access from the terminal, and assigning an area number to the file to notify the terminal from the card, the terminal is capable of setting an access enabled area. Further, by performing such processing on a plurality of files, the plurality of files becomes accessible concurrently.

SECOND EMBODIMENT

This embodiment describes a sequence where a terminal beforehand recognizes an area number to designate by area designation command.

Figure 26:
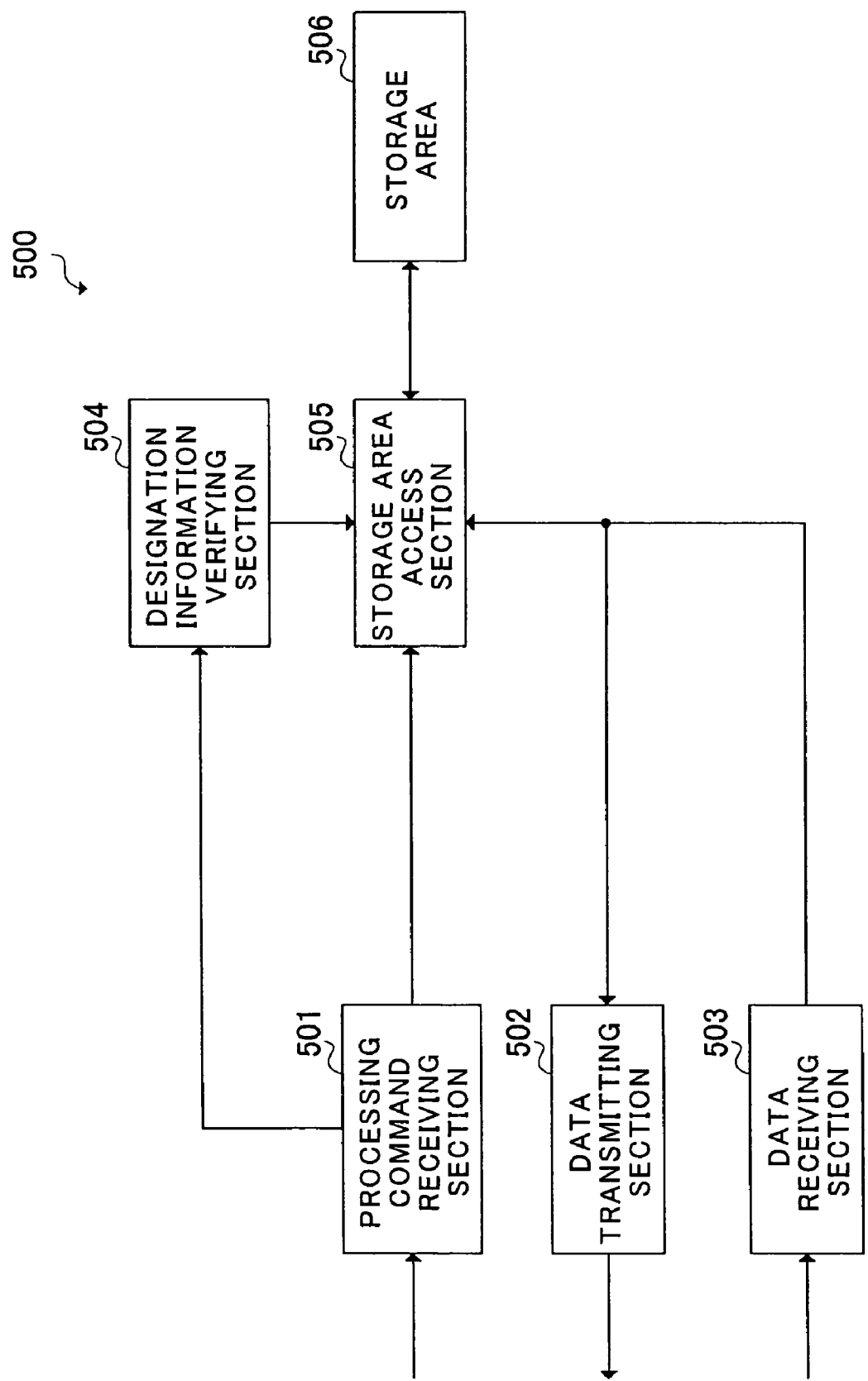
FIG. 26 is a diagram illustrating an internal module structure of a memory card according to a second embodiment of the present invention.

An intra-card module structure will be described below with reference to FIG. 26. In addition, a terminal configuration of card 500 in FIG. 26 is the same as shown in FIG. 4, and figures and descriptions thereof are omitted.

The module inside card 500 is comprised of processing command receiving section 501 which is connected to the CMD line and performs command reception and response transmission, storage area 506 that stores data, storage area access section 505 that performs processing for gaining access to storage area 506, data transmitting section 502 which is connected to the DAT line and transmits data read by storage area access section 505 to an external apparatus, data receiving section 503 which is also connected to the DAT line and receives data from an external apparatus, and designation information verifying section 504 that verifies designation information received in processing command receiving section 501.

Figure 27:
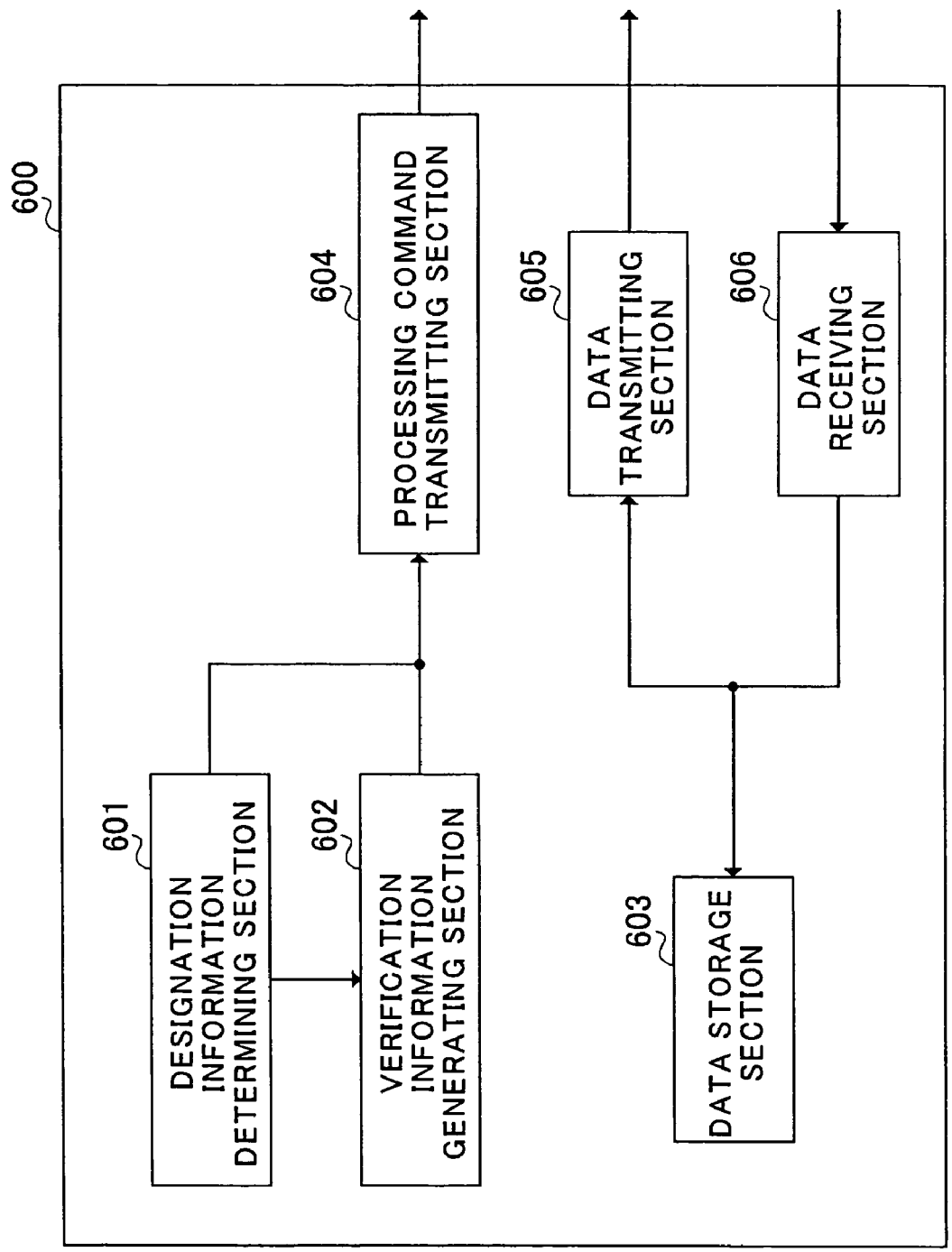
FIG. 27 is a diagram illustrating an internal configuration of a terminal according to the second embodiment of the present invention.

A module structure inside terminal 600 will be described below with reference to FIG. 27.

The module inside terminal 600 is comprised of processing command transmitting section 604 that transmits or receives a command or response to/from card 500 respectively, data transmitting section 605 that transmits data to card 500, data receiving section 606 that receives data from card 500, designation information determining section 601 that determines an area to gain access, verification information generating section 602 that generates verification information from designation information, and data storage section 603 that stores data to transmit to card 500 and data received from card 500.

Figure 28:
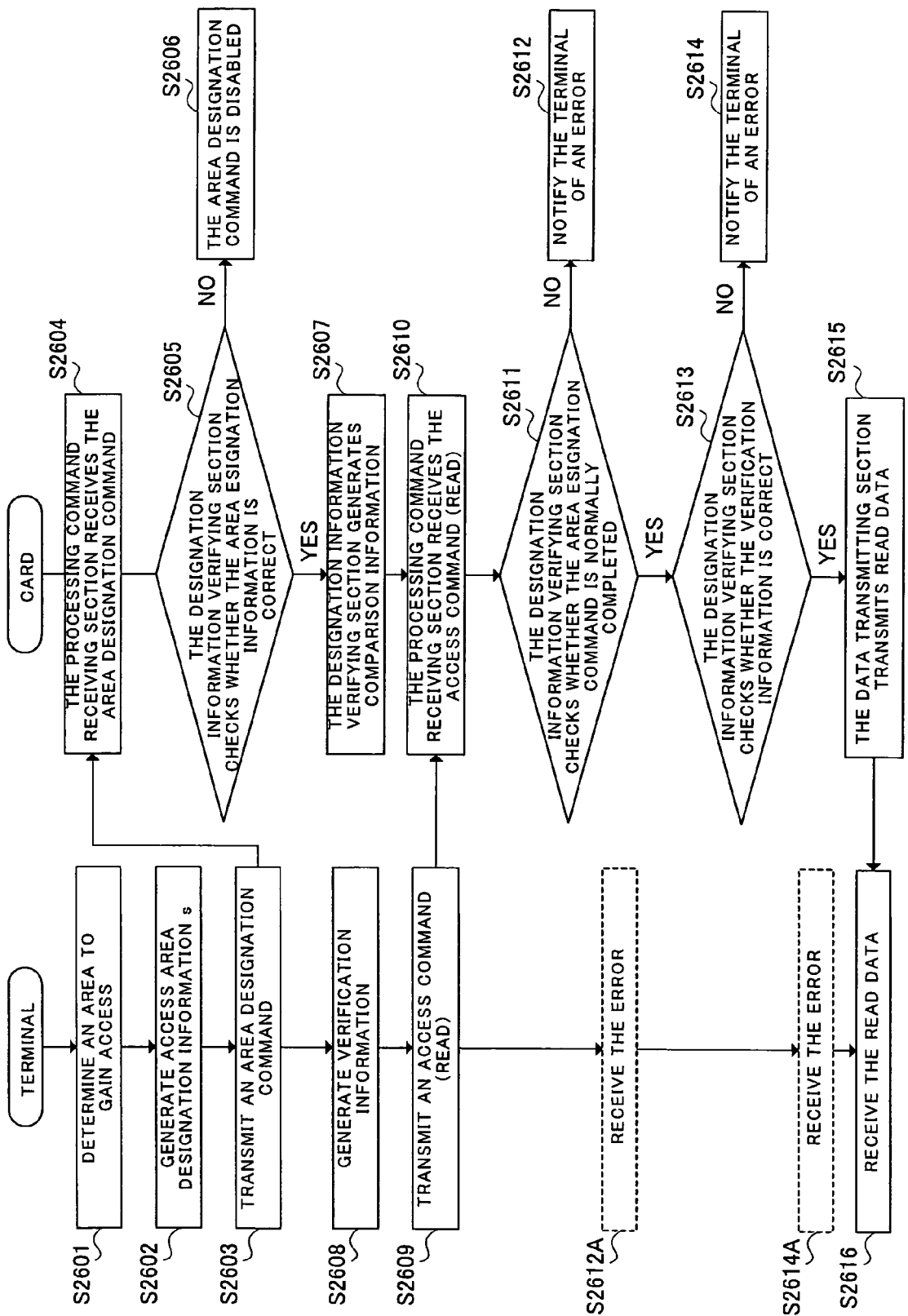
FIG. 28 is a flowchart illustrating processing for the terminal to gain access to a security protection area of the card according to the second embodiment of the present invention.

Processing where terminal 600 gains access to a security protection area of card 500 will be described below with reference to FIGS. 26 and 27 and a flowchart as shown in FIG. 28.

Terminal 600 determines an area to gain read access or write access in designation information determining section 601 (step S2601), and generates access area designation information (step S2602). Then, terminal 600 stores the access area designation information in data storage section 603, and transmits an area designation command to card 500 from processing command transmitting section 604 (step S2603).

Figure 29:
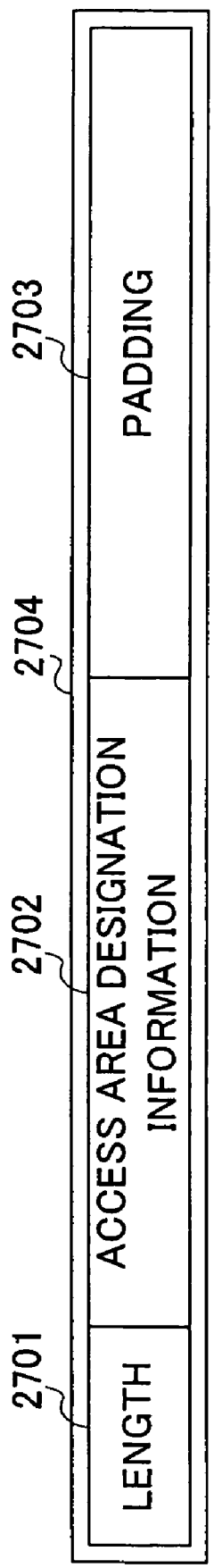
FIG. 29 is a diagram illustrating an example of a data portion of an area designation command according to the second embodiment of the present invention.

FIG. 29 shows an example of a data portion of the area designation command.

Figure 30:
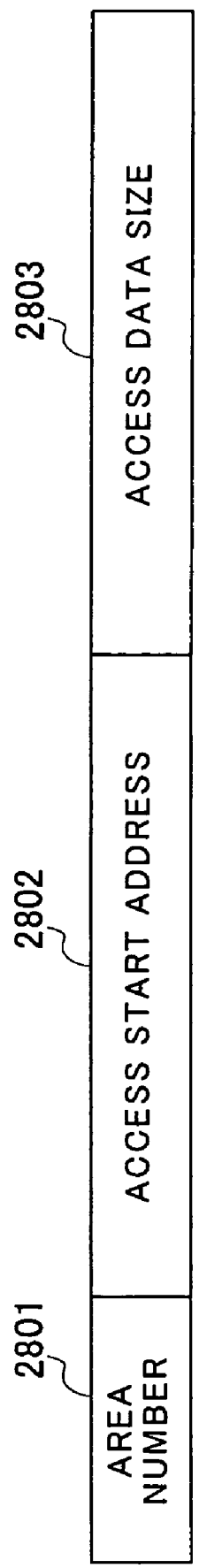
FIG. 30 is a diagram illustrating a format of access area designation information in FIG. 29 according to the second embodiment of the present invention.

Data is input to DAT line 27 on a 512-byte basis. In a data portion of the area designation command, when the total length of length field 2701 of access area designation information 2702 and access area designation information field 2702 is less than 512 bytes, padding 2703 is added. In this embodiment, length field 2701 has a length of 2 bytes, and as shown in FIG. 30, access area designation information 2702 is comprised of area number 2801 with one byte, access start address 2802 with 3 bytes and access data size 2803 with 3 bytes. The total length is thus 9 bytes and is less than 512 bytes, and therefore, padding 2703 with 503 bytes is added.

Referring to FIG. 28 again, card 500 receives the area designation command in processing command receiving section 501 (step S2604), checks access area designation information 2702 in designation information verifying section 504, and judges whether a designated area is correct based on whether an area corresponding to area number 2801 is present and whether access start address 2802 and access data size 2803 fall within a range indicated by area number 2801 (step S2605). When the designated area is not correct, designation information verifying section 504 treats the area designation command as being invalid (step S2606). When the designated area is correct, the section 504 stores access area designation information 2702, and generates comparison information using access area designation information 2702 and a key shared between terminal 600 and card 500 (step S2607).

Figure 31:
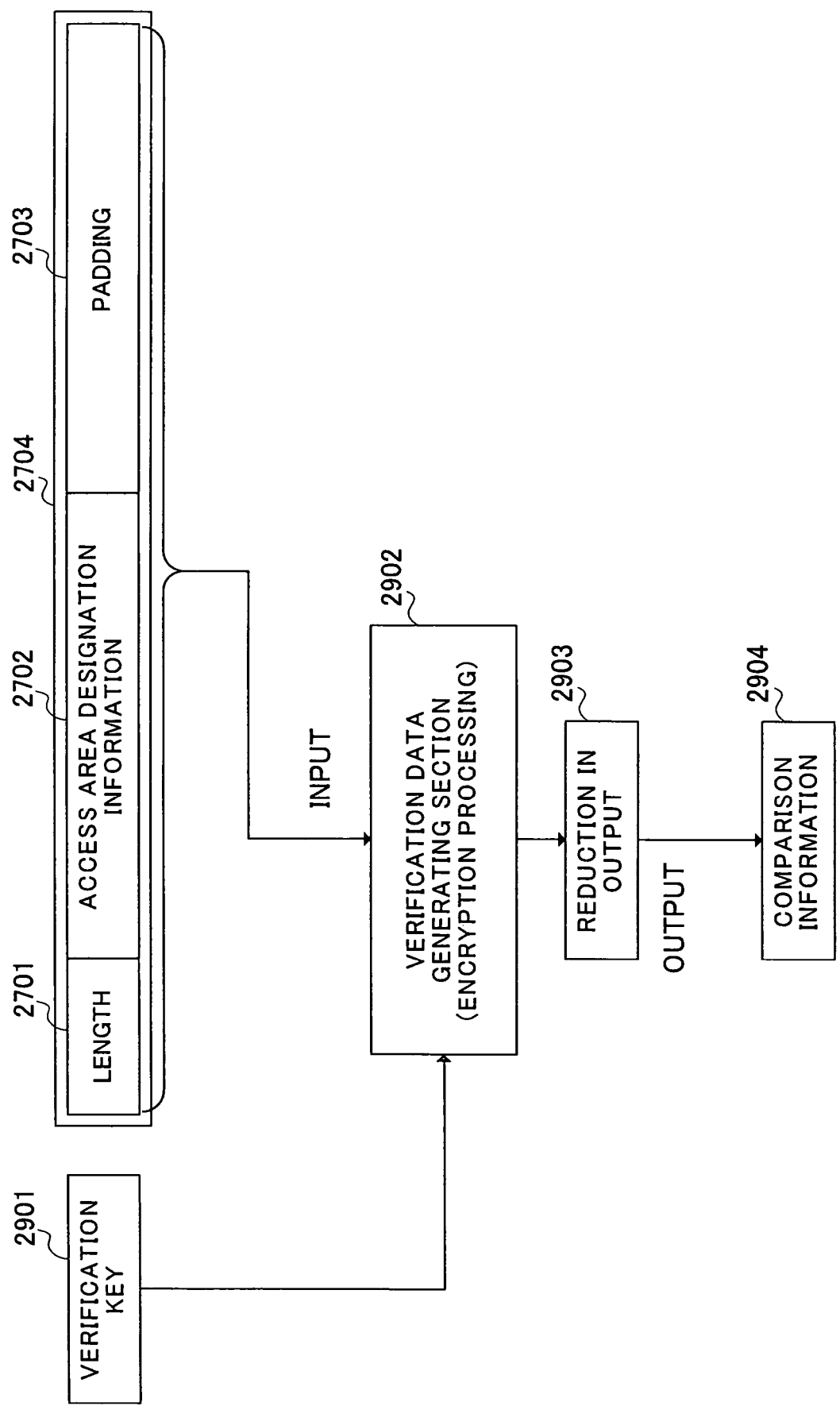
FIG. 31 is a diagram illustrating an example of a method of generating comparison information according to the second embodiment of the present invention.

FIG. 31 shows an example of a method of generating comparison information.

Verification data generating section 2902 is a module that performs encryption operation, and in this embodiment, executes processing for generating MAC (Message Authentication Code) called DES-MAC. The section 2902 receives as its inputs data portion 2704 of the area designation command and verification key 2901 shared with terminal 600. An output result of DES-MAC is 64 bits. However, in this embodiment, since verification information transmitted from terminal 600 to be compared is 32 bits, first 32 bits obtained by reducing the output as 2903 are only used as comparison information 2904. In addition, verification key 2901 may be an individual fixed key corresponding to the area number, or a single key irrespective of the area number.

Figure 32:
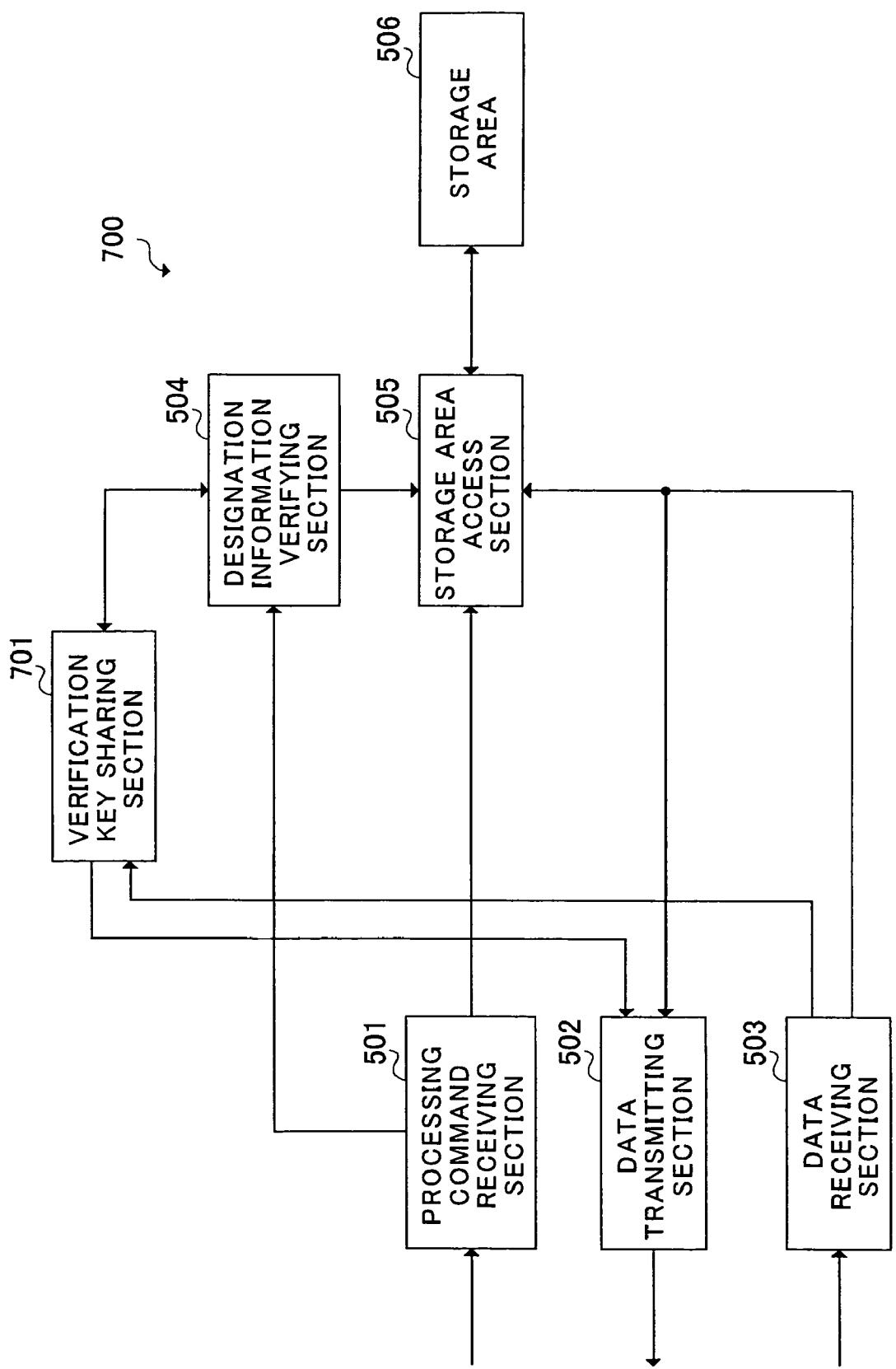
FIG. 32 is a diagram illustrating a card structure internally provided with a verification key sharing section according to the second embodiment of the present invention.
Figure 33:
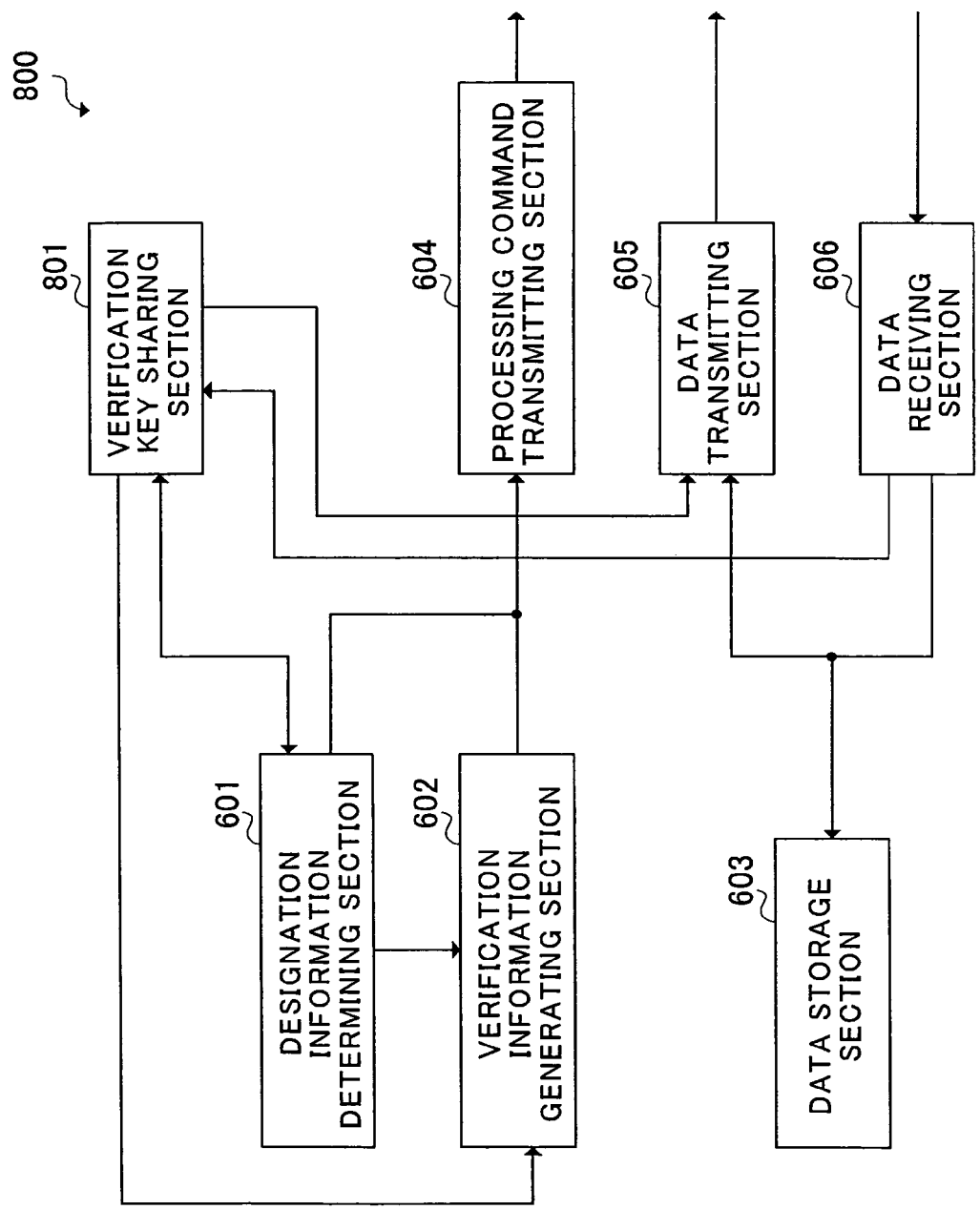
FIG. 33 is a diagram illustrating a terminal configuration internally provided with a verification key sharing section according to the second embodiment of the present invention.

Further, it may be possible that verification key sharing section 701 is provided inside card 700 as shown in FIG. 32, verification key sharing section 801 is provided inside terminal 800 as shown in FIG. 33, and that card 700 and terminal 800 change a verification key every time access is gained to the security protection area. In addition, in a configuration in each of FIGS. 32 and 33, the same sections as in FIGS. 26 and 27 are assigned the same reference numerals, respectively.

A method of sharing a verification key will be described below with reference to FIGS. 32 and 33, a sequence shown in FIG. 34 and a method of generating a verification key shown in FIG. 35.

Figure 34:
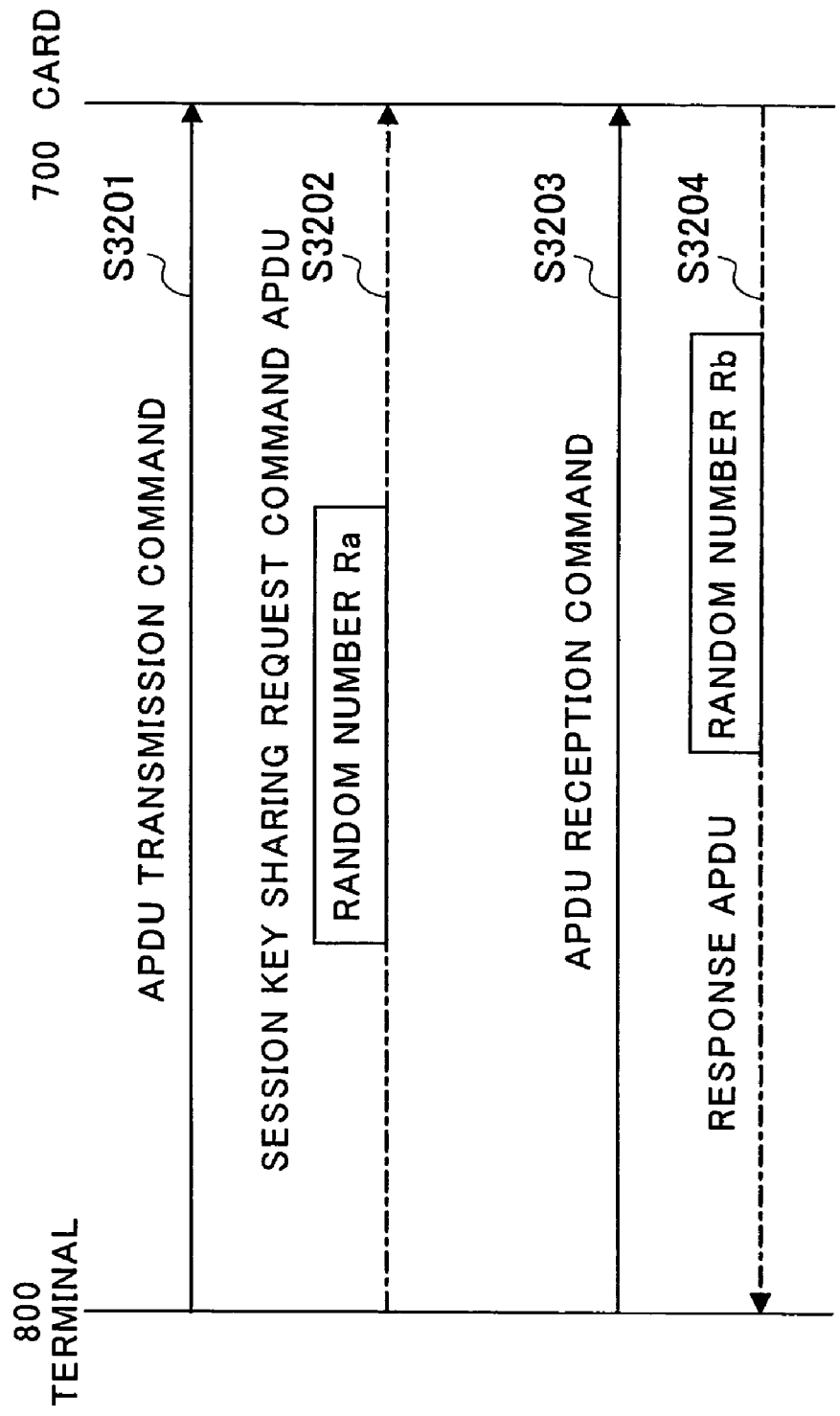
FIG. 34 is a diagram illustrating a sequence of a method of sharing the verification key according to the second embodiment of the present invention.

In FIG. 34, terminal 800 generates random number Ra in verification key sharing section 801, further generates session key sharing request command APDU including the random number Ra, transmits an APDU transmission command from processing command transmitting section 604 to card 700 (step S3201), and further transmits the session key sharing request command APDU from data transmitting section 605 to card 700 (step S3202).

Card 700 receives the APDU transmission command in processing command receiving section 501 from terminal 800, and provides the session key sharing request command APDU, which is received in data receiving section 503 from terminal 800, to verification key sharing section 701.

Figure 35:
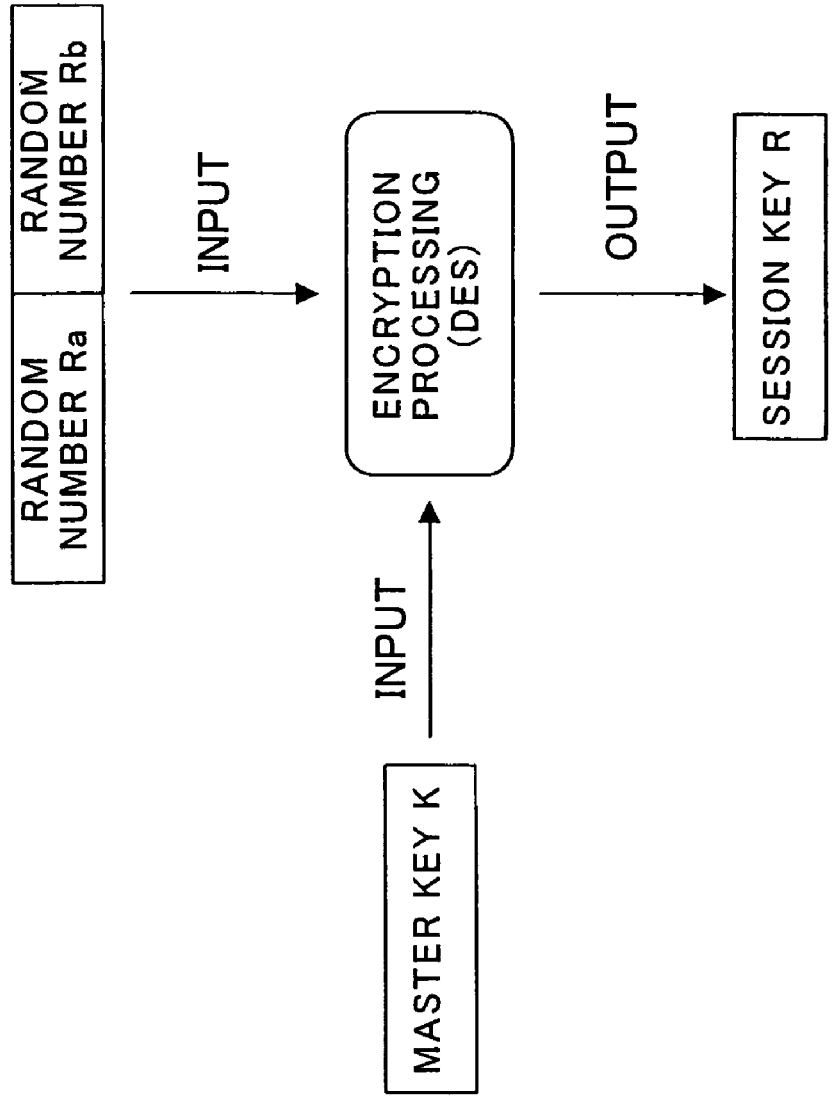
FIG. 35 is a diagram illustrating a method of generating the verification key according to the second embodiment of the present invention.

Verification key sharing section 801 generates random number Rb, performs encryption processing (DES-MAC processing) on a combination of the random number Ra received from terminal 800 and the random number Rb using master key K that is beforehand shared with terminal 800 as shown in FIG. 35, and thus generates session key R. Then, card 700 generates response APDU including the random number Rb.

Terminal 800 transmits an APDU reception command to card 700 from processing command transmitting section 604 (step S3203).

Card 700 receives the APDU reception command in processing command receiving section 501 from terminal 800, and transmits the response APDU including the random number Rb generated earlier to terminal 800 from data transmitting section 502 (step S3204).

Terminal 800 receives the response APDU in data receiving section 606 from card 700 to provide to verification key sharing section 801. As shown in FIG. 35, verification key sharing section 801 performs encryption processing (DES-MAC processing) on a combination of the random number Ra that is generated earlier by the section 801 and the random number Rb contained in the response APDU, using the master key K that is beforehand shared with card 700, and thus generates the session key R.

Described above are verification key sharing procedures between terminal 800 and card 700 in changing a session key whenever access is obtained to a security protection area.

Figure 36:
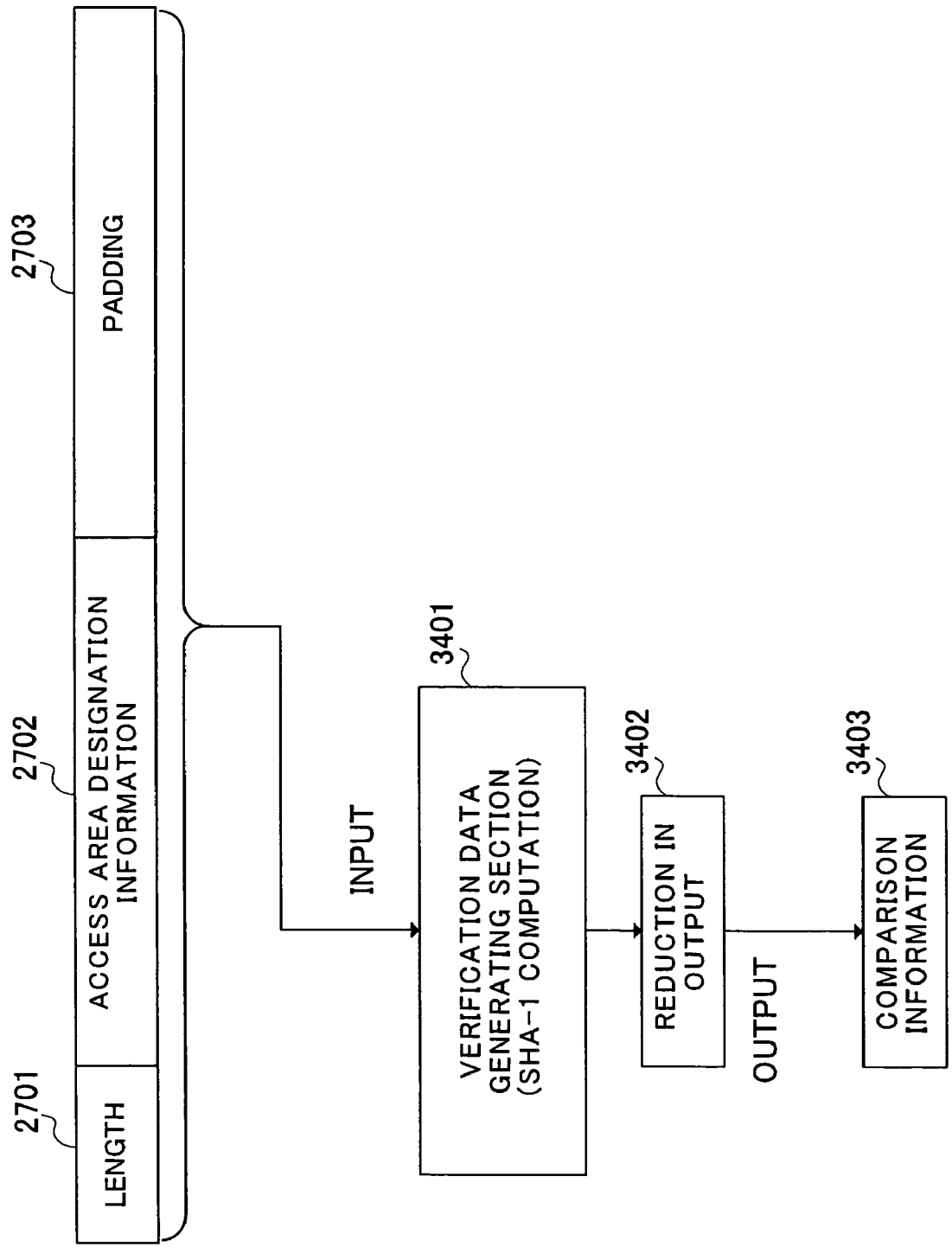
FIG. 36 is a diagram illustrating a method of generating comparison information using SHA-1 computation according to the second embodiment of the present invention.

In addition, while DES-MAC is used in this embodiment, another encryption algorithm may be used. Further, when it is not necessary to verify terminal 800, i.e. it is not necessary to check whether terminal 800 has the same key, for example, when it is only verified that access area designation information 2702 of an area designation command is expected by the terminal, without performing encryption processing, it is possible to use as comparison information a result of hash operation using SHA-1 computation or MD5 algorithm or check sum operation in verification data generating section 3401 as shown in FIG. 36. Also in the case of using these algorithms, when data to be compared is 32 bits, an output result is reduced as 3402, and part thereof with only 32 bits is used as comparison information 3403.

Referring to FIG. 28 again, terminal 800 generates verification information in the verification data generating section from access area designation information 2702 and verification key 2901 shared between terminal 800 and card 700 (step S2608).

Figure 37:
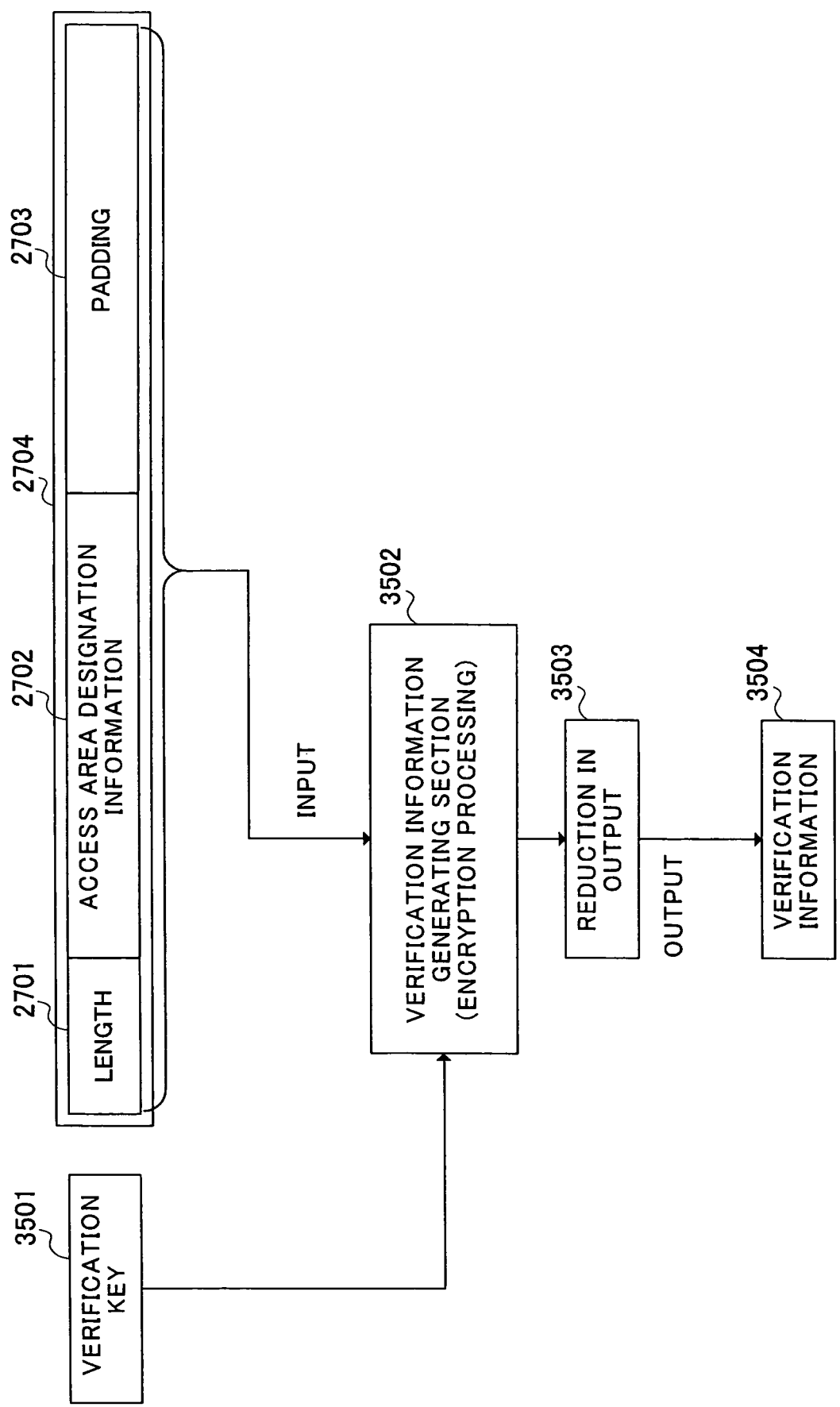
FIG. 37 is a diagram illustrating a method of generating verification information according to the second embodiment of the present invention.

FIG. 37 illustrates generation of the verification information. Verification information generating section 3502 performs encryption processing using verification key 3501 and data portion 2704 of the area designation command, and generates verification information 3504. A method of generating the information is the same as the method of generating comparison information 2904 in card 700 as shown in FIG. 31.

Referring to FIG. 28 again, terminal 800 multiplexes generated verification information 3504 on an argument of the access command (read), and transmits the access command from processing command transmitting section 604 (step S2609).

Figure 38:
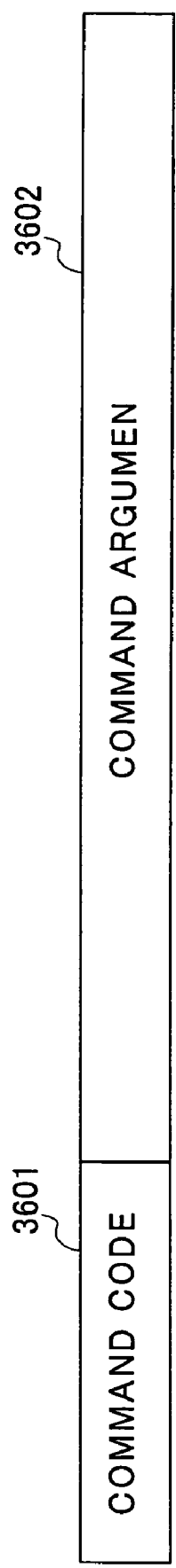
FIG. 38 is a diagram illustrating a format of an access command according to the second embodiment of the present invention.

The access command has a format as shown in FIG. 38, where lengths of command code 3601 and command argument 3602 are respectively 6 bits and 32 bits. In the access command, verification information 3504 is stored in command argument 3602.

Referring to FIG. 28 again, card 700 receives the access command (read) in processing command receiving section 501 (step S2610), and checks whether the area designation command is normally completed beforehand in designation information verifying section 504 (step S2611). When the command is not normally completed for the reason such that an area designation command is not received or a designated area is not correct, card 700 notifies that the access command is an error to terminal 800 (step S2612). At this point, terminal 800 receives the error from card 700 (step S2612A).

When the area designation command is normally completed beforehand, designation information verifying section 504 compares comparison information 2904 generated earlier by card 700 with verification information 3504 stored in the command argument of the access command (step S2613) As a result of comparison, when verification information 3504 is invalid, card 700 notifies that the access command is an error to terminal 800 (step S2614). At this point, terminal 800 receives the error from card 700 (step S2614A) When the verification information is valid, designation information verifying section 504 notifies storage area access section 505 of access are a designation information 2702, storage area access section 505 reads data from the area designated by access area designation information 2702 in storage area 506, and data transmitting section 502 transmits the data to terminal 800 (step S2615).

Then, terminal 800 receives the read data transmitted from card 700 in data receiving section 606 (step S2616), and stores the data in data storage section 603.

As described above, when the size of argument included in the memory access command is of 32 bits and thus small, according to the present invention, by dividing commands for access area designation and security protection area access and adding verification data to the command for security protection area access, it is possible for the card to verify the identity of a terminal application that performs access area designation, a terminal application that issues a security protection area access command, and a terminal application that holds a verification key.

In addition, with reference to a sequence shown in FIG. 39, described below is a method of using random number information output from the card in addition to the area designation information and verification key to generate verification data. In each step as shown in FIG. 39, the same steps as steps in the sequence as shown in FIG. 28 are assigned the same numerals, and descriptions thereof are omitted.

Figure 39:
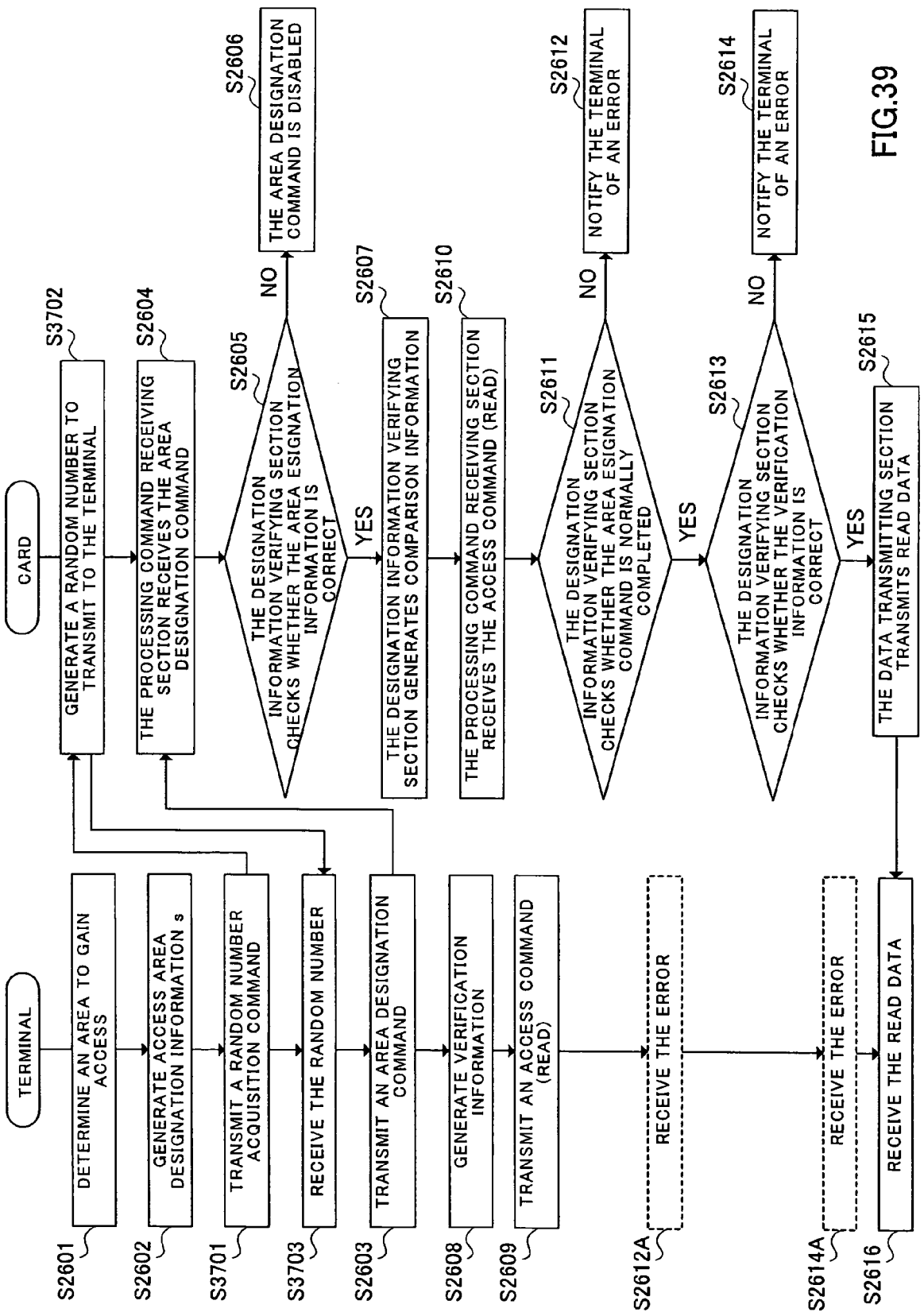
FIG. 39 is a flowchart illustrating processing for generating verification data using numerical information according to the second embodiment of the present invention.

As shown in FIG. 39, terminal 800 transmits a random number acquisition command to card 700 (step S3701). Card 700 generates random number T, stores the random number T in designation information verifying section 504 in card 700, and transmits the random number T to terminal 800 from data transmitting section 502 (step S3702). Terminal 800 receives in data receiving section 606 the random number T transmitted from card 700 (step S3703).

Figure 40:
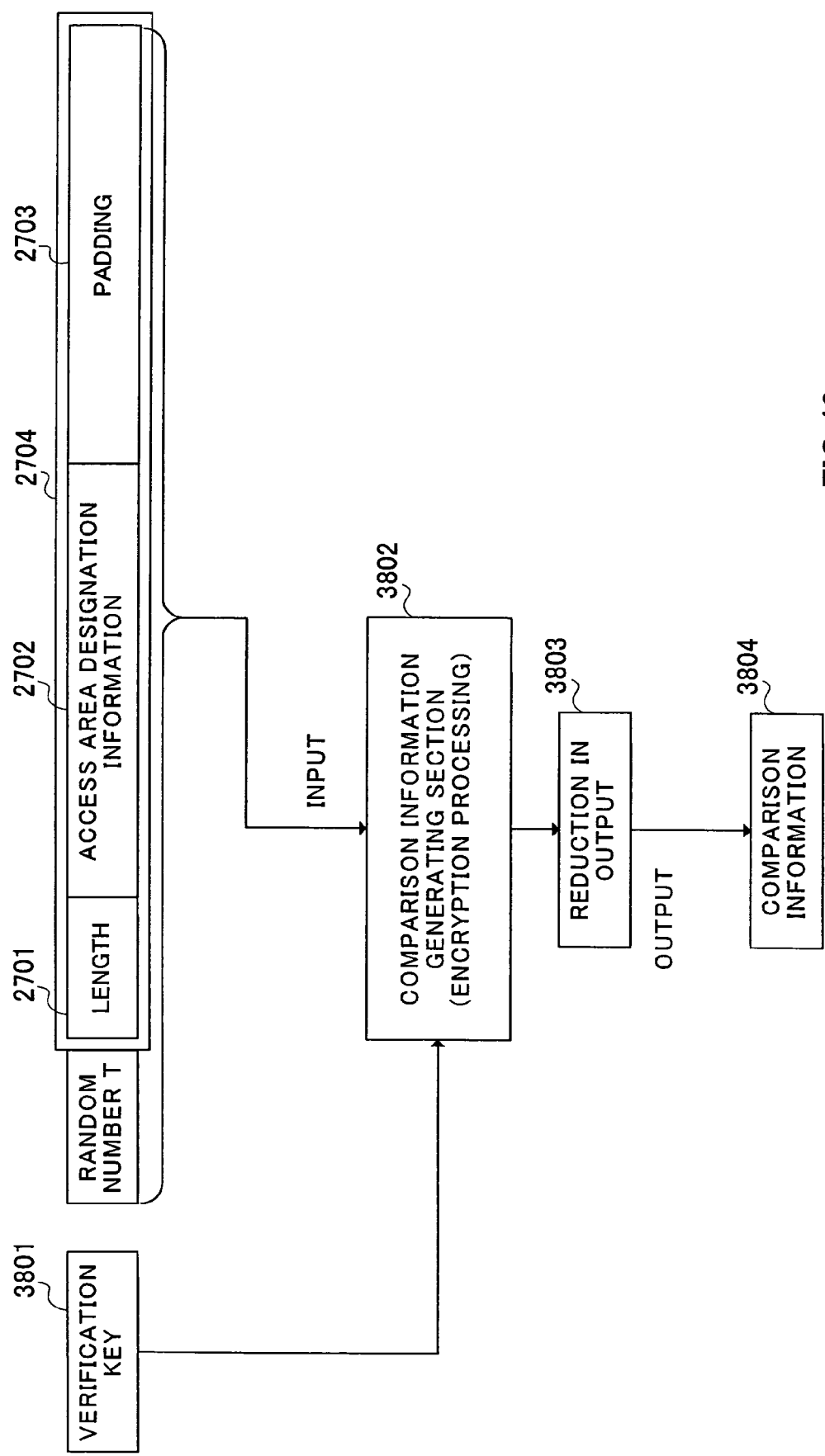
FIG. 40 is a diagram illustrating a method of generating comparison information using random numbers according to the second embodiment of the present invention.
Figure 41:
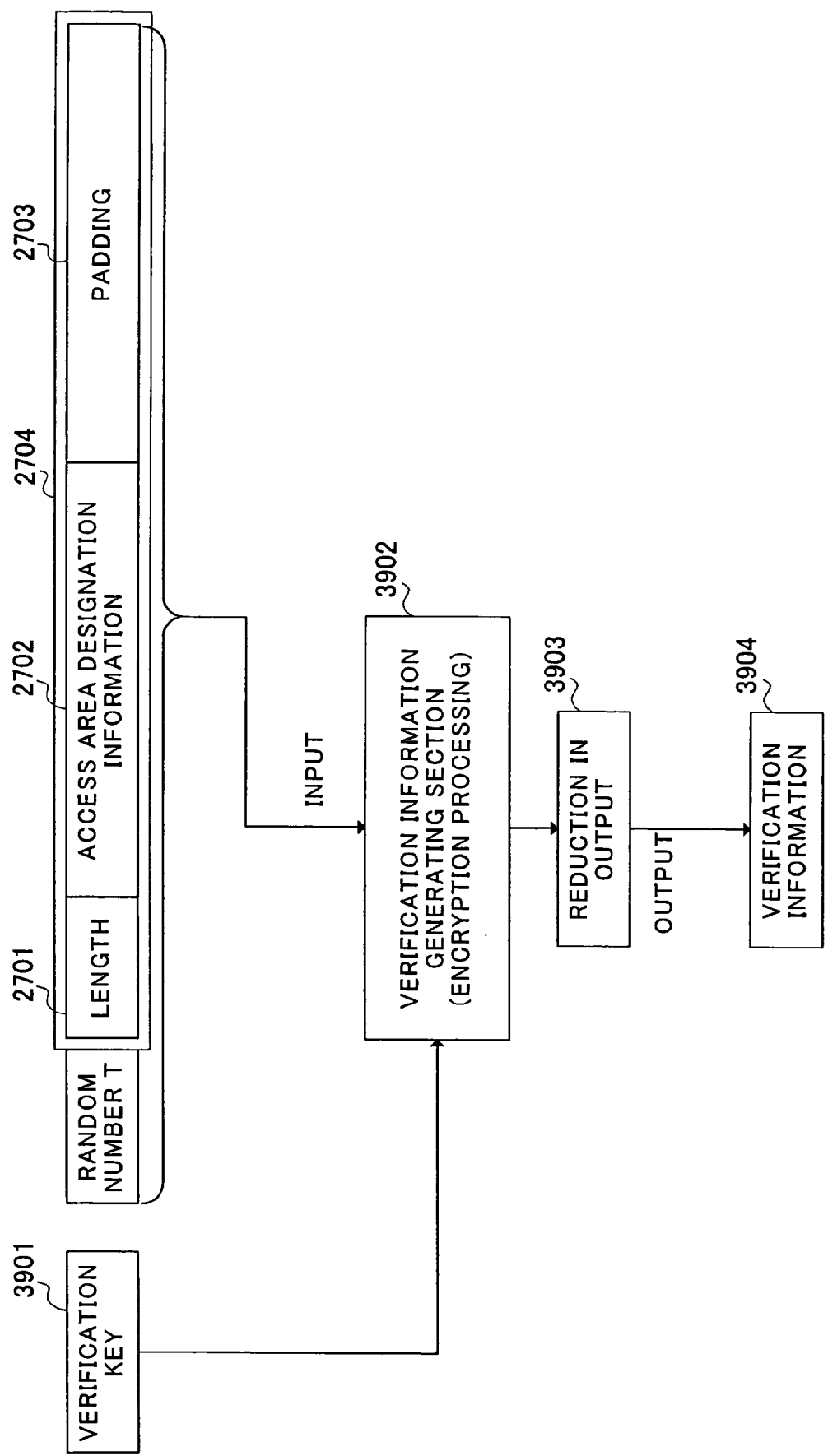
FIG. 41 is a diagram illustrating a method of generating verification information using random numbers according to the second embodiment of the present invention.

In the processing (step S2607) for generating the comparison information in card 700 and the processing (step S2608) for generating the verification information in terminal 800 when the random number T is used in the processing for generating the verification information, as shown in FIGS. 40 and 41, comparison information 3804 and verification information 3904 is output, respectively, while encryption processing is performed on a combination of the random number T and data portion 2704 of the area designation command.

As described above, by using the random number information in generating the verification information, even when the verification information is generated using the same area designation information and verification key, output verification information changes due to changes in the random number information, and it is thus possible to enhance the security intensity.

THIRD EMBODIMENT

This embodiment describes an example of a sequence including key sharing processing.

Figure 42:
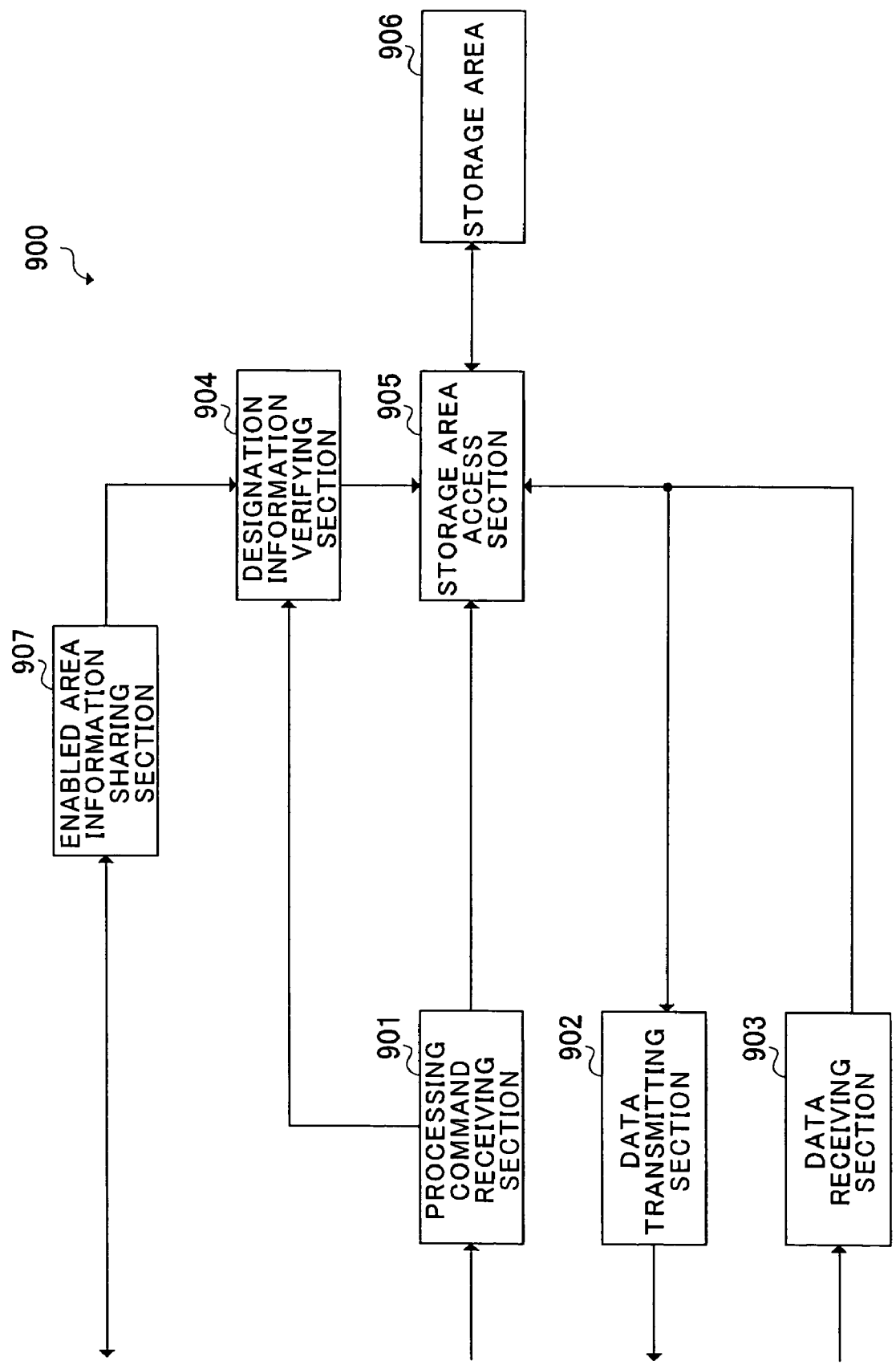
FIG. 42 is a diagram illustrating an internal module structure of a memory card according to a third embodiment of the present invention.

An intra-card module structure will be described below with reference to FIG. 42. In addition, a terminal configuration of a card is the same as shown in FIG. 4, and figures and descriptions thereof are omitted.

The module inside the card is comprised of processing command receiving section 901 which is connected to the CMD line and performs command reception and response transmission, storage area 906 that stores data, storage area access section 905 that performs processing for gaining access to storage area 906, data transmitting section 902 which is connected to the DAT line and transmits data read by storage area access section 905 to an external apparatus, data receiving section 903 which is also connected to the DAT line and receives data from an external apparatus, enabled area information sharing section 907 that shares with terminal 1000 information on an area accessible by security protection area access command, and designation information verifying section 904 that verifies designation information received via processing data receiving section 903, using a verification key.

Figure 43:
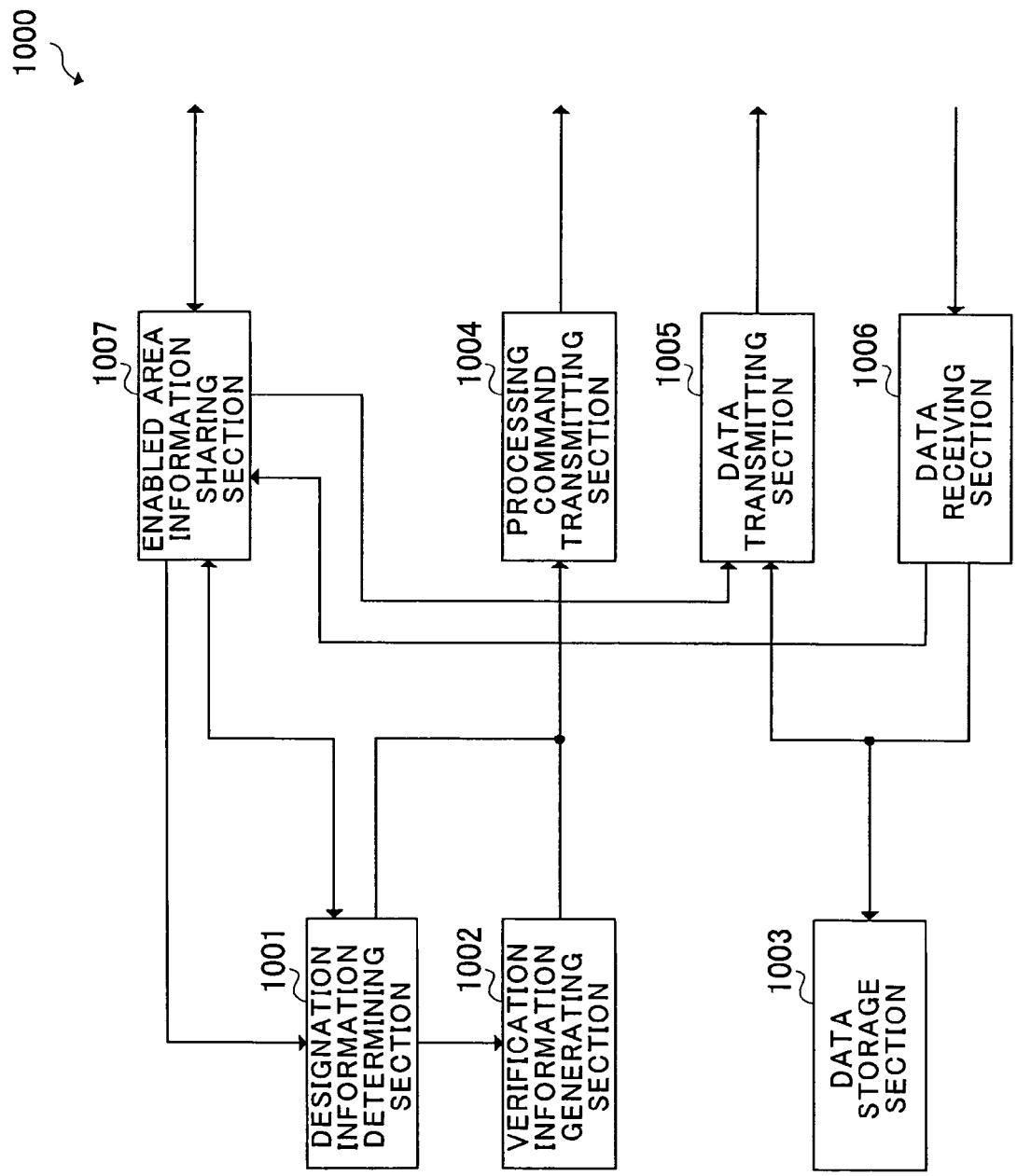
FIG. 43 is a diagram illustrating an internal configuration of a terminal according to the third embodiment of the present invention.

A module structure inside the terminal will be described below with reference to FIG. 43.

The module inside the terminal is comprised of processing command transmitting section 1004 that transmits or receives a command or response to/from card 900 respectively, data transmitting section 1005 that transmits data to card 900, data receiving section 1006 that receives data from card 900, designation information determining section 1001 that determines an area to gain access, enabled area information sharing section 1007 that shares information on an area accessible by security protection area access command, verification information generating section 1002 that generates verification information from designation information, and data storage section 1003 that stores data to transmit to card 900 and data received from card 900.

Figure 44:
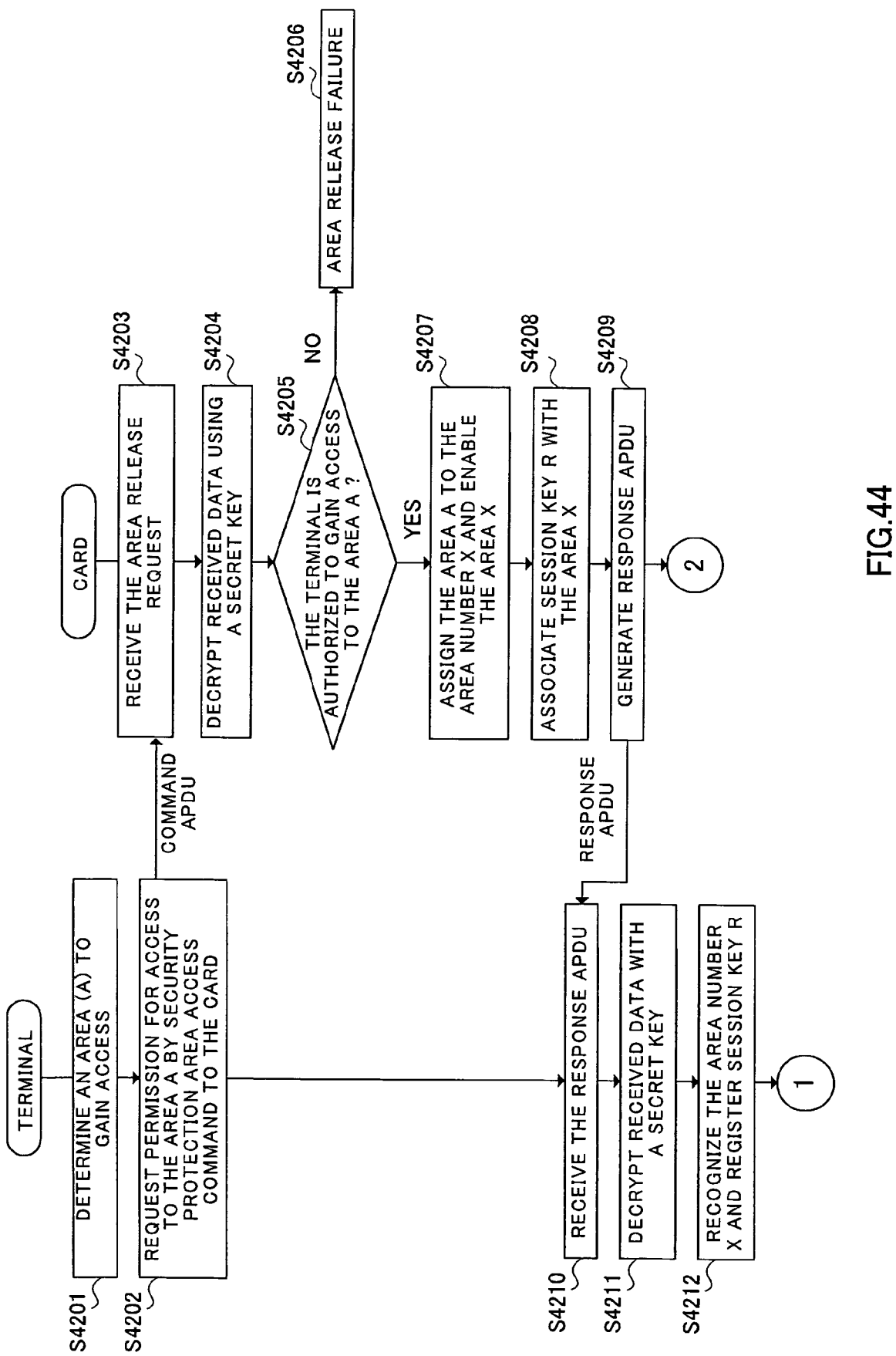
FIG. 44 is a flowchart illustrating part of access processing for the terminal to gain access to a security protection area inside the card according to the third embodiment of the present invention.
Figure 45:
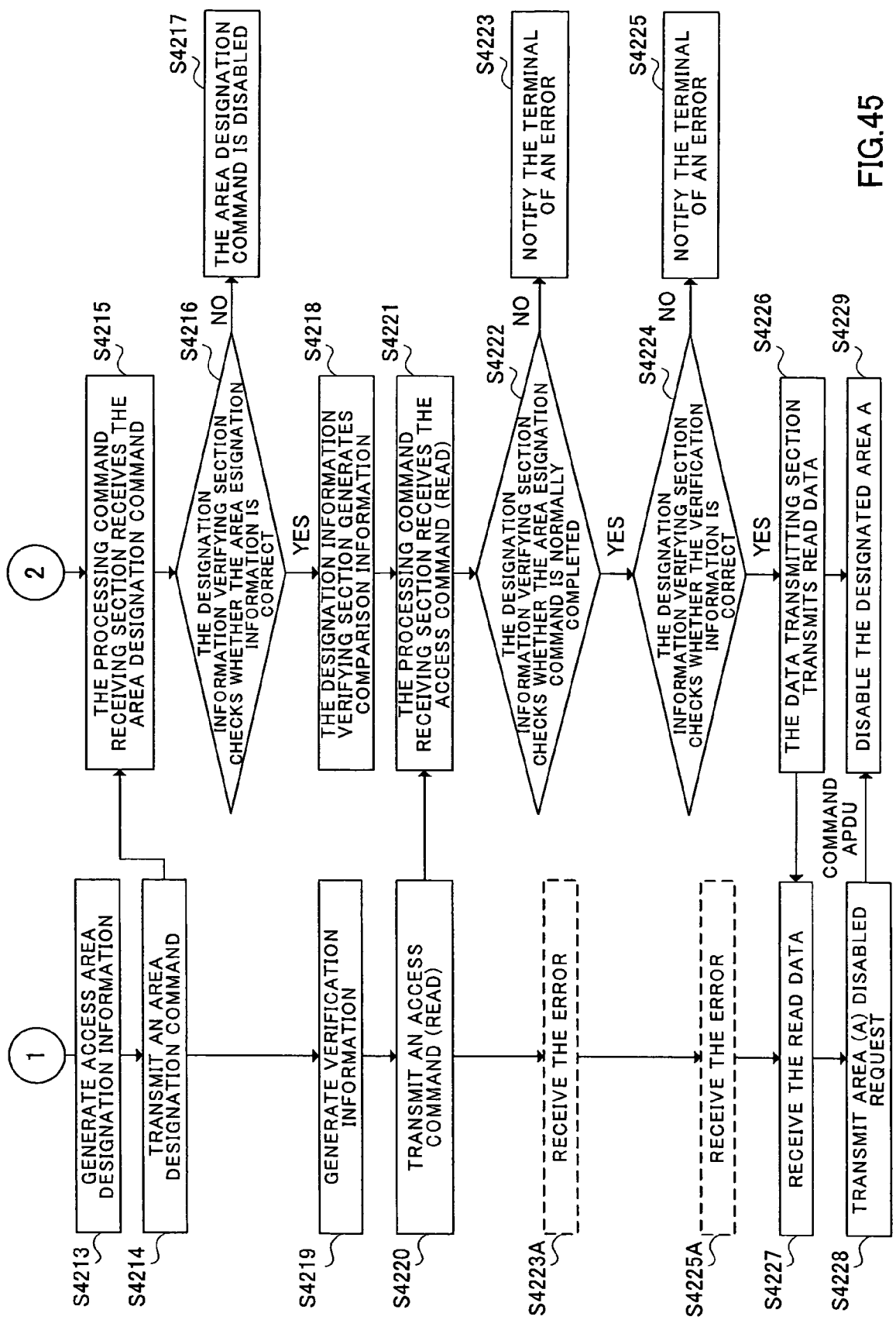
FIG. 45 is a flowchart illustrating part of the access processing subsequent to FIG. 44 according to the third embodiment of the present invention.

Processing where terminal 1000 gains access to a security protection area in card 900 will be described below with reference to FIGS. 42 and 43 and sequences shown in FIGS. 44 and 45.

Terminal 1000 determines area A to gain read access or write access in designation information determining section 1001 (step S4201), and transmits an area release request command that is command APDU to request permission for access to the area A by security protection area access command to card 900 from processing command transmitting section 1004 in enabled area information sharing section 1007 (step S4202). The area release request command includes identifier Info_PubH indicative of a public key of terminal 1000, and data obtained by encrypting identifier a indicative of the area A with public key PubS of card 900. In addition, a method of transmitting command APDU is the same as the method as described in the first embodiment, and specific descriptions thereof are omitted.

Card 900 having received the area release request command decrypts the encrypted data included in the command using secret key PriS of card 900 in enabled area information sharing section 907 (step S4203). Then, card 900 identifies terminal 1000 having transmitted the command from the public key identifier Info_PubH of terminal 1000, and checks whether terminal 1000 is permitted to gain access to the area A by referring to access right of the area A indicated by the identifier a (step S4205).

When access is not permitted, data transmitting section 902 transmits data indicative of area release failure as response APDU to terminal 1000 (step S4206). When access is permitted, card 900 registers the identifier a of the area A and area number X assigned to the area A with access valid table 4400 (see FIG. 46) to set whether or not to permit access by security protection area access command provided in designation information verifying section 904 (step S4207). Then, card 900 registers verification key R corresponding to the area A with access valid table 4400 (step S4208).

Card 900 encrypts the area number X and size of the area A using the public key PubH of terminal 1000 to transmit as response APDU to terminal 1000 from data transmitting section 902 (step S4209).

Terminal 1000 transmits an APDU reception command to card 900 from processing command transmitting section 1004, and acquires response APDU from card 900 using data receiving section 1006 (step S4210). In addition, a method of acquiring response APDU is the same as the method as described in the first embodiment, and specific descriptions thereof are omitted.

Enabled area information sharing section 1007 of terminal 1000 decrypts the encrypted data included in the response APDU using secret key PriH of terminal 1000 (step S4211), and thus obtains the area number X and size of the area A indicated by the area number X. Then, terminal 1000 registers the session key corresponding to the area A with verification information generating section 1002. The area number X is registered with designation information determining section 1001 to generate the access area designation information (step S4212). Subsequently, terminal 1000 proceeds to processing of a flowchart in FIG. 45.

Terminal 1000 generates in designation information determining section 1001 the access area designation information using the area number X registered by enabled area information sharing section 1007 (step S4213). Terminal 1000 stores the access area designation information in data portion 2704 (see FIG. 29), and transmits the area designation command to card 900 from processing command transmitting section 1004 (step S4214) In addition, the access area designation information in the area designation command is the same as in the second embodiment, and specific descriptions thereof are omitted.

Upon receiving the area designation command in processing command receiving section 901 from terminal 1000 (step S4215), card 900 checks the access area designation information in designation information verifying section 904, and judges whether the area number X is registered with access valid table 4400 and falls within a range of the area A based on access start address 2802 and access data size 2803 as shown in FIG. 30 (step S4216). When the designated area is not correct, designation information verifying section 904 treats the area designation command as being invalid (step S4217). When the designated area is correct, the section 904 stores the access area designation information, and generates comparison information using the access area designation information and verification key R corresponding to the area A registered with access valid table 4400 (step S4218) In addition, a method of generating the comparison information is the same as in the second embodiment, and specific descriptions thereof are omitted.

Terminal 1000 generates verification information in verification information generating section 1002 using the access area designation information and the session key R registered by enabled area information sharing section 1007 (step S4219) to multiplex on an argument of an access command (read), and transmits the access command to card 900 from processing command transmitting section 1001 (step S4220). In addition, a method of generating the verification information and a method of transmitting the access command are the same as in the second embodiment, and specific descriptions thereof are omitted.

Card 900 receives the access command (read) in processing command receiving section 901 (step S4221), and checks whether the area designation command is normally completed beforehand in designation information verifying section 904 (step S4222). When the command is not normally completed for the reason such that the area designation command is not received and the designated area is not correct, card 900 notifies that the access command is an error to terminal 1000 (step S4223). At this point, terminal 1000 receives the error from card 900 (step S4223A).

When the area designation command is normally completed beforehand, designation information verifying section 904 compares the comparison information generated earlier by card 900 with verification information stored in the argument of the access command (step S4224). As a result of comparison, when the verification information is invalid, card 900 notifies that the access command is an error to terminal 1000 (step S4225). At this point, terminal 1000 receives the error from card 900 (step S4225A).

When the verification information is valid, designation information verifying section 904 notifies storage area access section 905 of the designation information, storage area access section 905 reads data from the area designated by the area designation command in storage area 906, and data transmitting section 902 transmits the data to terminal 1000 (step S4226).

Then, terminal 1000 receives the read data transmitted from card 900 in data receiving section 1006, and stores the data in data storage section 1003 (step S4227).

Terminal 1000 generates area disabled command APDU to disable the area number X corresponding to the area A when the need is eliminated of access to the area A by security protection area access command, and transmits such APDU to card 900 from data transmitting section 1005 (step S4228).

Card 900 having received the area disabled command APDU searches access valid table 4400, and when finding the area number X, deletes registration of the area number X together with the area identifier a assigned to the area number X and session key R in the table to disable access to the area A by security protection area access command with the area number X designated (step S4229).

As described above, it is possible to enhance the security intensity by enabling access to some area in a security protection area using a security protection area access command by area release request only when access is needed, while disabling access to the area by area disabled request when the need of access is canceled.

This application is based on the Japanese Patent Applications the Japanese Patent Application No. 2003-275672 filed on Jul. 16, 2003, and the Japanese Patent Application No. 2004-197453 filed on Jul. 2, 2004, entire contents of which are expressly incorporated by reference herein.

INDUSTRIAL APPLICABILITY

By using both a memory card command and smart card command while using the memory card command in memory access, it is possible to authenticate a terminal with security even with few command argument while avoiding complexity.

The invention claimed is:

1. An access method for an apparatus to gain access to a specific area of a memory device, said specific area being assigned an area number, the method comprising the steps of:
   sharing, by the apparatus, a verification key with the memory device;
   first transmitting designation information from the apparatus to the memory device, said designation information designating an access area in the memory device, and including the area number of the access area, an access start offset in the specific area associated with the area number and a size of data to be accessed;
   second transmitting verification data obtained by encrypting the designation information using the verification key, together with a processing command, from the apparatus to the memory device, after first transmitting the designation information;
   verifying the verification data using the designation information and the verification key at the memory device; and
   executing the processing command when the verification succeeds at the memory device.

2. An access method according to claim 1, wherein the specific area is a security protection area to which an access from an outer apparatus is restricted.

3. An access method according to claim 1, wherein the processing command is a command for reading out or writing a data in the specific area.

4. An access method for an apparatus to gain access to a specific area of a memory device, the method comprising the steps of:
   sharing, by the apparatus, a verification key with the memory device;

requesting, by the apparatus, transmission of random numbers to the memory device;

transmitting, by the memory device, random numbers to the apparatus;

first transmitting designation information from the apparatus to the memory device, said designation information designating an access area in the memory device, and including the area number of the access area, an access start offset in the specific area associated with the area number and a size of data to be accessed;

second transmitting verification data obtained by encrypting verification information including the random numbers and the designation information, together with a processing command, from the apparatus to the memory device, after first transmitting the designation information;

verifying the verification data using the random numbers, the designation information and the verification key at the memory device; and executing the processing command when the verification succeeds at the memory device.

5. A memory device whose data of a specific area is read and written by an apparatus, said specific area being assigned an area number, the memory device comprising:

a verification key sharing section that shares the verification key with the apparatus;

a processing command receiver that receives designation information including the area number, an access start offset in the specific area associated with the area number and a size of data to access and designating an area to access and receives verification data obtained by encrypting the designation information using the verification key and a processing command including a command for read or write;

a designation information verifier that performs verification processing on the verification data using the designation information;

a storage area that stores data;

a storage area access section that performs read or write from/in a designated area of the storage area according to the command for processing, when the verification processing succeeds;

a data transmitter that transmits data read by the storage area access section to the apparatus; and a data receiver that receives data to write from the apparatus.

6. The memory device according to claim 5, wherein, the designation information verifier generates random numbers in response to a request by the apparatus, holds the random numbers and transmits the random numbers to the apparatus.

7. An information apparatus that reads and writes data to a specific area from/in a memory device, said specific area being assigned an area number, the information apparatus comprising:

a verification key sharing section that shares the verification key with the memory device;

a designation information determiner that determines designation information including an access start offset for reading and writing data from/in the specific area, a size of data for performing read and write and the area number and designating the access area;

a verification information generator that performs processing for generating verification data by encrypting the designation information using the verification key;

a processing command transmitter that transmits the designation information to the memory device and separately transmits the verification data and a processing command for reading or writing data to the memory device;

a data transmitter that transmits data to the memory device when the processing command is write; and a data receiver that receives data from the memory device when the processing command is read.

8. The information apparatus according to claim 7, wherein the detection information verifier requests transmission of random numbers to the memory device and receives the random numbers from the memory device.

9. An access method for an apparatus to gain access to a specific area of a memory device, said specific area being assigned an area number, the method comprising:

first transmitting designation information from the apparatus to the memory device, said designation information designating an access area in the memory device, and including the area number of the access area, an access start offset in the specific area associated with the area number and a size of data to be accessed;

second transmitting verification data obtained by encrypting the designation information using the verification key, together with a processing command, from the apparatus to the memory device, after first transmitting the designation information;

verifying the verification data using the designation information and the verification key at the memory device; and executing the processing command when the verification succeeds at the memory device.

10. An access method for an apparatus to gain access to a specific area of a memory device, said specific area being assigned an area number, the method comprising the steps of:

requesting, by the apparatus, transmission of random numbers to the memory device;

transmitting, by the memory device, device random numbers to the apparatus;

first transmitting designation information from the apparatus to the memory device, said designation information designating an access area in the memory device, and including the area number of the access area, an access start offset in the specific area associated with the area number and a size of data to be accessed;

second transmitting verification data obtained by encrypting the designation information using a verification key, together with a processing command, from the apparatus to the memory device, after first transmitting the designation information;

verifying the verification data using the random numbers, the designation information, and the verification key at the memory device; and executing the processing command when the verification succeeds at the memory device.

* * * * *